(12) United States Patent
Mihara et al.

(10) Patent No.: US 6,829,101 B2
(45) Date of Patent: Dec. 7, 2004

(54) ZOOM LENS, AND IMAGE PICKUP APPARATUS

(75) Inventors: Shinichi Mihara, Tama (JP); Kouki Hozumi, Hino (JP)

(73) Assignee: Olympus Corporation, Tokyo (JP)

( * ) Notice: Subject to any disclaimer, the term of this patent is extended or adjusted under 35 U.S.C. 154(b) by 35 days.

(21) Appl. No.: 10/366,426

(22) Filed: Feb. 14, 2003

(65) Prior Publication Data

US 2003/0184875 A1 Oct. 2, 2003

(30) Foreign Application Priority Data

Feb. 14, 2002 (JP) ........................................ 2002-036267

(51) Int. Cl.[7] .............................................. G02B 15/14
(52) U.S. Cl. ..................................... 359/687; 359/689
(58) Field of Search ........................ 359/691, 687–688, 359/690, 676, 683, 680–682, 689

(56) References Cited

U.S. PATENT DOCUMENTS

| | | | | |
|---|---|---|---|---|
| 5,418,646 A | | 5/1995 | Shibata et al. ............... | 359/687 |
| 5,583,700 A | * | 12/1996 | Usui et al. ................... | 359/688 |
| 6,084,721 A | * | 7/2000 | Terasawa .................... | 359/684 |
| 6,580,565 B2 | * | 6/2003 | Ozaki ......................... | 359/687 |
| 6,674,582 B2 | * | 1/2004 | Kawasaki ................... | 359/690 |
| 2001/0019455 A1 | * | 9/2001 | Miyano ...................... | 359/688 |

FOREIGN PATENT DOCUMENTS

| | | |
|---|---|---|
| EP | 1 093 000 | 4/2001 |
| EP | 1 096 287 | 5/2001 |

* cited by examiner

Primary Examiner—Jordan M. Schwartz
(74) Attorney, Agent, or Firm—Kenyon & Kenyon

(57) ABSTRACT

The present invention relates to a digital still camera that is compatible with an increasing number of pixels and uses a zoom lens having a high zoom ratio yet compact, simple construction, wherein chromatic aberration of the zoom lens are reduced and the zoom lens is kept against the influences of chromatic aberrations. The zoom lens comprises a lens group G2 having negative refracting power and at least one lens group G3 located on the image side of G2 and having positive refracting power. Upon zooming, the spacing between the negative lens group G2 and the positive lens group G3 changes. The positive lens group G3 includes two doublet components, in each of which a positive lens element and a negative lens element are cemented together in order from the object side of G3. The doublet component located on the image side of G3 has a meniscus form concave on its image side.

28 Claims, 31 Drawing Sheets

C: Cyan  M: Magenta
Ye: Yellow  G: Green

ZOOM LENS, AND IMAGE PICKUP APPARATUS

This application claims benefits of Japanese Application No. 2002-36267 filed in Japan on Feb. 14, 2002, the contents of which are incorporated by this reference.

BACKGROUND OF THE INVENTION

The present invention relates generally to a zoom lens and an image pickup apparatus using the same, and more particularly to a high-zoom-ratio zoom lens that is well fit for cameras, especially video cameras and digital still cameras.

Home-video cameras are now increasingly diminished, and the market is fairly mature. About 10:1 power zoom lenses are mainly used for phototaking lenses. Recently, on the other hand, attention has been focused on digital still cameras (electronic still cameras) as the coming generation of cameras that are taking the place of silver-halide 35 mm-film (usually called Leica size) cameras. Designed to provide stills, the digital still cameras must satisfy higher image quality levels than do home-video cameras, and so even general user-oriented digital cameras rely primarily on image pickup devices having 2,000,000 pixels. It is thus difficult to design compact, high-zoom-ratio zoom lenses unlike the case of home-video cameras, and so about 3:1 power zoom lenses are mainly used. The market for digital still cameras having such a 3:1 power zoom lens are coming of age, and so the advent of higher-zoom-ratio zoon lenses is desired. However, most of compact, high-zoom-ratio zoom lenses currently available for electronic image pickup apparatus are oriented for home videos having a small number of pixels. When such zoom lenses are used with digital cameras, it is impossible to allow image pickup devices to take full advantage of their own resolving power.

For instance, if an image pickup device having about 2,000,000 pixels is used with a zoom lens of the construction exemplified in the inventive examples given later, that image pickup device may take full advantage of its own resolving power. However, the spectral sensitivity properties of that image pickup device including a color filter, unlike those of silver-halide color film, are not faithful for the specific features of the human eyes (which have higher sensitivity to wavelengths of about 400 to 430 nm than required, low sensitivity to wavelengths of about 600 nm, and high sensitivity to wavelengths of 700 nm or higher not originally in existence). For this reason, those spectral sensitivity properties are largely affected by chromatic aberrations of the lens in near-ultraviolet and near-infrared ranges, resulting in chromatic blurring and, hence, considerable damage to image quality. Color reproducibility to plants and many other subjects having strong reflection spectra in the infrared range in general, too, is considerably damaged.

The chromatic blurring of a phototaken image is particularly noticeable at a subject site having a large brightness difference. Referring to the boundary between a high brightness site and a low brightness site, this is explained as follow. The high brightness site is whitened beyond the latitude of an image pickup device due to over-exposure whereas light of wavelengths of particularly about 400 to 430 nm on a high brightness side aberrates as chromatic aberrations on a low brightness side. In view of light quantity, on the other hand, the aberrating light comes within the range of the latitude of the image pickup device. In addition, the relative sensitivity of this wavelength range becomes much higher as compared with silver-halide color film. Consequently, a portion of the low brightness side near to that boundary is strikingly colored in purple. When it comes to an optical system having a high zoom ratio and a largely asymmetric power profile wherein the stronger the power of each lens element becomes due to compactness, the more noticeable chromatic aberrations due to secondary spectra becomes, the wavelengths of 400 to 430 nm that are main chromatic blurring components are achromatized with wavelengths in the vicinity of 550 nm having the highest sensitivity. However, chromatic aberrations in the range of 500 to 600 nm having relatively high sensitivity start to occur gradually, and so the possibility of improvements in image quality due to an increase in the number of pixels of the image pickup device is spoiled by the image-formation capability of the zoom lens. Accordingly, to eliminate a chromatic blurring problem while sharpness is maintained, there is no option but to make correction for secondary spectra or removing light components of 400 to 430 nm wavelengths that are main chromatic blurring components by means of filters, etc. without detrimental to color reproduction.

SUMMARY OF THE INVENTION

In view of such situations that the number of pixels of an image pickup device continues to increase whereas the pixel pitch becomes increasingly narrow, the object of the present invention is to provide a digital still camera which is compatible with the resolving power of a coming image pickup device having as many pixels as about 3,000,000 or greater and uses a zoom lens having a high zoom ratio yet compact, simple construction, wherein chromatic aberrations of the zoom lens are reduced and the zoom lens is kept against the influences of chromatic aberrations.

According to the first aspect of the invention, this object is achieved by the provision of a zoom lens including a negative lens group having negative refracting power and at least one positive lens group located on an image side thereof and having positive refracting power, characterized in that:

a spacing between said negative lens group and said positive lens group changes upon zooming, said positive lens group includes two doublet components in each of which a positive lens element and a negative lens element are cemented together in order from an object side thereof, and a doublet component of said two doublet components, which component is located on an image side thereof, has a meniscus form concave on an image side thereof.

According to the second aspect of the invention, there is provided a zoom lens including a negative lens group having negative refracting power and at least one positive lens group located on an image side thereof and having positive refracting power, characterized in that:

a spacing between said negative lens group and said positive lens group changes upon zooming, said positive lens group includes two doublet components in each of which a positive lens element and a negative lens element are cemented together in order from an object side thereof, and a doublet component of said two doublet components, which component is located on an image side thereof, has negative refracting power.

According to the third aspect of the invention, there is provided a zoom lens including a negative lens group having negative refracting power and at least one positive lens group located on an image side thereof and having positive refracting power, characterized in that:

a spacing between said negative lens group and said positive lens group changes upon zooming, said positive lens group includes two doublet components in each of which a positive lens element and a negative lens element are cemented together in order from an object side thereof, and said two doublet components satisfy the following conditions (1) and (2):

$$0.000 < AVE[(\Delta\theta_{gF})C1p, (\Delta\theta_{gF})C2p] < 0.080 \quad (1)$$

$$-0.030 < AVE[(\Delta\theta_{gF})C1n, (\Delta\theta_{gF})C2n] < 0.003 \quad (2)$$

where $(\Delta\theta_{gF})C1P$ is the anomalous dispersibility of a medium forming the positive lens element in the doublet component of said two doublet components, which component is located on the object side of said positive lens group, $(\Delta\theta_{gF})C1n$ is the anomalous dispersibility of a medium forming the negative lens element in the doublet component of said two doublet components, which component is located on the object side of said positive lens group, $(\Delta\theta_{gF})C2p$ is the anomalous dispersibility of a medium forming the positive lens element of the doublet component of said two doublet components, which is located on the image side of said positive lens group, $(\Delta\theta_{gF})C2n$ is the anomalous dispersibility of a medium forming the negative lens element in the doublet component of said two doublet components, which component is located on the image side of said positive lens group, $AVE[(\Delta\theta_{gF})C1p, (\Delta\theta_{gF})C2p]$ is the arithmetic mean of $(\Delta\theta_{gF})C1p$ and $(\Delta\theta_{gF})C2p$, and $AVE[(\Delta\theta_{gF})C1n, (\Delta\theta_{gF})C2n]$ is the arithmetic mean of $(\Delta\theta_{gF})C1n$ and $(\Delta\theta_{gF})C2n$.

According to the fourth aspect of the invention, there is provided a zoom lens including a negative lens group having negative refracting power and at least one positive lens group located on an image side thereof and having positive refracting power, characterized in that:

a spacing between said negative lens group and said positive lens group changes upon zooming, said positive lens group includes two doublet components in each of which a positive lens element and a negative lens element are cemented together in order from an object side thereof, and said two doublet components satisfy at least one of the following conditions (3-1) and (3-2) and at least one of the following conditions (4-1) and (4-2):

$$0.0000 < (\Delta\theta_{gF})C1p < 0.1000 \quad (3\text{-}1)$$

$$0.0000 < (\Delta\theta_{gF})C2p < 0.1000 \quad (3\text{-}2)$$

$$-0.0300 < (\Delta\theta_{gF})C1n < 0.0000 \quad (4\text{-}1)$$

$$-0.0300 < (\Delta\theta_{gF})C2n < 0.0000 \quad (4\text{-}2)$$

where $(\Delta\theta_{gF})C1p$ is the anomalous dispersibility of a medium forming the positive lens element in the doublet component of said two doublet components, which component is located on the object side of said positive lens group, $(\Delta\theta_{gF})C1n$ is the anomalous dispersibility of a medium forming the negative lens element in the doublet component of said two doublet components, which component is located on the object side of said positive lens group, $(\Delta\theta_{gF})C2p$ is the anomalous dispersibility of a medium forming the positive lens element in the doublet component of said two doublet components, which component is located on the image side of said positive lens group, and $(\Delta\theta_{gF})C2n$ is the anomalous dispersibility of a medium forming the negative lens element in the doublet component of said two doublet components, which component is located on the image side of said positive lens group.

Why the aforesaid arrangements are used herein, and how they work is now explained.

Basically, the zoom lens of the invention includes a lens group having negative refracting power and at least one lens group A located subsequent thereto and having positive refracting power, wherein the spacing between these lens groups changes upon zooming, and the lens group A comprises a plurality of lens components.

For instance, if the lens group A is composed of one positive lens element and one negative lens element, it is preferable for the purpose of slacking chromatic aberrations due to secondary spectra to roughly satisfy the following conditions (a) and (b) regarding the anomalous dispersibility of the media that form the respective lens elements.

$$0.0000 < (\Delta\theta_{gF})p \quad (a)$$

$$(\Delta\theta_{gF})n < 0.0000 \quad (b)$$

Here $(\Delta\theta_{gF})p$ and $(\Delta\theta_{gF})n$ are the anomalous dispersibility of the media forming the positive lens element and the negative lens element in the lens group A, respectively.

The definition of the anomalous dispersibility $\Delta\theta_{gF}$ of each medium (vitreous material) is now explained.

$$\theta_{gF} = A_{gF} + B_{gF} \cdot v_d + \Delta\theta_{gF}$$

where $\theta_{gF} = (n_g - n_F)/(n_F - n_C)$, $v_d = (n_d - 1)/(n_F - n_C)$, and $A_{gF}$ and $B_{gF}$ are each a linear coefficient determined by two vitreous materials, glass code 511605 (NSL7 made by Ohara Co., Ltd.; $\theta_{gF} = 0.5436$ and $v_d = 60.49$) and glass code 620363 (PBM2 made by Ohara Co., Ltd.; $\theta_{gF} = 0.5828$ and $v_d = 36.26$). It is here noted that $n_g$, $n_F$, $n_C$ and $n_d$ are the refractive indices of the medium with respect to g-line, F-line, C-line and d-line wavelengths, respectively, and $\theta_{gF}$ is the partial dispersion ratio of the medium.

That is, $\oplus\theta_{gF}$ is the amount of displacement of the vitreous material in a $\theta_{gF}$ direction on the basis of a straight line between glass code 511605 (NSL7 made by Ohara Co., Ltd.; $\theta_{gF} = 0.5436$ and $v_d = 60.49$) and glass code 620363 (PBM2 made by Ohara Co., Ltd.; $\theta_{gF} = 0.5828$ and $v_d = 36.26$) in a partial dispersion ratio $\theta_{gF}$ vs. Abbe number $v_d$ plot of the vitreous material or a numerical representation of anomalous dispersibility.

Specifically in the defining formula for $\Delta\theta_{gF}$, $A_{gF}$ and $B_{gF}$ may be $A_{gF} = 0.6414624845$ and $B_{gF} = -1.617829137 \times 10^{-5}$.

To satisfy ordinary achromatic conditions, on the other hand, it is generally required to satisfy the following Abbe number conditions (c) and (d) at the same time.

$$40 < (v_d)p \quad (c)$$

$$(v_d)n < 30 \quad (d)$$

Here $(v_d)p$ is the Abbe number of the positive lens element in the lens group A and $(v_d)n$ is the Abbe number of the negative lens element in the lens group A.

Any failure in satisfying these conditions causes both longitudinal chromatic aberration and chromatic aberration of magnification to remain under-corrected, although the secondary spectra may be slackened.

In practice, special, if expensive, vitreous materials capable of satisfyin conditions (a) and (c) for a positive lens are available; however, there is no material that satisfies conditions (b) and (d) for a negative lens at the same time. For the negative lens, there is no option but to incorporate at least two negative lens elements in the lens group A in such a way that one element satisfies condition (b) and another satisfies condition (d). In consideration of the fact that the lens group A has positive refracting index, on the other hand, it is desired to set up the lens group A using positive lens elements equal or more in number to or than the negative lens elements, i.e., using two or more positive lens elements and two or more negative lens elements. The positive lens group A subsequent to the negative lens group is likely to be sensitive to decentration, and so it is preferable to cement together the positive lens element and the negative lens element. It is thus desired that the lens group A be composed of two doublet components C1 and C2, each consisting of a positive lens element and a negative lens element.

To attain another object of the invention, i.e., a zoom lens that has a short length and high resolving power while ensuring a high zoom ratio, the doublet component C2 should preferably have a meniscus form concave on its image side.

Furthermore, that doublet component C2 should preferably satisfy the following condition (e):

$$1.6 < (R_{C21}+R_{C22})/(R_{C21}-R_{C22}) < 8.0 \quad (e)$$

where $R_{C21}$ is the axial radius of curvature of the object side-surface of the doublet component located on the image side of the positive lens group, and $R_{C22}$ is the axial radius of curvature of the image side-surface of the doublet component located on the image side of the positive lens group.

As the lower limit of 1.6 to condition (e) is not reached, it is difficult to make the length of the optical system short, and as the upper limit of 8.0 is exceeded, it is difficult to make correction for spherical aberrations and coma.

More preferably, $$1.8 < (R_{C21}+R_{C22})/(R_{C21}-R_{C22}) < 7.0 \quad (e)'$$

Most preferably, $$2.0 < (R_{C21}+R_{C22})/(R_{C21}-R_{C22}) < 6.0 \quad (e)''$$

It is acceptable that only the upper or lower limit to condition (e) is changed to the upper or lower limit to condition (e)' or (e)".

From another point of view, i.e., to shorten the length of the optical system, it is preferable to allow the doublet component C2 to have negative refracting power.

As mentioned above, the lens group A is constructed in such a way as to have therein two doublet components C1 and C2. To slack chromatic aberrations due to secondary spectra using the lens group A, it is preferable to satisfy the following condition (f). That is, it is preferable to satisfy the following medium condition (f) with respect to all the positive lens elements included in the lens group A.

$$0.000 < AVE[(\Delta\theta_{gF})pi] < 0.080 \quad (f)$$

Here $AVE[(\Delta\theta_{gF})pi]$ is the arithmetic mean of the anomalous dispersibilities of all positive lens elements included in the positive lens group.

Suppose now that the positive lens group A does not include any positive lens with the exception of the positive lens elements included in the two doublet components C1 and C2. Then, $AVE[(\Delta\theta_{gF})pi]$ in condition (f) becomes $$AVE[(\Delta\theta_{gF})pi]=[(\Delta\theta_{gF})p1+(\Delta\theta_{gF})p2]/2$$

Here $(\Delta\theta_{gF})p1$ is the anomalous dispersibility of the object side-positive lens element and $(\Delta\theta_{gF})p2$ is the anomalous dispersibility of the image side-positive lens element.

Falling short of the lower limit of 0.0000 to condition (f) is not preferable because chromatic aberrations due to secondary spectra remain under-corrected and the chromatic blurring of an image becomes noticeable. A medium exceeding the upper limit of 0.080 does not occur in nature.

More preferably, $$0.003 < AVE[(\Delta\theta_{gF})pi] < 0.050 \quad (f)'$$

Most preferably, $$0.006 < AVE[(\Delta\theta_{gF})pi] < 0.020 \quad (f)''$$

It is acceptable that only the upper or lower limit to condition (f) is changed to the upper or lower limit to condition (f)' or (f)".

Alternatively, it is acceptable that the following conditions (1) and (2) for each lens medium inclusive of that of the negative lens element in the lens group A are separately or concurrently satisfied.

$$0.000 < AVE[(\Delta\theta_{gF})C1p, (\Delta\theta_{gF})C2p] < 0.080 \quad (1)$$

$$-0.030 < AVE[(\Delta\theta_{gF})C1n, (\Delta\theta_{gF})C2n] < 0.003 \quad (2)$$

Here
$(\Delta\theta_{gF})C1p$ is the anomalous dispersibility of a medium forming the positive lens element in the doublet component of said two doublet components, which component is located on the object side of said positive lens group, $(\Delta\theta_{gF})C1n$ is the anomalous dispersibility of a medium forming the negative lens element in the doublet component of said two doublet components, which component is located on the object side of said positive lens group, $(\Delta\theta_{gF})C2p$ is the anomalous dispersibility of a medium forming the positive lens element in the doublet component of said two doublet components, which component is located on the image side of said positive lens group, $(\Delta\theta_{gF})C2n$ is the anomalous dispersibility of a medium forming the negative lens element in the doublet component of said two doublet components, which component is located on the image side of said positive lens group, $AVE[(\Delta\theta_{gF})C1p, (\Delta\theta_{gF})C2p]$ is the arithmetic mean of $(\Delta\theta_{gF})C1p$ and $(\Delta\theta_{gF})C2p$, and $AVE[(\Delta\theta_{gF})C1n, (\Delta\theta_{gF})C2n]$ is the arithmetic mean of $(\Delta\theta_{gF})C1n$ and $(\Delta\theta_{gF})C2n$.

Any deviation from the lower limit of 0.000 and the upper limit of 0.003 to condition (1) is not preferable because chromatic aberrations due to secondary spectra remain and the chromatic blurring of an image becomes noticeable. A medium exceeding the upper limit of 0.080 to condition (1) or falling short of the lower limit of −0.030 to condition (2) does not occur in nature.

It is more preferably to satisfy one or both of the following conditions (1)' and (2)':

$$0.003 < AVE[(\Delta\theta_{gF})C1p, (\Delta\theta_{gF})C2p] < 0.050 \quad (1)'$$

$$-0.020 < AVE[(\Delta\theta_{gF})C1n, (\Delta\theta_{gF})C2n] < 0.000 \quad (2)'$$

It is even more preferable to satisfy either one of the following conditions (1)" and (2)", and it is most preferable to satisfy both the following conditions (1)" and (2)".

$$0.006 < AVE[(\Delta\theta_{gF})C1p, (\Delta\theta_{gF})C2p] < 0.020 \qquad (1)''$$

$$-0.010 < AVE[(\Delta\theta_{gF})C1n, (\Delta\theta_{gF})C2n] < -0.003 \qquad (2)''$$

It is acceptable that only the upper or lower limit to conditions (1) and (2) are changed to the upper or lower limit to conditions (1)' and (2)' or (1)'' and (2)''.

In the invention, there are additionally provided ordinary dichroic achromatic conditions (g) and (h).

$$50 < AVE[(v_d)C1p, (v_d)C2p] \qquad (g)$$

$$AVE[(v_d)C1n, (v_d)C2n] < 50 \qquad (h)$$

Here $(v_d)C1p$ is the Abbe number on a d-line basis of a medium forming the positive lens element in the doublet component of the two doublet components, which component is located on the object side of said positive lens group, $(v_d)C2p$ is the Abbe number on a d-line basis of a medium forming the positive lens element in the doublet component of the two doublet components, which component is located on the image side of said positive lens group, $(v_d)C1n$ is the Abbe number on a d-line basis of a medium forming the negative lens element in the doublet component of the two doublet components, which component is located on the object side of said positive lens group, $(v_d)C2n$ is the Abbe number on a d-line basis of a medium forming the negative lens element in the doublet component of the two doublet components, which component is located on the image side of said positive lens group, $AVE[(v_d)C1p, (v_d)C2p]$ is the arithmetic mean of $(v_d)C1p$ and $(v_d)C2p$, and $AVE[(v_d)C1n, (v_d)C2n]$ is the arithmetic mean of $(v_d)C1n$ and $(v_d)C2n$.

Regarding condition (g), it is acceptable to set 85 as the upper limit. A lens material exceeding that upper limit costs much.

Regarding condition (h), it is acceptable to set 25 as the lower limit. A lens material below that lower limit again costs much.

It is more preferable to satisfy one or both of the following conditions (g)' and (h)'.

$$55 < AVE[(v_d)C1p, (v_d)C2p] \qquad (g)'$$

$$AVE[(v_d)C1n, (v_d)C2n] < 45 \qquad (h)'$$

It is even more preferable to satisfy one of the following conditions (g)'' and (h)'', and it is most preferable to satisfy both the following conditions (g)'' and (h)''.

$$60 < AVE[(v_d)C1p, (v_d)C2p] \qquad (g)''$$

$$AVE[(v_d)C1n, (v_d)C2n] < 40 \qquad (h)''$$

It is acceptable that only the upper or lower limits to conditions (g) and (h) are changed to the upper or lower limits to conditions (g)' and (h)' or conditions (g)'' and (h)''.

For each lens medium in the lens group A, it is alternatively preferable to satisfy at least one of the following conditions (3-1) and (3-2) and at least one of the following conditions (4-1) and (4-2).

$$0.0000 < (\Delta\theta_{gF})C1p < 0.1000 \qquad (3\text{-}1)$$

$$0.0000 < (\Delta\theta_{gF})C2p < 0.1000 \qquad (3\text{-}2)$$

$$-0.0300 < (\Delta\theta_{gF})C1n < 0.0000 \qquad (4\text{-}1)$$

$$-0.0300 < (\Delta\theta_{gF})C2n < 0.0000 \qquad (4\text{-}2)$$

where $(\Delta\theta_{gF})C1p$ is the anomalous dispersibility of a medium forming the positive lens element in the doublet component of said two doublet components, which component is located on the object side of said positive lens group, $(\Delta\theta_{gF})C1n$ is the anomalous dispersibility of a medium forming the negative lens element in the doublet component of said two doublet components, which component is located on the object side of said positive lens group, $(\Delta\theta_{gF})C2p$ is the anomalous dispersibility of a medium forming the positive lens element in the doublet component of said two doublet components, which component is located on the image side of said positive lens group, and $(\Delta\theta_{gF})C2n$ is the anomalous dispersibility of a medium forming the negative lens element in the doublet component of said two doublet components, which component is located on the image side of said positive lens group.

Any deviation from the lower limit of 0.0000 to condition (3-1) or (3-2) or the upper limit of 0.0000 to condition (4-1) or (4-2) is not preferable because chromatic aberrations due to secondary spectra remain and the chromatic blurring of an image becomes noticeable. A medium exceeding the upper limit of 0.1000 to condition (3-1) or (3-2) or falling short of the lower limit of −0.0300 to condition (4-1) or (4-2) does not occur in nature.

It is more preferable to satisfy at least one or all of the following conditions (3-1)', (3-2)', (4-1)' and (4-2)'.

$$0.0050 < (\Delta\theta_{gF})C1p < 0.0800 \qquad (3\text{-}1)'$$

$$0.0050 < (\Delta\theta_{gF})C2p < 0.0800 \qquad (3\text{-}2)'$$

$$-0.0250 < (\Delta\theta_{gF})C1n < -0.0030 \qquad (4\text{-}1)'$$

$$-0.0250 < (\Delta\theta_{gF})C2n < -0.0030 \qquad (4\text{-}2)'$$

It is even more preferable to satisfy at least one of the following conditions (3-1)'', (3-2)'', (4-1)'' and (4-2)'', and it is most preferable to satisfy all of the following conditions (3-1)'', (3-2)'', (4-1)'' and (4-2)''.

$$0.0100 < (\Delta\theta_{gF})C1p < 0.0600 \qquad (3\text{-}1)''$$

$$0.0100 < (\Delta\theta_{gF})C2p < 0.0600 \qquad (3\text{-}2)''$$

$$-0.0200 < (\Delta\theta_{gF})C1n < -0.0060 \qquad (4\text{-}1)''$$

$$-0.0200 < (\Delta\theta_{gF})C2n < -0.0060 \qquad (4\text{-}2)''$$

It is acceptable that only the upper or lower limits to conditions (3-1), (3-2), (4-1) and (4-2) are changed to the upper or lower limits to conditions (3-1)', (3-2)', (4-1)' and (4-2)' or conditions (3-1)'', (3-2)'', (4-1)'' and (4-2)''.

In the invention, there are additionally provided ordinary dichroic achromatic conditions (i-1), (i-2), (j-1) and (j-2). It is then desired to satisfy at least one of the following conditions (i-1) and (i-2), and at least one of the following conditions (j-1) and (j-2):

$$60<(\nu_d)C1p \tag{i-1}$$

$$60<(\nu_d)C2p \tag{i-2}$$

$$(\nu_d)C1n<30 \tag{j-1}$$

$$(\nu_d)C2n<30 \tag{j-2}$$

Here $(\nu_d)C1p$ is the Abbe number on a d-line basis of a medium forming the positive lens element in the doublet component of the two doublet components, which component is located on the object side of said positive lens group, $(\nu_d)C2p$ is the Abbe number on a d-line basis of a medium forming the positive lens element in the doublet component of the two doublet components, which component is located on the image side of said positive lens group, $(\nu_d)C1n$ is the Abbe number on a d-line basis of a medium forming the negative lens element in the doublet component of the two doublet components, which component is located on the object side of said positive lens group, and $(\nu_d)C2n$ is the Abbe number on a d-line basis of a medium forming the negative lens element in the doublet component of the two doublet components, which component is located on the image side of said positive lens group, Regarding conditions (i-1) and (i-2), it is acceptable to set 85 as the upper limit. A lens material exceeding that upper limit costs much. Regarding conditions (j-1) and (j-2), it is acceptable to set 25 as the lower limit. A lens material below that lower limit again costs much.

Now that the medium possessing anomalous dispersion is introduced in the optical system for correction of secondary spectra, it is important to enhance the effect of that medium.

The introduction of the medium into the positive lens element, to which a medium having especially high anomalous dispersibility is easily applied, is effective. The stronger the power of the positive lens element, the greater that effect becomes.

Thus, it is desired that any of the positive lens elements included in the positive lens group A satisfy the following condition (k).

$$0.00<\Phi p \cdot (\Delta\theta_{gF})p \cdot L<0.1 \tag{k}$$

Here $\Phi p$ is the refracting power in air of any positive lens element included in the positive lens group, $(\Delta\theta_{gF})p$ is the anomalous dispersibility of a medium forming the positive lens element, and L is the diagonal length in mm of an effective image pickup area of the image pickup device. It is here noted that the image pickup device is used on such an assumption as to include an angle of view of 55° or greater at the wide-angle end of the optical system.

As the lower limit of 0.000 to condition (k) is not reached, it is impossible to make full correction of chromatic aberrations due to secondary spectra. Even when a medium occurring in nature and exceeding the upper limit of 0.1 is used, the power of the positive lens element becomes too strong, often giving rise to chromatic aberrations of spherical aberrations.

More preferably, $$0.002<\Phi p \cdot (\Delta\theta_{gF})p \cdot L<0.07 \tag{k)'}$$

Most preferably, $$0.004<\Phi p \cdot (\Delta\theta_{gF})p \cdot L<0.05 \tag{k)''}$$

It is acceptable that only the upper or lower limit to condition (k) is changed to the upper or lower limit to condition (k)' or (k)".

For any of the negative lens elements included in the positive lens group A, on the other hand, it is desired to satisfy the following condition (l):

$$0.000<\Phi n \cdot (\Delta\theta_{gF})n \cdot L<0.03 \tag{l}$$

Here $\Phi n$ is the refracting power in air of any of the negative lens elements included in the positive lens group, $(\Delta\theta_{gF})n$ is the anomalous dispersibility of a medium forming the negative lens element, and L is the diagonal length in mm of an effective image pickup area of the image pickup device. It is here noted that the image pickup device is used on such an assumption as to include an angle of view of 55° or greater at the wide-angle end of the optical system.

As the upper limit of 0.03 to condition (l) is exceeded, it is impossible to make full correction of chromatic aberrations due to secondary spectra. Even when a medium occurring in nature and falling short of the lower limit of 0.000 is used, the power of the negative lens element becomes too strong, often giving rise to chromatic aberrations of spherical aberrations.

More preferably, $$0.001<\Phi n \cdot (\Delta\theta_{gF})n \cdot L<0.02 \tag{l)'}$$

Most preferably, $$0.002<\Phi n \cdot (\Delta\theta_{gF})n \cdot L<0.01 \tag{l)''}$$

It is acceptable that only the upper or lower limit to condition (1) is changed to the upper or lower limit to condition (1)' or (1)".

To reduce chromatic blurring, it is important just only to make correction of higher-order longitudinal chromatic aberrations and chromatic aberrations of magnification but also to make correction for chromatic spherical aberration, chromatic coma, etc. Although the addition of power to each lens element having effective anomalous dispersibility is favorable for correction of secondary spectra, yet it often causes chromatic spherical aberration and chromatic coma to become worse. This is particularly true for a negative lens element having excessive power.

It is thus preferable to satisfy the following condition (m).

$$-2.8<(\Phi C1n+\Phi C2n) \cdot L<-0.6 \tag{m}$$

Here $\Phi C1n$ is the refracting power in air of the negative lens element in the doublet component of the two doublet components, which component is located on the object side of the positive lens group, $\Phi C2n$ is the refracting power in air of the negative lens element in the doublet component of the two doublet components, which component is located on the image side of the positive lens group, and L is the diagonal length in mm of an effective image pickup area of the image pickup device.

Falling short of the lower limit of −2.8 to condition (m) makes chromatic spherical aberration and chromatic coma likely to occur, and exceeding the upper limit of −0.6 makes correction of chromatic aberrations generally insufficient.

More preferably, $$-2.4<(\Phi C1n+\Phi C2n) \cdot L<-0.8 \tag{m)'}$$

Most preferably, $$-2.0<(\Phi C1n+\Phi C2n) \cdot L<-1.0 \tag{m)''}$$

It is acceptable that only the upper or lower limit to condition (m) is changed to the upper or lower limit to condition (m)' or (m)".

The Abbe number of a medium having anomalous dispersibility effective for a negative lens tends to become too large for the negative lens, and hence that medium tends to have power upon dichroic achromatization.

It is thus desired to satisfy the following conditions (o) and (p) separately or simultaneously.

$$-20 < (v_d)C1p - (v_d)C1n < 50 \quad (o)$$

$$20 < (v_d)C2p - (v_d)C2n < 70 \quad (p)$$

Here $(v_d)C1p$ is the Abbe number on a d-line basis of a medium forming the positive lens element in the doublet component of the two doublet components, which component is located on the object side of said positive lens group, $(v_d)C2p$ is the Abbe number on a d-line basis of a medium forming the positive lens element in the doublet component of the two doublet components, which component is located on the image side of said positive lens group, $(v_d)C1n$ is the Abbe number on a d-line basis of a medium forming the negative lens element in the doublet component of the two doublet components, which component is located on the object side of said positive lens group, and $(v_d)C2n$ is the Abbe number on a d-line basis of a medium forming the negative lens element in the doublet component of the two doublet components, which component is located on the image side of said positive lens group, By the way, when the lens group A is composed of a positive lens component and a negative lens component, it is easy to make well-balanced correction for chromatic aberration of magnification by providing a suitable air separation between both lens components on the optical axis. That is, $$0.01 < dA/L < 0.06 \quad (q)$$

where dA is the air separation on the optical axis of the zoom lens between two doublet components in the positive lens group, and L is the diagonal length in mm of an effective image pickup area of the image pickup device.

As the lower limit of 0.01 to condition (q) is not reached, it is difficult to keep correction of chromatic aberration of magnification in balance all over the zooming zone, and the upper limit of 0.06 is exceeded, the sensitivity of both components to relative decentration tends to become high.

More preferably, $$0.012 < dA/L < 0.05 \quad (q)'$$

Most preferably, $$0.014 < dA/L < 0.04 \quad (q)''$$

It is acceptable to change only the upper or lower limit to condition (q) to the upper or lower limit to condition (q)' or (q)''.

If the cementing surface in the doublet component of the two doublet components in the positive lens group, which component is located on the image side thereof, satisfies the following condition (5), then chromatic aberrations can be well reduced.

$$-0.4 < L/R_{C2C} < 1.2 \quad (5)$$

Here $R_{C2C}$ is the axial radius of curvature of the cementing surface in the doublet component of the two doublet components in the positive lens group, which component is located on the image side thereof, and L is the diagonal length in mm of an effective image pickup area of the image pickup device.

Falling short of the lower limit of −0.4 to this condition is not preferred because longitudinal aberrations of short wavelength rays passing through the rim of the lens system tend to assume a large positive value and so chromatic blurring tends to occur at the edge site of a subject with a large brightness difference. As the upper limit of 1.2 is exceeded, both longitudinal chromatic aberration and chromatic aberration of magnification are likely to remain undercorrected. However, it is understood that when the zoom lens of the invention is used with an image pickup device in which the diagonal length of its effective image pickup area is represented by L, images can be picked up at an angle of view of 55° or greater.

More preferably, $$-0.2 < L/R_{C2C} < 0.9 \quad (5)'$$

Most preferably, $$0 < L/R_{C2C} < 0.6 \quad (5)''$$

When the lens group (the first lens group) located nearest to the object side of the lens system is a positive lens group, it is preferable to satisfy the following condition (r) regarding the amount of zooming movement of the lens group A, because it is easy to reduce fluctuations of coma and astigmatism with zooming.

$$-0.05 < mST/mWS < 0.15 \quad (r)$$

Here, on condition that the direction of movement of the positive lens group is positive on the image side, mWS is the amount of movement of the positive lens group from the wide-angle end to an intermediate focal length state, and mST is the amount of movement of the positive lens group from the intermediate focal length state to the telephoto end. The "intermediate focal length state" used herein is understood to refer to a state where the intermediate focal length can be defined by the geometric mean of the focal length at the wide-angle end and the focal length at the telephoto end. It is here noted that the lens group A does not move along the optical axis of the lens system during focusing.

Generally in a zoom lens of the type comprising, in order from its object side, a first lens group having positive refracting power, a second lens group having negative refracting power and at least one subsequent lens group having positive refracting power, the amount of zooming movement of the second lens group tends to become large especially on the wide-angle side upon zooming from the wide-angle end to the telephoto end. It is thus preferable to use most of the overall amount of movement of the lens group A (the positive lens group) for multiplication on the wide-angle side, because fluctuations of aberrations in association with fluctuations of meridional field curvature are reduced.

As the upper limit of 0.15 to condition (r) is exceeded, fluctuations of meridional field curvature on the wide-angle side tend to become large, and as the lower limit of −0.05 is not reached, the effect of the lens group A on multiplication is not expectable.

More preferably, $$-0.03 < mST/mWS < 0.12 \quad (r)'$$

Most preferably, $$-0.01 < mST/mWS < 0.1 \quad (r)''$$

It is acceptable to change only the upper or lower limit to condition (r) to the upper or lower limit to condition (r)' or (r)''.

When the group located nearest to the object side (the first lens group) has positive refracting power and the second lens group has negative refracting power, the zoom lens of the invention is characterized by having a high zoom ratio. To reduce and stabilize fluctuations of meridional field curvature in particular all over the zooming zone, the construction of the second lens group is of importance. Regarding the negative lens element located nearest to the object side of the second lens group, which negative lens element has the highest off-axis ray within the second lens group and has strong power, it is thus preferable to satisfy the following condition (s).

$$1.83 < n_{21} < 2.01 \tag{s}$$

Here $n_{21}$ is the d-line refractive index of a medium forming the negative lens element.

As the lower limit of 1.83 to condition (s) is not reached, it is difficult to reduce and stabilize fluctuations of meridional field curvature, and a medium exceeding the upper limit of 2.01 does not occur in nature.

More preferably, $$1.84 < n_{21} < 2.01 \tag{s'}$$

Most preferably, $$1.85 < n_{21} < 2.01 \tag{s''}$$

It is acceptable to change only the upper or lower limit to condition (s) to the upper or lower limit to condition (s)' or (s)".

Alternatively, the second lens group should preferably include a doublet component consisting of, in order from its object side, a negative lens element and a positive lens element, and satisfy the following condition (t).

$$0.25 < n_{cp} - n_{en} < 0.55 \tag{t}$$

Here $n_{cp}$ and $n_{en}$ are the d-line refractive indices of media forming the positive lens element and the negative lens element in any of doublet components included in the second lens group, respectively.

As the lower limit of 0.25 to condition (t) is not reached, it is difficult to reduce and stabilize fluctuations of meridional field curvature. A medium exceeding the upper limit of 0.55 does not occur in nature.

More preferably, $$0.26 < n_{cp} - n_{en} < 0.55 \tag{t'}$$

Most preferably, $$0.27 < n_{cp} - n_{en} < 0.55 \tag{t''}$$

It is acceptable to change only the upper or lower limit to condition (t) to the upper or lower limit to condition (t)' or (t)".

By the way, in such a telephoto state that the diagonal angle of view all over the effective screen is below 10°, chromatic blurring due to the influence of secondary spectra occurs predominantly. It is preferable to use a vitreous material having anomalous dispersiblity for a lens having a particularly high axial ray in a telephoto state and large refracting power because that lens can be greatly corrected for chromatic blurring. It is thus preferable to satisfy the following condition (u) regarding at least one positive lens element in the first lens group.

$$0.004 < (\Delta\theta_{gF})^* < 0.1 \tag{u}$$

Here $(\Delta\theta_{gF})^*$ is the anomalous dispersibility of any positive lens element in the first lens group.

Falling short of the lower limit of 0.004 to condition (u) is not preferred because chromatic aberrations (both longitudinal chromatic aberration and chromatic aberration of magnification) due to secondary spectra in the neighborhood of the telephoto end remain and so the chromatic blurring of an image becomes noticeable. A medium exceeding the upper limit of 0.1 does not occur in nature.

In addition, it is desired to satisfy the following condition (v) regarding another positive lens element in the first lens group.

$$0.000 < (\Delta\theta_{gF})^{**} < 0.1 \tag{v}$$

Here $\Delta\theta_{gF})^{**}$ is the anomalous dispersibility of the positive lens element in the first lens group, which is different from the aforesaid any positive lens element.

As the lower limit of 0.000 to condition (v) is not reached, removal of chromatic aberrations (both longitudinal chromatic aberration and chromatic aberration of magnification) due to secondary spectra in the vicinity of the telephoto end becomes insufficient and so the chromatic blurring of an image remains. A medium exceeding the upper limit of 0.1 does not occur in nature.

It is particularly preferred to use the aforesaid medium for the lens element that has the greatest refracting power among the first lens group. Usually, the first lens group is often composed of three lens elements, i.e., a negative lens element, a positive lens element and a positive lens element, with the middle positive lens element having the greatest refracting power.

More preferably, $$0.01 < (\Delta\theta_{gF})^* < 0.08 \tag{u'}$$

Most preferably, $$0.02 < (\Delta\theta_{gF})^* < 0.06 \tag{u''}$$

Regarding condition (v), too, it is more preferable that $$0.0020 < (\Delta\theta_{gF})^{**} < 0.08 \tag{v'}$$

Most preferably, $$0.0040 < (\Delta\theta_{gF})^{**} < 0.06 \tag{v''}$$

It is acceptable that only the upper or lower limits to conditions (u) and (v) are changed to the upper or lower limits to conditions (u)', (v)' or (u)", (v)".

To reduce and stabilize fluctuations of meridional field curvature in particular all over the zooming zone, the lens group located nearest to the image side of the lens system is provided with a lens element both surfaces of which are formed of aspherc surfaces, and which satisfies the following condition (w). It is noted that for focusing, the lens group located nearest to the image side moves on the optical axis of the lens system.

$$-0.05 < (AspRR - AspRF)/L < 0 \tag{w}$$

Here

AspRF is the amount of axial displacement of the object side-surface of the lens component having aspheric surfaces on both sides with respect to a spherical surface having an axial radius of curvature, as measured at a height of 0.4 L from the optical axis, AspRR is the amount of axial displacement of the image side-surface of the lens component having aspheric surfaces on both sides with respect to a spherical surface having an axial radius of curvature, as measured at a height of 0.4 L from the optical axis, and L is the diagonal length in mm of an effective image pickup area of the image pickup device. It is here noted that when that lens element moves toward the object side, the amount of displacement takes on a negative value. Referring to FIG. 26, the "amount of displacement of an aspheric surface" used herein is understood to mean the amount of displacement of that aspheric surface with respect to a spherical surface (reference surface) having a radius of curvature, r, on the optical axis of that aspheric surface, as measured at a height of 0.4 L from the optical axis, where L is the diagonal length of the effective image pickup area of the image pickup device.

As the upper limit of 0 to condition (w) is exceeded, it is difficult to reduce and stabilize fluctuations of meridional field curvature, and as the lower limit of −0.05 is not reached, it is difficult to reduce and stabilize fluctuations of meridional field curvature upon focusing.

More preferably, $$-0.03 < (AspRR - AspRF)/L < 0 \quad (w)'$$

Most preferably, $$-0.01 < (AspRR - AspRF)/L < 0 \quad (w)''$$

It is acceptable that only the upper or lower limit to condition (w) is changed to the upper or lower limit to condition (w)' or (w)".

As explained so far, chromatic aberrations become a problem when it is required to make full use of the performance of a zoom lens having a high zoom ratio, a small F-number and a long length while used in combination with an image pickup device having much more pixels. The zoom lens having a high zoom ratio is herein represented by one that satisfies the following conditions (x) and (y) provided that the third and subsequent lens groups are collectively called the rear lens group.

$$1.2 \leq -\beta 2T \leq 10 \quad (x)$$

$$0.1 \leq -\beta RT \leq 0.6 \quad (y)$$

Here β2T is the magnification at the telephoto end of the negative lens group upon focused on an object point at infinity, and βRT is the magnification at the telephoto end of all lens groups located on the image side with respect to the negative lens group upon focused on an object point at infinity.

Condition (x) provides a definition of the magnification at the telephoto end of the second lens group when a certain or higher zoom ratio is obtained. As the upper limit of 10 is exceeded, it is difficult to ensure a certain angle of view on the wide-angle end, and as the lower limit of 1.2 is not reached, the zooming effect tends to become slender relative to the amount of movement of the second lens group.

Condition (y) provides a definition of the magnification of the rear lens group at the telephoto end upon focused on an object point at infinity. In a digital camera using an image pickup device by far much reduced in size than that used with a 35-mm film size camera, the focal length of an optical system is very short. The principal point of the digital camera system is located at a position considerably near to the image side of the optical system. In other words, there is no option but to use an extremely asymmetric refracting power profile, leading readily to the occurrence of chromatic aberration of magnification. The present invention is applicable only to such digital cameras, i.e., to an optical system coming within the range defined by condition (y).

It is more preferable to satisfy the following conditions (x)' and/or (y)".

$$1.6 \leq -\beta 2T \leq 10 \quad (x)'$$

$$0.15 \leq -\beta RT \leq 0.45 \quad (y)'$$

It is even more preferable to satisfy either one of the following conditions (x)" and (y)", and it is most preferable to satisfy both the following conditions (x)" and (y)".

$$2.0 \leq -\beta 2T \leq 10 \quad (x)''$$

$$0.2 \leq -\beta RT \leq 0.4 \quad (y)''$$

It is acceptable that only the upper or lower limits to conditions (x) and (y) are changed to the upper or lower limits to conditions (x)', (y)' or (x)", (y)".

The "image pickup device having much more pixels" is understood to refer to one that satisfies the following condition (z).

$$2 \times 10^{-2} \leq s \cdot p/L \leq 4 \times 10^{-2} \quad (z)$$

Here p/L satisfies $p/L \leq 4.5 \times 10^{-4}$, s is the actual length in mm of the lens system from the surface located nearest to the object side of the lens system to the image pickup surface as measured at the wide-angle end of the lens system upon focused on an object point at infinity, p is a horizontal pixel pitch in mm, and L is the diagonal length in mm of an effective image pickup area of the image pickup device.

Condition (z) provides a definition of the optical length and the number of pixels at the wide-angle end upon focused on an object point at infinity. The image-formation capability commensurate with a multiplicity of pixels may be ensured by increasing the size of the optical system; however, it does not make sense for a still camera. Exceeding the upper limit of $4 \times 10^{-2}$ to condition (z) renders it impossible to reduce the size of the camera. As the lower limit of $2 \times 10^{-2}$ is not reached, it is difficult to make correction for aberrations inclusive of chromatic blurring and, hence, to ensure image quality enough for the still camera, although size reductions may be achievable.

According to the invention, it is possible to provide an electronic image pickup apparatus comprising a zoom lens composed of, in order from its object side, a first lens group having positive refracting power and comprising a negative lens element, a second lens group having negative refracting power and comprising a positive lens element and a rear lens group comprising at least one lens group that is movable for zooming, an optical element formed only of a substantially planar surface and an electronic image pickup device, wherein the optical element formed only of a substantially planar surface is an optical filter that simultaneously satisfies transmission properties defined by the following conditions (α) and (β). For the optical system, this arrangement is essentially required to obtain a high zoom ratio.

The first lens group, because of being a converging system, has an action to lower axial light rays and an action to provide a finite object point with respect to the second lens group, so that the second lens group can be set up as a diverging system having strong refracting power thereby obtaining a great zooming action in a reduced amount of movement. In addition, the second lens group has an enhanced ability to correct aberrations while it is less susceptible to fluctuations of aberrations with zooming, and is easily applied to an image pickup device including as many pixels as 2,000,000 or greater.

As already described, however, the gravest problem with such a high-zoom-ratio zoom lens is chromatic aberrations due to secondary spectra, which cannot be corrected with an ordinary vitreous material. If a vitreous material having specific dispersion properties (anomalous dispersibility) is used as in the invention, then those chromatic aberrations may be corrected to some, if not sufficient, degrees. Still, with decreasing size, for instance, the refracting powers of the first, second and rear lens groups become too strong to make correction for longitudinal chromatic aberration and chromatic aberration of magnification on the telephoto side in particular and chromatic aberration of magnification on the wide-angle side, and chromatic blurring becomes unacceptable. Referring to an optical medium having general properties, these chromatic aberrations start increasing at a wavelength lower than 450 nm in particular, leading to remarkably purple blurring at 400 nm to 430 nm, to which an image pickup device shows high spectral sensitivity. On the other hand, the (bright-field) specific visual sensitivity of the human eyes is slight at 430 nm or lower.

Accordingly, if an absorber or reflector is inserted on the optical path, which is designed such that the ratio of the transmittance ($\tau_{400}$) at 400 nm wavelength to that ($\tau_{550}$) at 550 nm wavelength is less than 0.08 and the ratio of the transmittance ($\tau_{440}$) at 440 nm wavelength to that ($\tau_{550}$) at 550 nm wavelength is greater than 0.4, as defined by the following conditions ($\alpha$) and ($\beta$), it is then possible to considerably reduce noises such as color blurring while the wavelength area necessary for color reproduction (satisfactory color reproduction) is kept intact.

Thus, the coating that can satisfy the transmittance properties of conditions ($\alpha$) and ($\beta$) at the same time can be applied on the interior, or on the image side, of a lens system of the design and construction vulnerable to chromatic blurring, so that the absolute amount of chromatic blurring can largely be reduced without detrimental to color reproducibility.

$$\tau_{400}/\tau_{550} \leq 0.08 \quad (\alpha)$$

$$\tau_{440}/\tau_{550} \geq 0.4 \quad (\beta)$$

Here $\tau_{400}$, $\tau_{440}$, and $\tau_{550}$ is the transmittance at 400 nm, 440 nm, and 550 nm, respectively, of an optical element composed of a substantially planar surface.

More preferably, the following conditions ($\alpha$)' and/or ($\beta$)' should be satisfied.

$$\tau_{400}/\tau_{550} \leq 0.06 \quad (\alpha)'$$

$$\tau_{440}/\tau_{550} \geq 0.5 \quad (\beta)'$$

Even more preferably, the following condition ($\alpha$)" or ($\beta$)" should be satisfied.

$$\tau_{400}/\tau_{550} \leq 0.04 \quad (\alpha)"$$

$$\tau_{440}/\tau_{550} \geq 0.6 \quad (\beta)"$$

Most preferably, both the following condition ($\alpha$)" and ($\beta$)" should be satisfied.

$$\tau_{400}/\tau_{550} \leq 0.04 \quad (\alpha)"$$

$$\tau_{440}/\tau_{550} \geq 0.6 \quad (\beta)"$$

It is acceptable that only the upper or lower limit to conditions ($\alpha$) and ($\beta$) are changed to the upper or lower limits to conditions ($\alpha$)', ($\beta$)' or ($\alpha$)", ($\beta$)".

A problem with a plate form of medium having planar surfaces on both sides or a planar surface coated with a reflector used as the aforesaid absorber is that when the absorber is located at the entrance surface of an optical system almost vertically to the optical path, light of a high-brightness image point once formed on an image pickup device is reentered in a substantially afocal form onto the planar surface and an inverted image point is again formed as a ghost, causing considerable damage to image quality. This is because the image pickup device behaves as a specular reflector. When the absorber takes on a planar form, it must thus be located within an image pickup optical system. Preferably in this case, the absorber should be located on the surface of, or in the vicinity of, an optical low-pass filter. For the absorber having a curved surface like a lens, it is required that the angle of incidence and emergence of an axial marginal light ray at a reflecting surface and a transmitting surface be 1° or greater with respect to the normal.

For a solid-state image pickup device having high sensitivity to an infrared range, a filter that absorbs infrared components is generally located in the neighborhood of the image pickup device. This absorber has a transmittance property of decreasing with a gentle gradient from 550 nm to 700 nm; however, that transmittance does not drop to zero at 700 nm. In the case of an image pickup device using a complementary colors mosaic filter, the transmittance of the filter with respect to magenta, blue and red regions is still low whereas the transmittance of the filter with respect to a green region is still high. For these and other reasons, a hue poor in color reproducibility appears. Thus, a hue of the visible range of 450 nm or lower, which is a main component of chromatic blurring that must originally be deep bluish purple, turns to reddish purple, and so the chromatic blurring becomes more unpleasant.

In the present invention, therefore, a coating that can satisfy the following conditions ($\gamma$) and ($\delta$) at the same time is applied onto one plane (or the other plane when the coating according to the aforesaid conditions is applied) of such an optical element comprising a substantially planar surface as mentioned above, which is located in the interior of, or on the image side of, a lens system of the design and construction vulnerable to chromatic blurring, so that the chromatic blurring hue can be returned back to less noticeable bluish purple that is the original hue.

$$\tau_{600}/\tau_{550} \geq 0.8 \quad (\gamma)$$

$$\tau_{700}/\tau_{550} \leq 0.08 \quad (\delta)$$

Here $\tau_{550}$, $\tau_{600}$, and $\tau_{700}$ is the transmittance at 550 nm, 600 nm, and 700 nm, respectively, of an optical element composed of a substantially planar surface.

It is more preferable to satisfy the following conditions ($\gamma$)' and/or ($\delta$)'.

$$\tau_{600}/\tau_{550} \geq 0.85 \quad (\gamma)'$$

$$\tau_{700}/\tau_{550} \leq 0.05 \quad (\delta)'$$

It is even more preferable to satisfy the following conditions ($\gamma$)" or ($\delta$)".

$$\tau_{600}/\tau_{550} \geq 0.9 \quad (\gamma)"$$

$$\tau_{700}/\tau_{550} \leq 0.03 \quad (\delta)"$$

Most preferably, both conditions (γ)" and (δ)" should be satisfied.

$$\tau_{600}/\tau_{550} \geq 0.9 \qquad (\gamma)''$$

$$\tau_{700}/\tau_{550} \leq 0.03 \qquad (\delta)''$$

It is acceptable that only the upper or lower limit to conditions (γ) and (δ) is changed to the upper or lower limit to conditions (γ)', (δ)' or (γ)", (δ)".

Further size reductions are achievable by setting up the aforesaid rear group with a plurality of lens groups that move separately on the optical axis during zooming. Preferably in this case, at least one of the plurality of lens groups is designed to move monotonously toward the object size upon zooming from the wide-angle end to the telephoto end.

While it is not always required to make correction for secondary spectral components, it is understood that if chromatic aberrations for each wavelength are placed in a well-balanced state as by reducing chromatic aberrations corresponding to 420 nm while chromatic aberrations corresponding to 540 nm and having high spectral sensitivity are slightly sacrificed, it is then possible to render chromatic blurring less noticeable to some extents. However, there are some limitations because this lead to deterioration in resolving power or MTF.

Chromatic aberration of magnification for each wavelength should preferably be corrected in such a way that when the optical system is focused at the wide-angle end on an object point at infinity, g-line chromatic aberration of magnification with respect to d-line<0 at an image height 0.7 time as large as an effective diagonal length, and g-line chromatic aberration of magnification with respect to d-line<h-line chromatic aberration of magnification with respect to d-line and that when the optical system is focused at the telephoto end on an object point at infinity, h-line chromatic aberration of magnification with respect to d-line<C-line chromatic aberration of magnification with respect to d-line<g-line chromatic aberration of magnification with respect to d-line at an image height 0.7 time as large as the effective diagonal length. Here C-line is 656.27 nm, d-line is 587.56 nm, g-line is 435.84 nm, and h-line is 404.66 nm.

To add to this, it is preferable to satisfy the relation:
g-line longitudinal chromatic aberration with respect to d-line<C-line longitudinal chromatic aberration with respect to d-line when the optical system is focused at the telephoto end on an object point at infinity.

Moreover, it is preferable to satisfy the following relations:

g-line longitudinal chromatic aberration with respect to d-line<C-line longitudinal chromatic aberration with respect to d-line g-line longitudinal chromatic aberration with respect to d-line<h-line longitudinal chromatic aberration with respect to d-line when the optical system is focused at the wide-angle end on an object point at infinity.

The optical system of the invention is now explained at great length. The zoom lens of the invention comprises, in order from its object side, a first lens group having positive refracting power and including a negative lens element, a second lens group having negative refracting power and including a positive lens element, a stop, and a third lens group having generally positive refracting power and including two doublet components C1 and C2, each of which is composed of, in order from its object side, a positive lens element and a negative lens element. Subsequent to the third lens group, the zoom lens may comprise a lens group or groups, and the third and subsequent lens groups are all independently movable for the purpose of reducing the length of the zoom lens and the diameter of the first lens group. Especially if the third lens group is moved in such a way that it is located nearer to the object side at the telephoto end rather than at the wide-angle end, the space for zooming movement of the second lens group is reduced and the entrance pupil is located at a shallow position, so that the diameter of the first lens group can be decreased. To make short the length of a partial system from the stop to the rear lens group, the third lens group is composed of two components, that is, in order from its object side, a positive lens component C1 and a negative lens component C2 having a concave surface on its image side. Having aspheric surfaces on both sides, the final lens element is movable on the optical axis for focusing.

Still other objects and advantages of the invention will in part be obvious and will in part be apparent from the specification.

The invention accordingly comprises the features of construction, combinations of elements, and arrangement of parts, which will be exemplified in the construction hereinafter set forth, and the scope of the invention will be indicated in the claims.

DESCRIPTION OF THE PREFERRED EMBODIMENTS

Figure 1A:
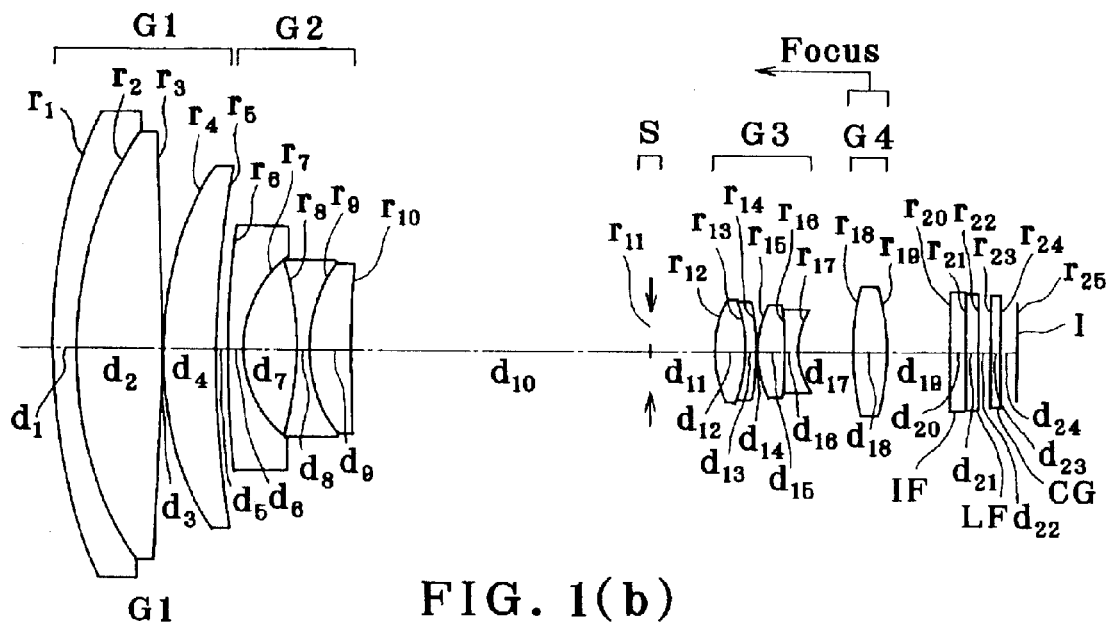
FIGS. 1(a), 1(b) and 1(c) are illustrative in section of the lens arrangement of Example 1 of the zoom lens according to the invention, which is used with an image pickup apparatus, upon focused on an object point at infinity with (a) at the wide-angle end, (b) in the intermediate state and (c) at the telephoto end.

Given below are Examples 1 to 12 of the zoom lens of the invention, which is used with an image pickup apparatus.

FIGS. 1 to 12 are illustrative in section of the lens arrangements of Examples 1 to 12 at the wide-angle end (a), in the intermediate state (b) and at the telephoto end (c) upon focused on an object point at infinity. It is understood that Example 2 and 3 are similar in construction to Example 1, Examples 6, 7, 9 and 10 are similar in construction to Example 5, and Example 8 is similar in construction to Example 4. Throughout FIGS. 1 to 12, the first lens group is indicated by G1, the stop by S, the second lens group by G2, the third lens group by G3, the fourth lens group by G4, the infrared cut absorption filter by IF, the low-pass filter by LF, the cover glass for a CCD that is an electronic image pickup device by CG, and the image plane of CCD by I. It is acceptable to use a transparent plane plate with a near-infrared sharp cut coat applied on its entrance surface or, alternatively, apply a near-infrared sharp cut coat directly to the low-pass filter LF.

In each of Examples 1 to 10, the zoom lens is made up of a first lens group G1 having generally positive refracting power and composed of three lens elements, that is, in order from its object side, a negative, a positive and a positive lens element, a second lens group G2 having generally negative refracting power and composed of three lens elements, that is, a negative, a negative and a positive lens element, wherein the second lens group moves for zooming, a stop S, a third lens group G3 having generally positive refracting power and composed of two components, that is, a lens component C1 having positive refracting power and composed of a doublet consisting of a positive lens element having an aspheric surface and a negative lens element and a meniscus form of lens component C2 having negative refracting power and composed of a doublet consisting of a positive and a negative lens element, wherein the third lens group moves on the object side of the zoom lens upon zooming from the wide-angle end to the telephoto end of the zoom lens, and a fourth lens group G4 composed only of one positive lens element having aspheric surfaces on both sides, wherein the fourth lens group moves along the optical axis of the zoom lens for zooming and moves toward the object side for focusing on a nearby object as well.

In Example 11 or 12, the zoom lens is made up of a first lens group G1 having generally negative refracting power and composed of two lens elements, that is, in order from its object side, a negative and a positive lens element, a stop S, a second lens group G2 having generally positive refracting power and composed of two lens components, that is, a lens component C1 having positive refracting power and composed of a doublet having an aspheric surface and consisting of two lens elements and a meniscus form of lens component C2 having negative refracting power and composed of a doublet having an aspheric surface and consisting of two lens elements, wherein the second lens group moves toward the object side of the zoom lens for zooming, and a third lens group G3 composed only of one positive lens element, wherein the third lens group moves along the optical axis of the zoom lens and moves toward the object side of the zoom lens for focusing on a nearby object point as well.

Figure 1B:
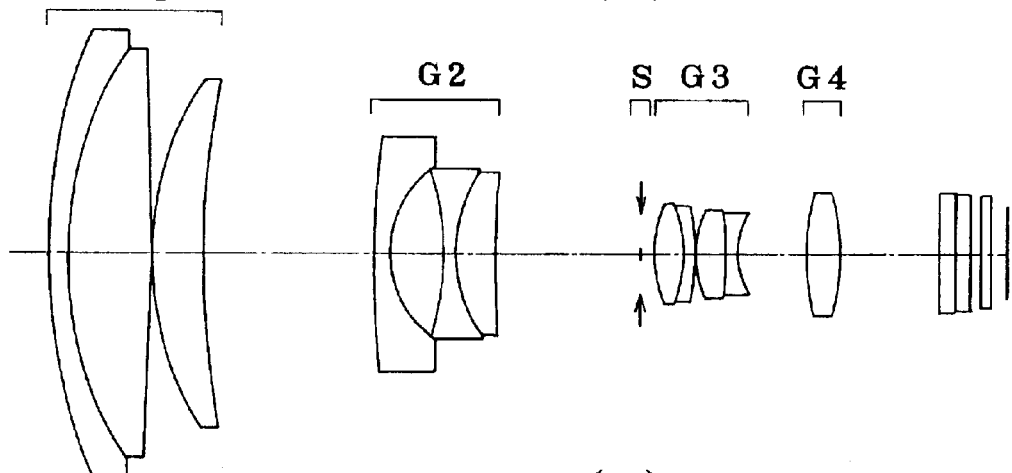
Figure 1C:
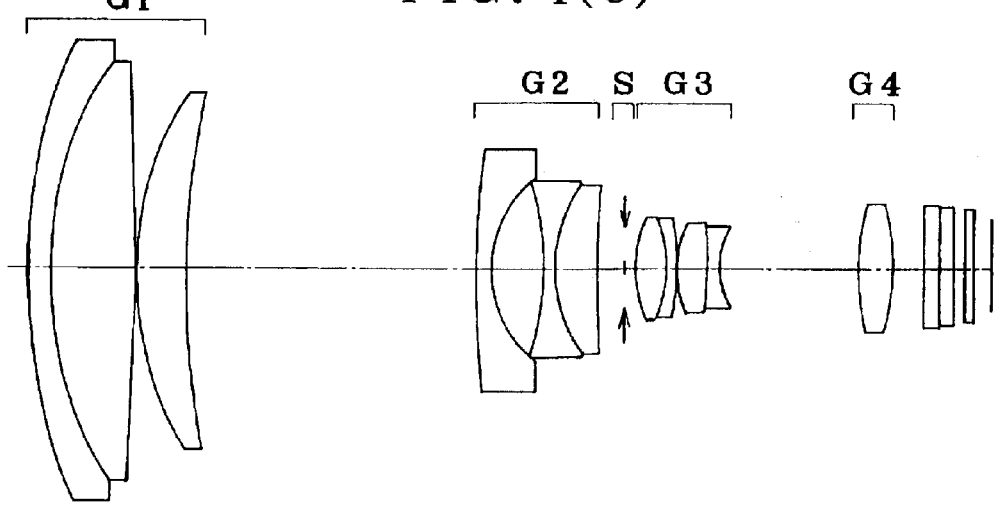
Figure 2A:
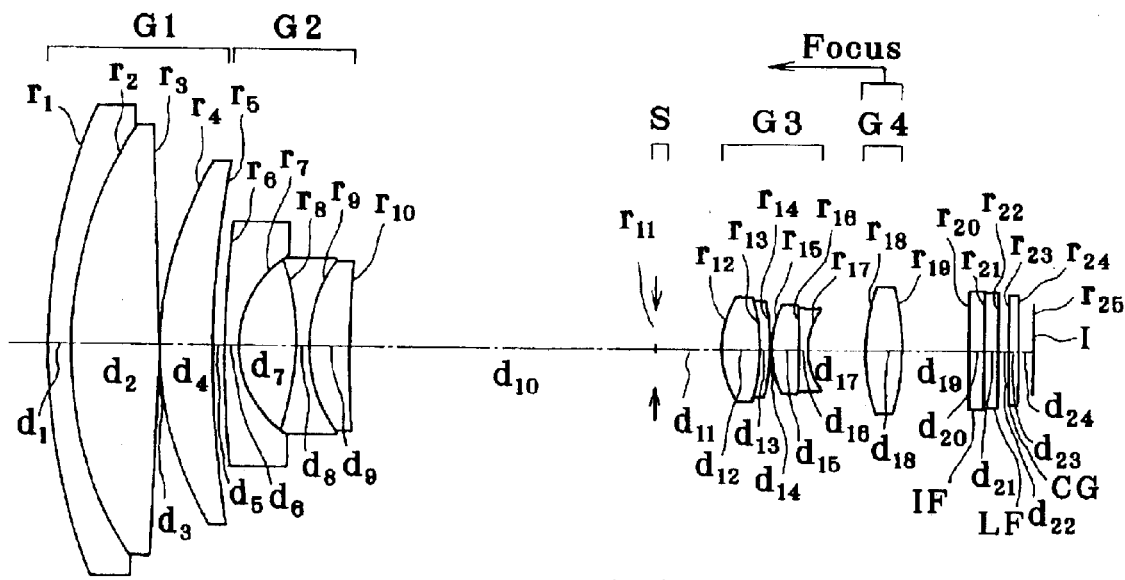
FIGS. 2(a), 2(b) and 2(c) are sectional views of Example 2 of the zoom lens, similar to FIGS. 1(a), 1(b) and 1(c).
Figure 2B:
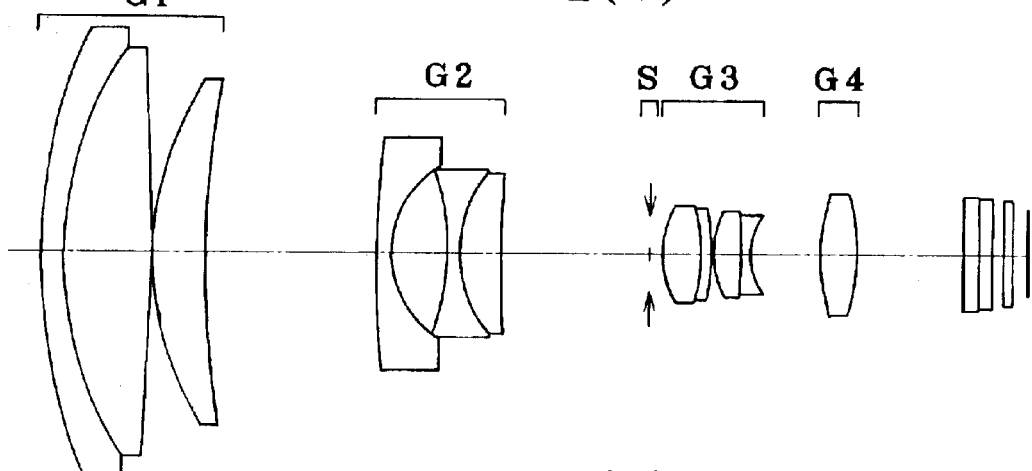
Figure 2C:
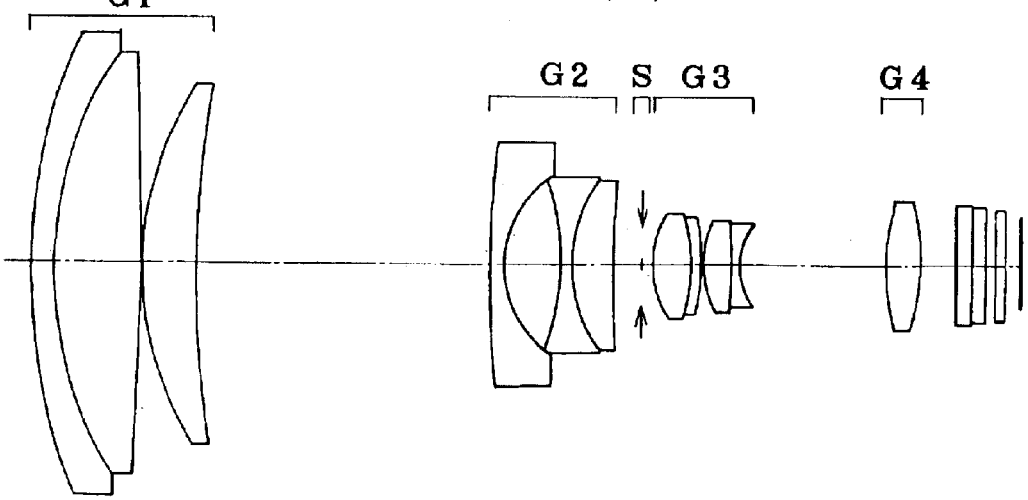
Figure 3A:
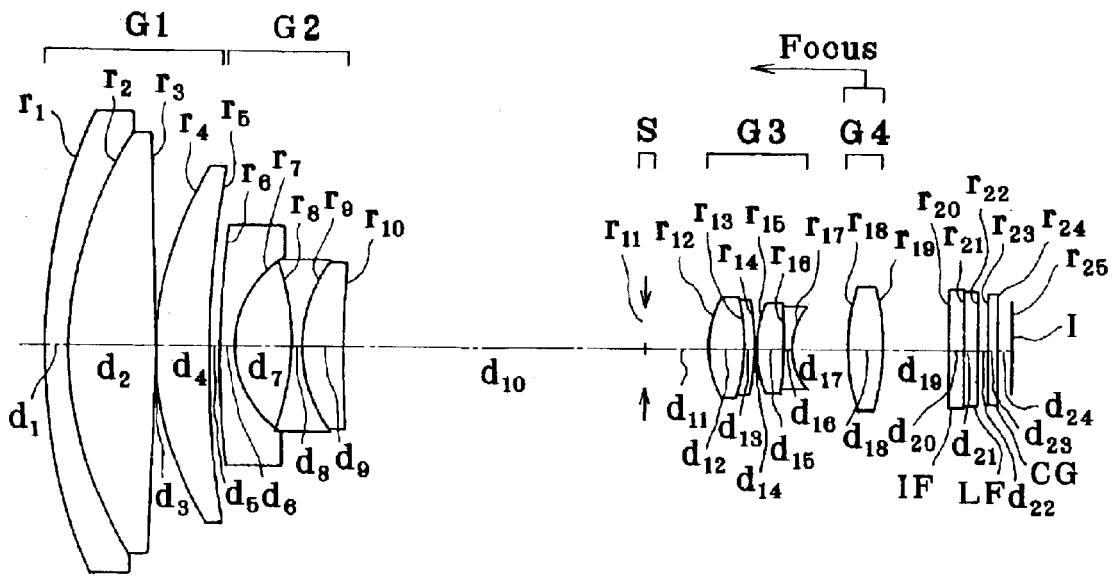
FIGS. 3(a), 3(b) and 3(c) are sectional views of Example 3 of the zoom lens, similar to FIGS. 1(a), 1(b) and 1(c).
Figure 3B:
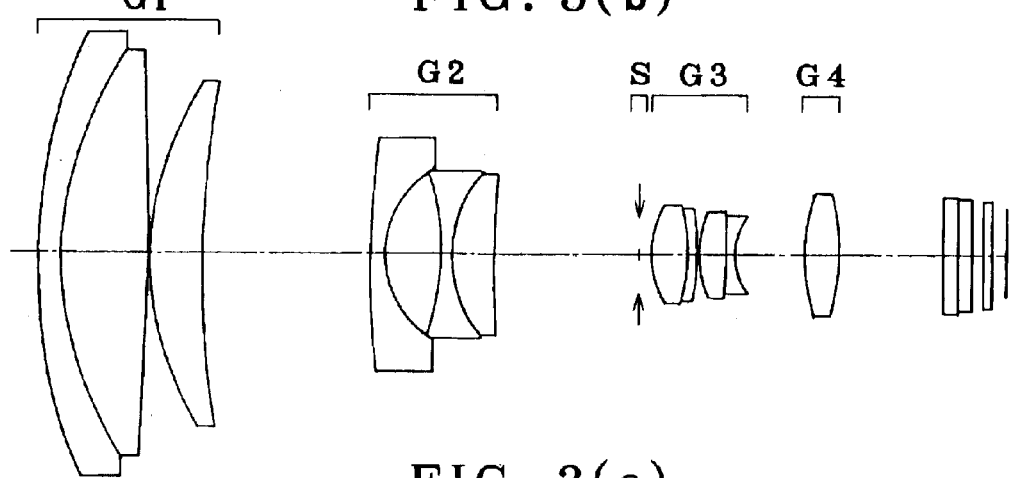
Figure 3C:
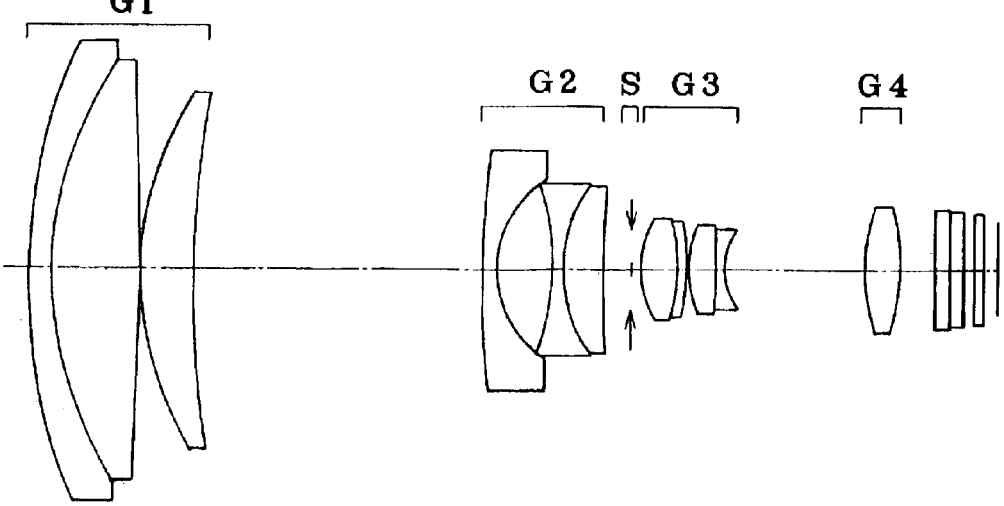

In each of Examples 1 to 3, as shown in FIGS. 1 to 3, the zoom lens is made up of a first lens group G1 having positive refracting power and composed of a doublet consisting of a negative meniscus lens element convex on its object side and a double-concave negative lens element and a positive meniscus lens element convex on its object side, a second lens group G2 having positive refracting power and composed of a negative meniscus lens element convex on its object side and a doublet consisting of a double-concave negative lens element and a positive meniscus lens element convex on its object side, an aperture stop S, a third lens group G3 having negative refracting power and composed of a doublet (C1) having positive refracting power and consisting of a double-convex positive lens element and a negative meniscus lens element convex on its image side and a doublet (C2) having negative refracting power and consisting of a double-convex positive lens element and a double-concave negative lens element, and a fourth lens group G4 having positive refracting power and composed only of one double-convex positive lens element. Upon zooming from the wide-angle end to the telephoto end of the zoom lens, the second lens group G2 moves toward the image plane side of the zoom lens, the third lens group G3 moves toward the object side, and the fourth lens group G4 moves toward the object side in a convex locus and is positioned nearer to the image plane side at the telephoto end than at the wide-angle end. For focusing on a nearby subject, the fourth lens group G4 moves toward the object side.

Three aspheric surfaces are used, one at the surface located nearest to the object side in the third lens group G3, and two at both surfaces of the single lens element in the fourth lens group G4.

Figure 4A:
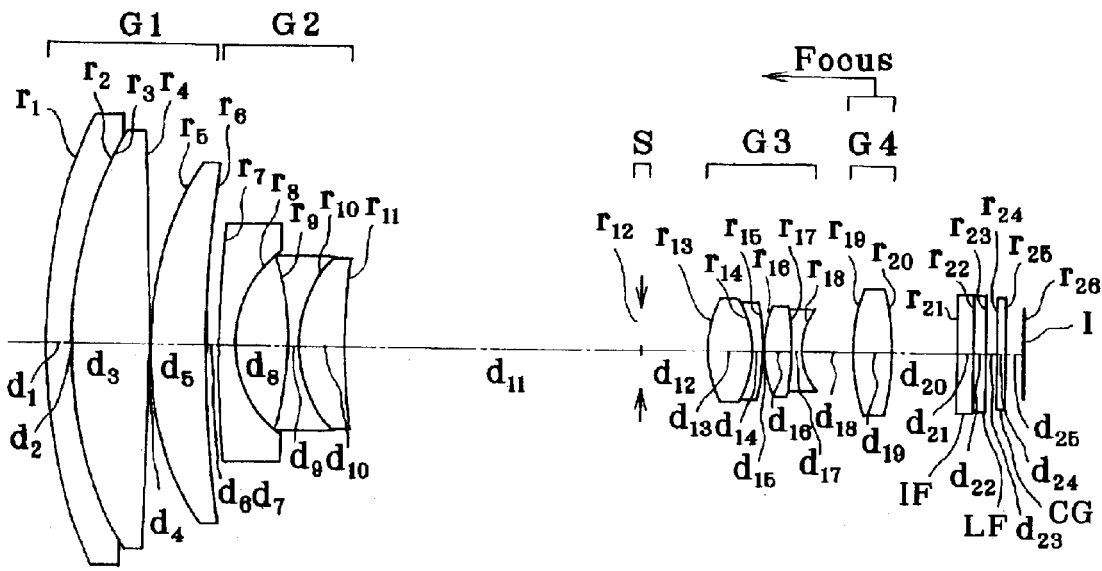
FIGS. 4(a), 4(b) and 4(c) are sectional views of Example 4 of the zoom lens, similar to FIGS. 1(a), 1(b) and 1(c).
Figure 4B:
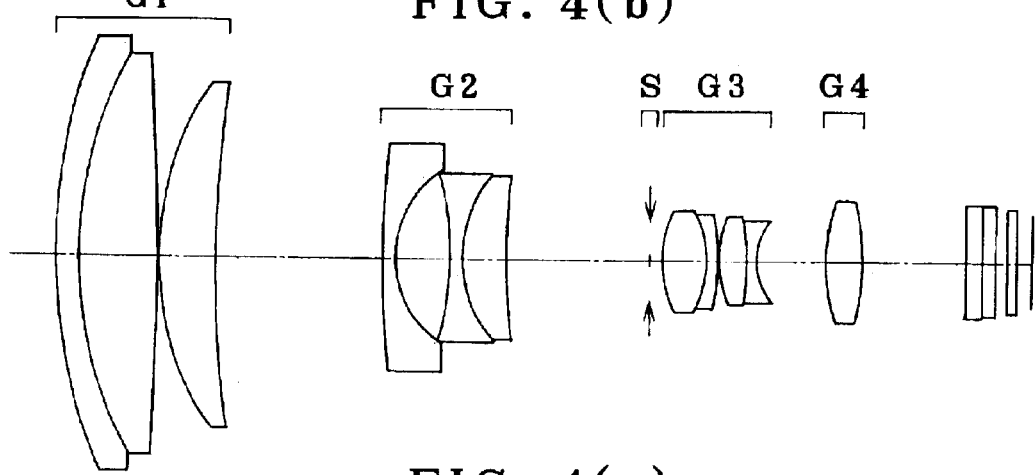
Figure 4C:
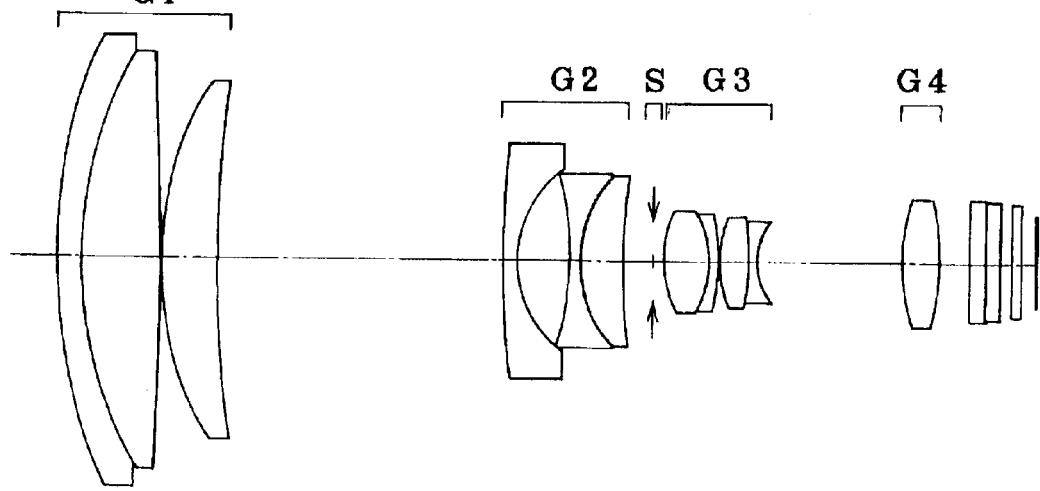
Figure 5A:
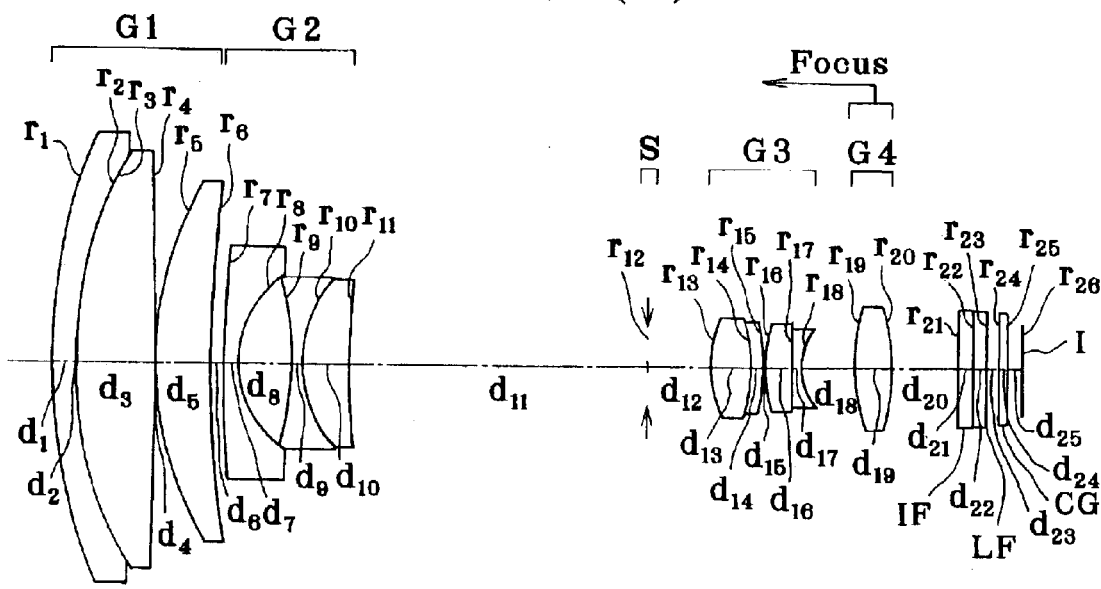
FIGS. 5(a), 5(b) and 5(c) are sectional views of Example 5 of the zoom lens, similar to FIGS. 1(a), 1(b) and 1(c).
Figure 5B:
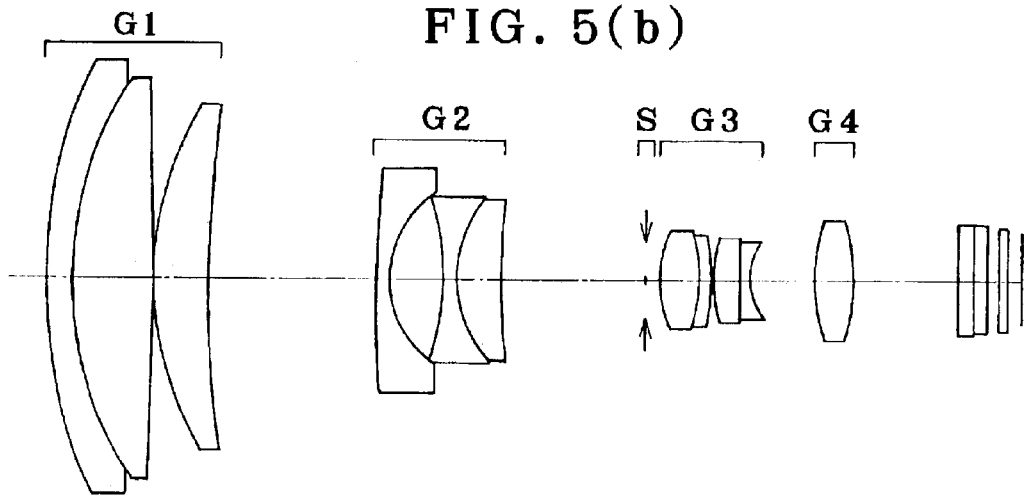
Figure 5C:
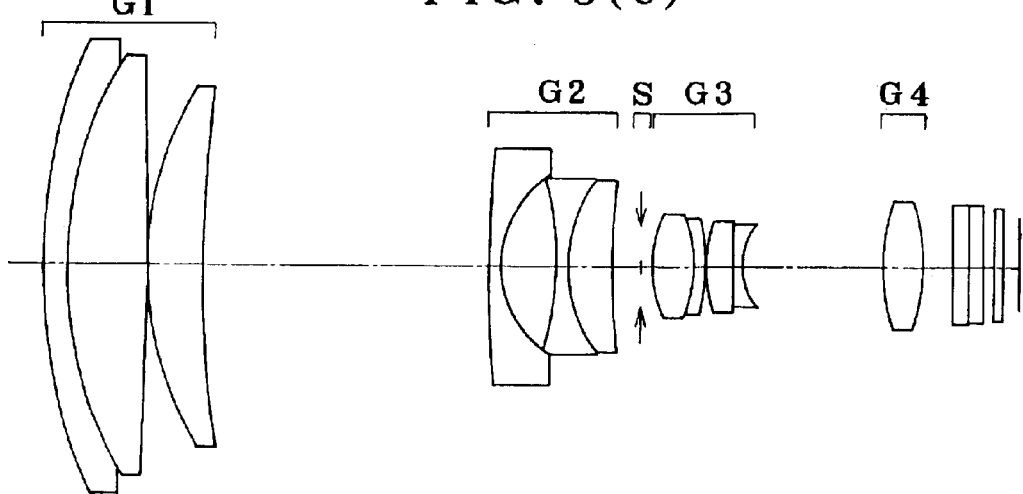
Figure 6A:
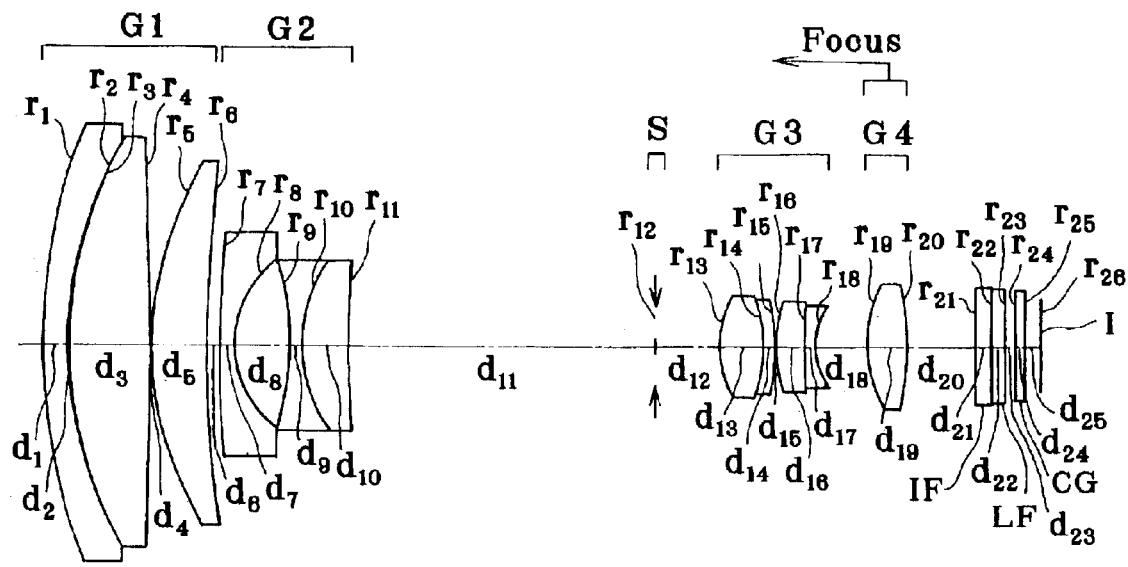
FIGS. 6(a), 6(b) and 6(c) are sectional views of Example 6 of the zoom lens, similar to FIGS. 1(a), 1(b) and 1(c).
Figure 6B:
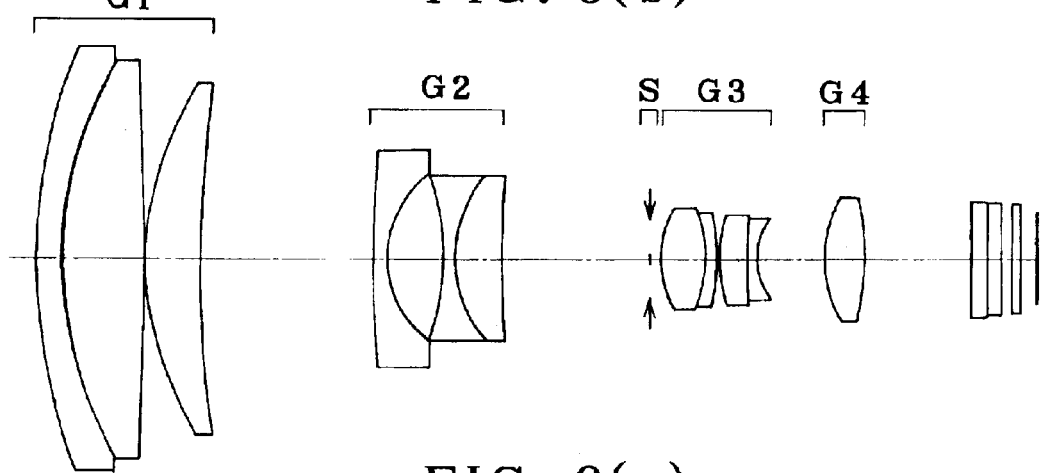
Figure 6C:
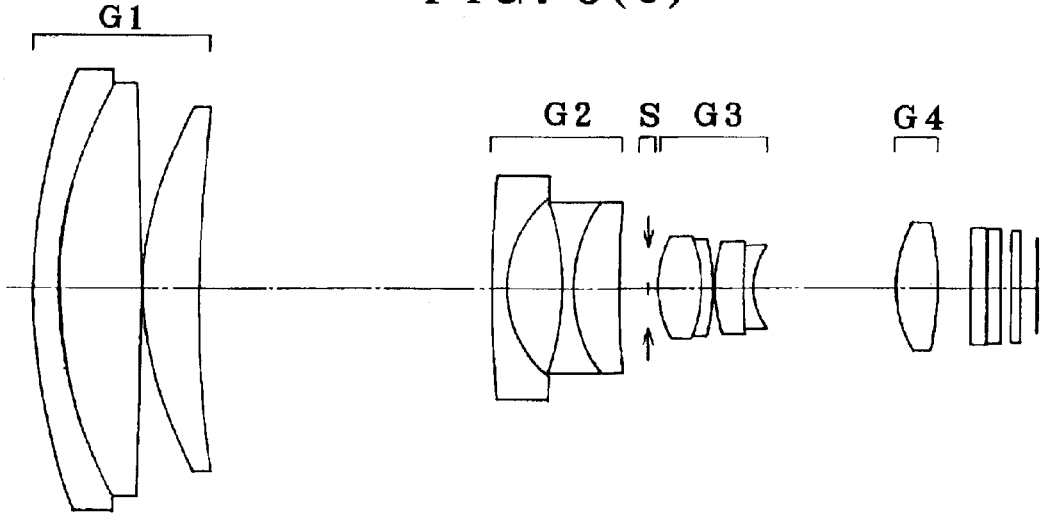
Figure 7A:
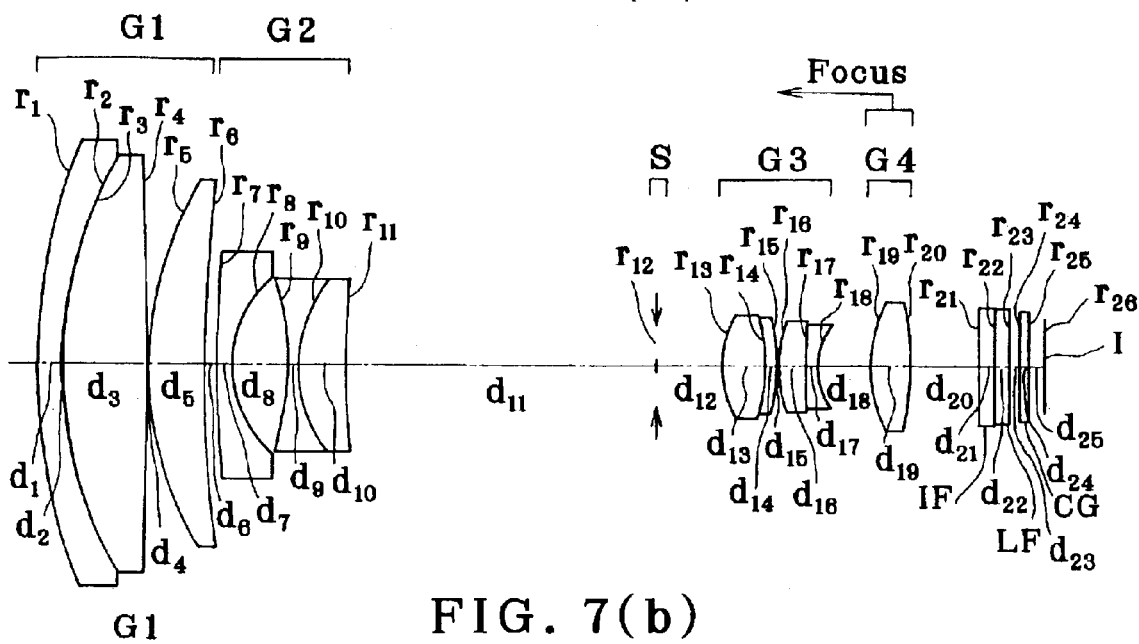
FIGS. 7(a), 7(b) and 7(c) are sectional views of Example 7 of the zoom lens, similar to FIGS. 1(a), 1(b) and 1(c).
Figure 7B:
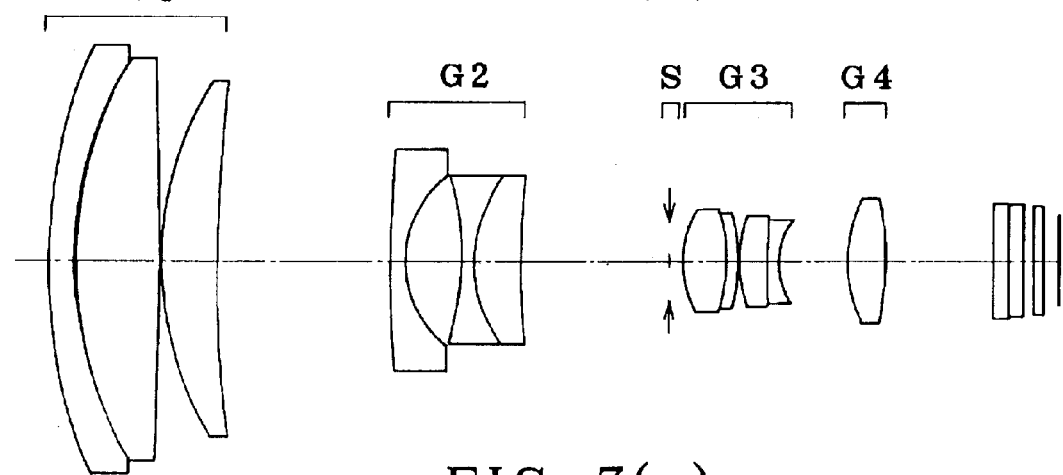
Figure 7C:
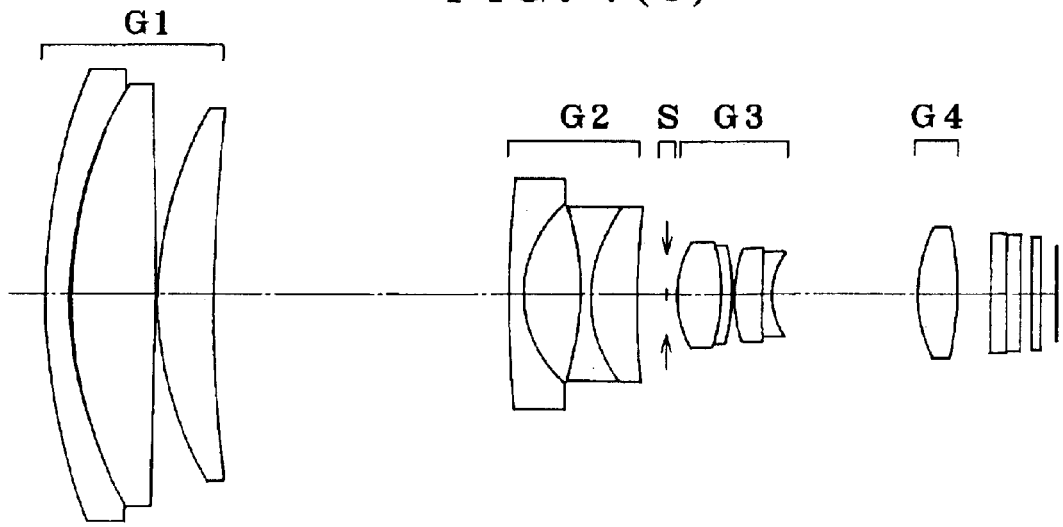
Figure 8A:
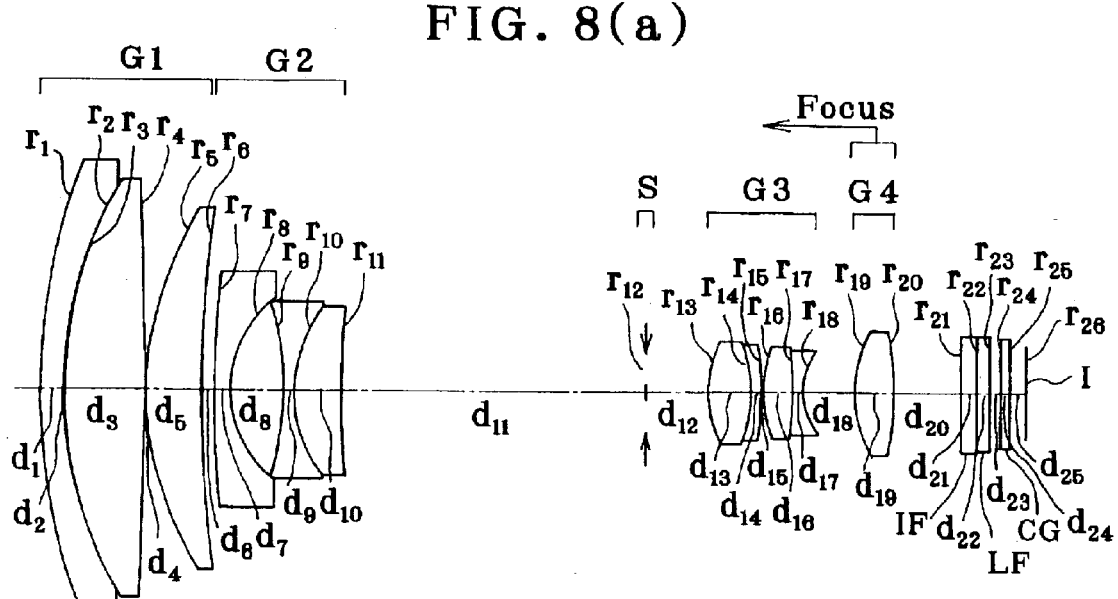
FIGS. 8(a), 8(b) and 8(c) are sectional views of Example 8 of the zoom lens, similar to FIGS. 1(a), 1(b) and 1(c).
Figure 8B:
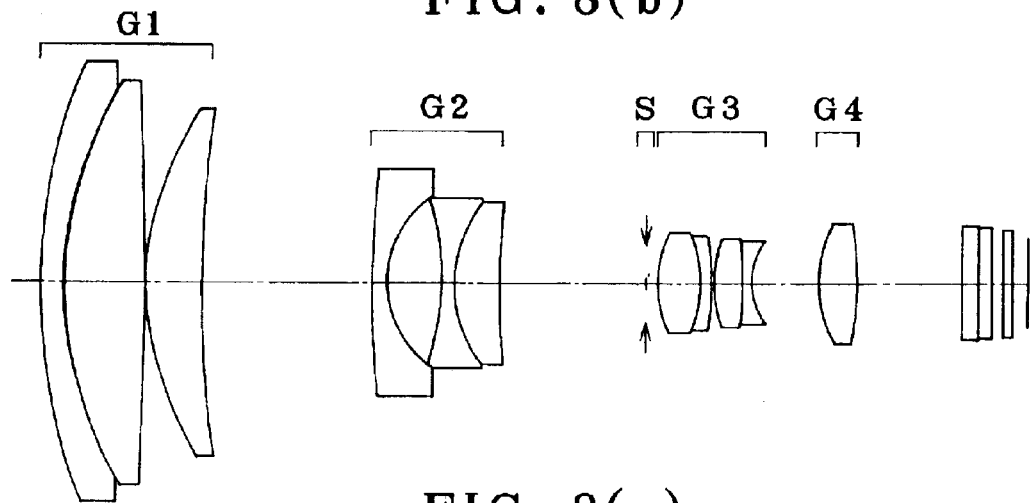
Figure 8C:
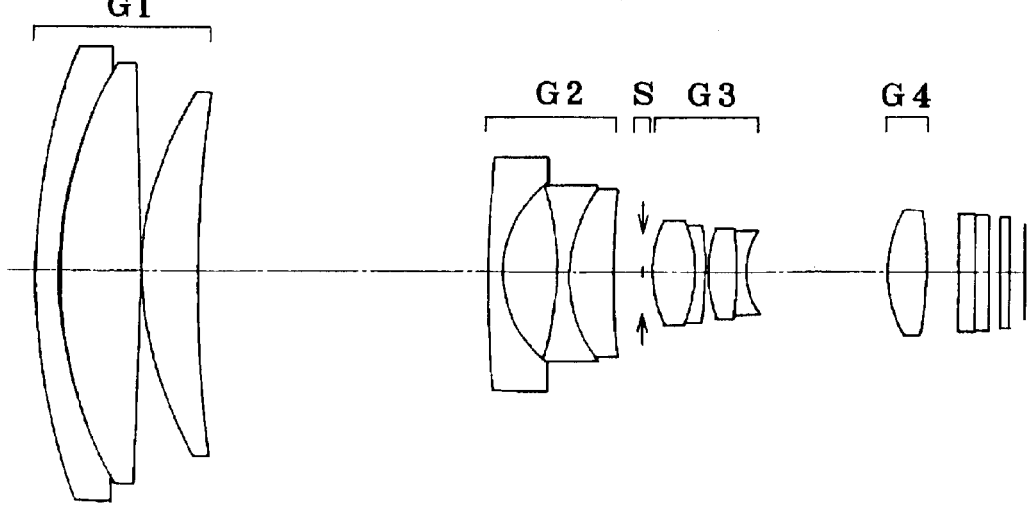
Figure 9A:
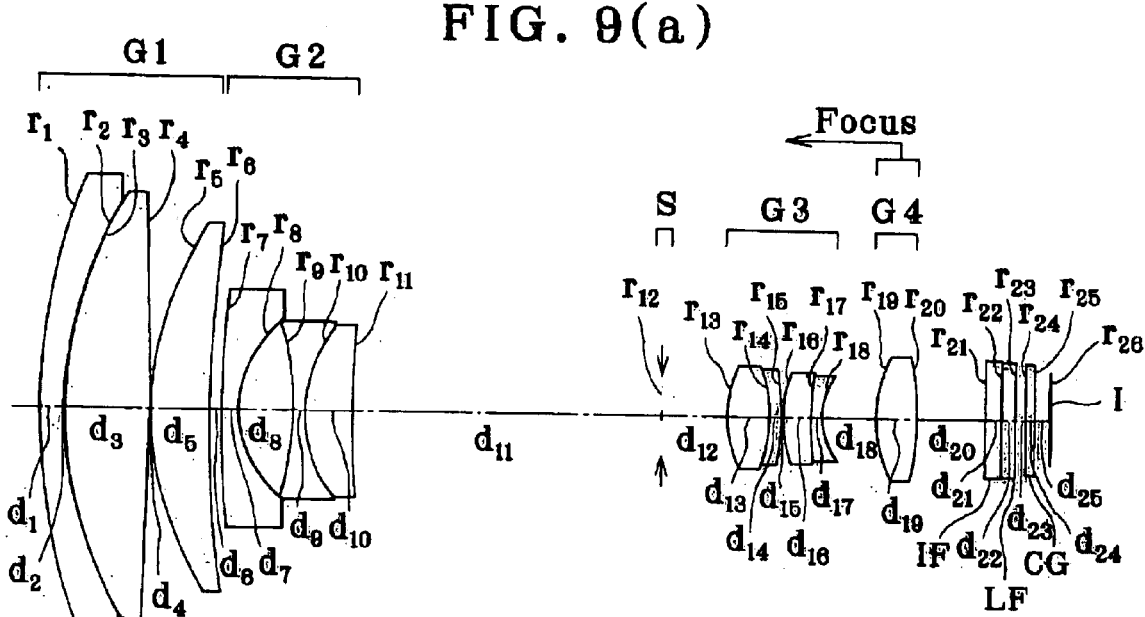
FIGS. 9(a), 9(b) and 9(c) are sectional views of Example 9 of the zoom lens, similar to FIGS. 1(a), 1(b) and 1(c).
Figure 9B:
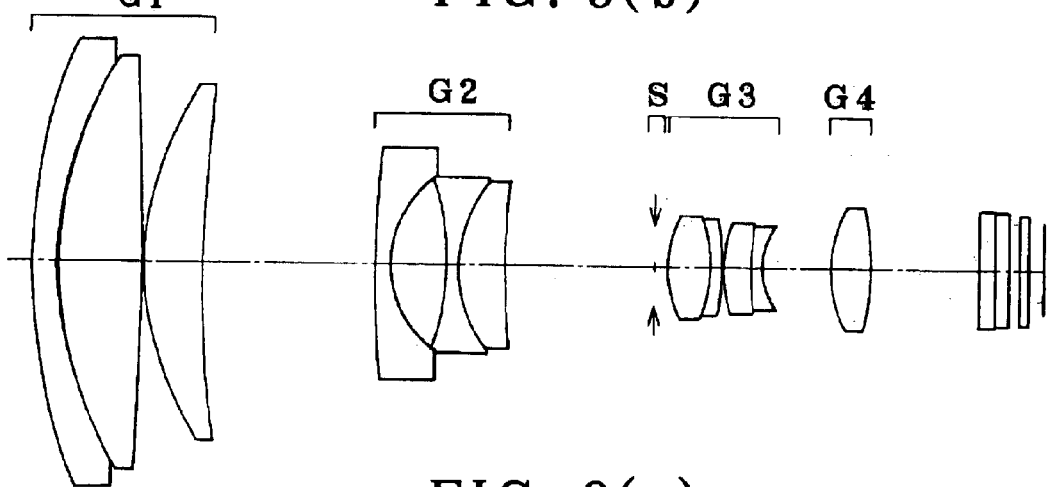
Figure 9C:
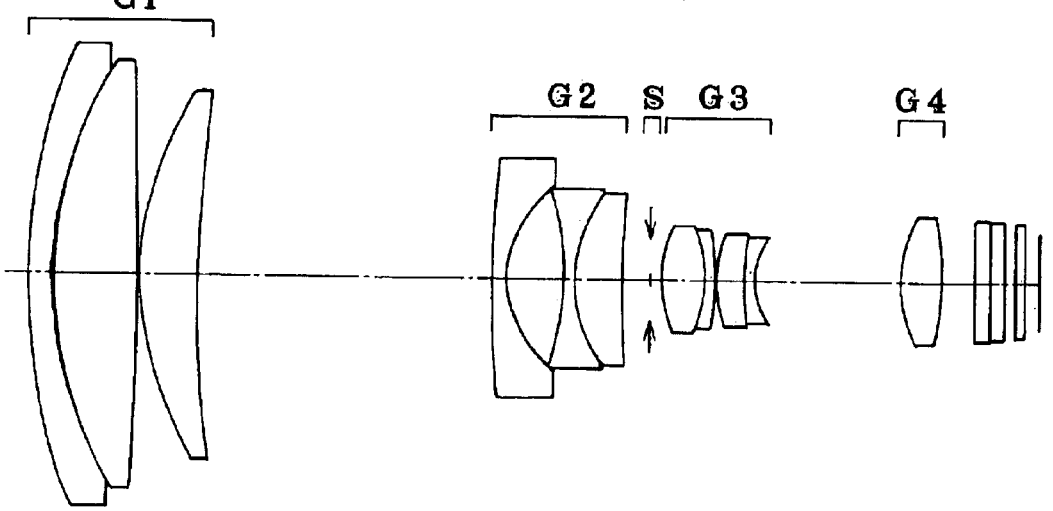
Figure 10A:
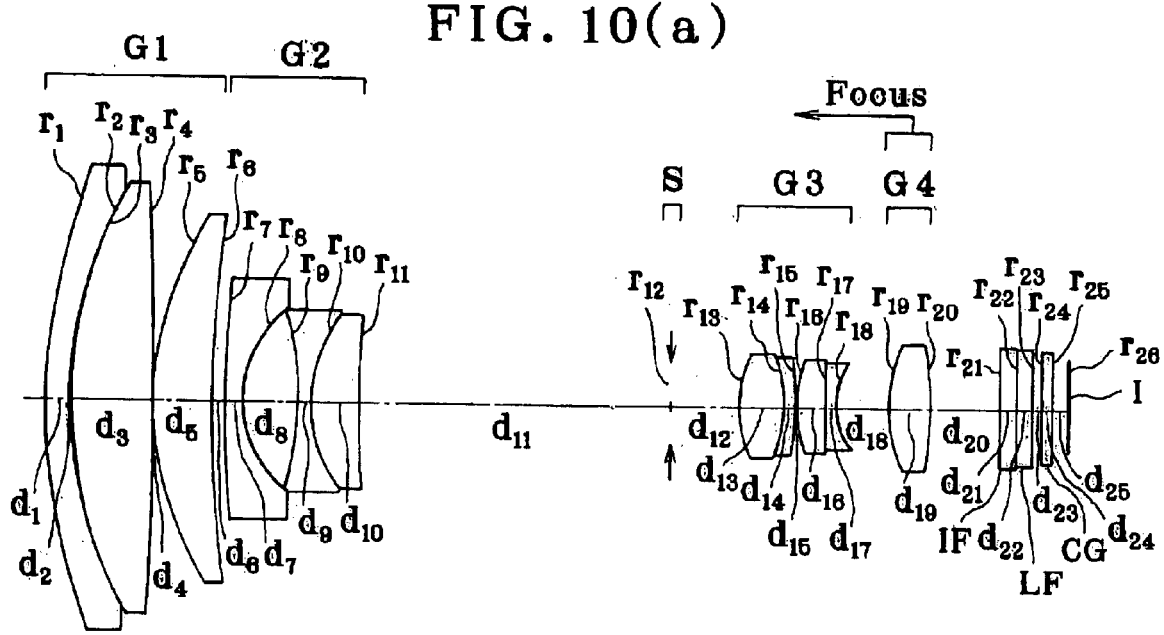
FIGS. 10(a), 10(b) and 10(c) are sectional views of Example 10 of the zoom lens, similar to FIGS. 1(a), 1(b) and 1(c).
Figure 10B:
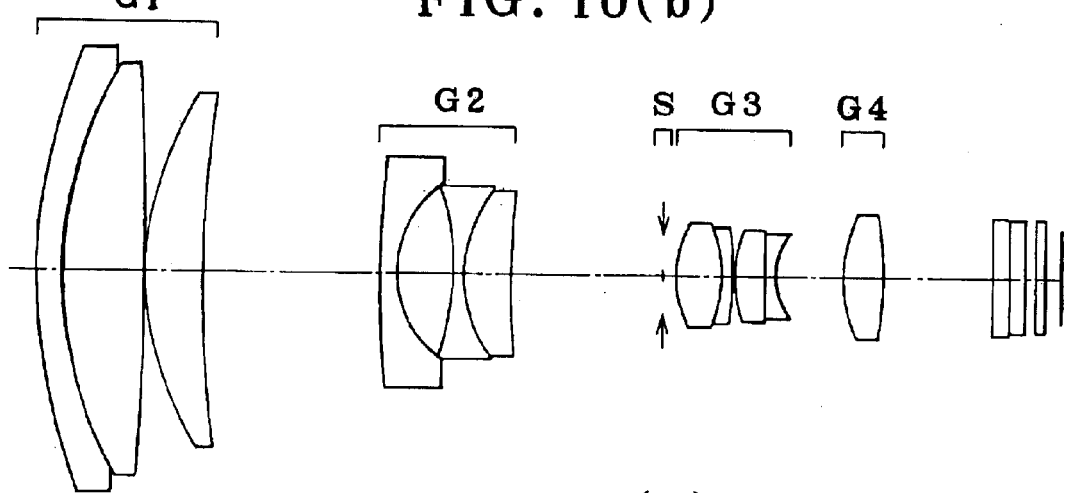
Figure 10C:
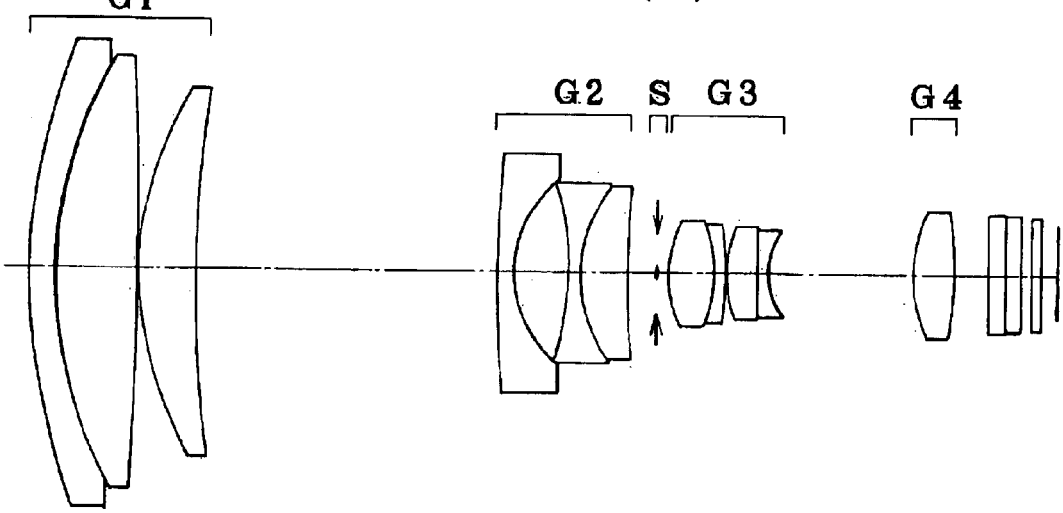

In Example 4, and Example 8, as shown in FIGS. 4 and 8, respectively, the zoom lens is made up of a first lens group G1 having positive refracting power and composed of a negative meniscus lens element convex on its object side, a double-convex positive lens element and a positive meniscus lens element convex on its object side, a second lens group G2 having negative refracting power and composed of a negative meniscus lens element convex on its object side and a doublet consisting of a double-concave negative lens element and a positive meniscus lens element convex on its object side, an aperture stop S, a third lens group G3 having positive refracting power and composed of a doublet (C1) having positive refracting power and consisting of a double-convex positive lens element and a negative meniscus lens element convex on its image plane side and a doublet (C2) having positive refracting power and consisting of a double-convex positive lens element and a double-concave negative lens element, and a fourth lens group G4 having positive refracting power and composed only of one double-convex positive lens element. Upon zooming from the wide-angle end to the telephoto end of the zoom lens, the second lens group G2 moves toward the image plane side of the zoom lens, the third lens group G3 moves toward the object side of the zoom lens, and the fourth lens group G4 moves toward the object side in a convex locus and is positioned nearer to the image plane side at the telephoto end than at the wide-angle end. For focusing on a nearby subject, the fourth lens group G4 moves toward the object side.

Three aspheric surfaces are used, one at the surface nearest to the object side in the third lens group G3 and two at both surfaces of the single lens element in the fourth lens group G4.

In each of Examples 5 to 7, 9 and 10, as shown in FIGS. 5 to 7, 9 and 10, the zoom lens is made up of a first lens group G1 having positive refracting power and composed of a negative meniscus lens element convex on its object side, a double-convex positive lens element and a positive meniscus lens element convex on its object side, a second lens group G2 having negative refracting power and composed of a negative meniscus lens element convex on its object side and a doublet consisting of a double-concave negative lens element and a positive meniscus lens element convex on its object side, an aperture stop S, a third lens group G3 having positive refracting power and composed of a doublet (C1) having positive refracting power and consisting of a double-convex positive lens element and a negative meniscus lens element convex on its object side and a doublet (C2) having negative refracting power and consisting of a positive meniscus lens element convex on its object side and a negative meniscus lens element convex on its object side, and a fourth lens group G4 having positive refracting power and composed only of one double-convex positive lens element. Upon zooming from the wide-angle end to the telephoto end of the zoom lens, the second lens group G2 moves toward the image plane side of the zoom lens, the third lens group G3 moves toward the object side of the zoom lens, and the fourth lens group G4 moves toward the object side in a convex locus and is positioned nearer to the image plane side at the telephoto end than at the wide-angle end. For focusing on a nearby subject, the fourth lens group G4 moves toward the object side.

Three aspheric surfaces are used, one at the surface nearest to the object side in the third lens group G3 and two at both surfaces of the single lens element in the fourth lens group G4.

Figure 11A:
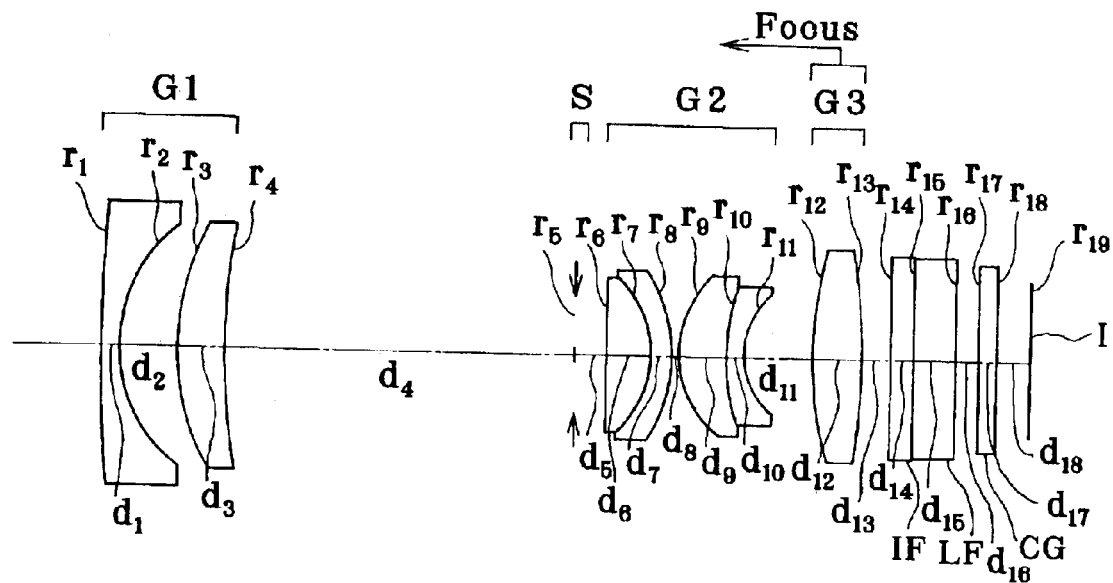
FIGS. 11(a), 11(b) and 11c) are sectional views of Example 11 of the zoom lens, similar to FIGS. 1(a), 1(b) and 1(c).
Figure 11B:
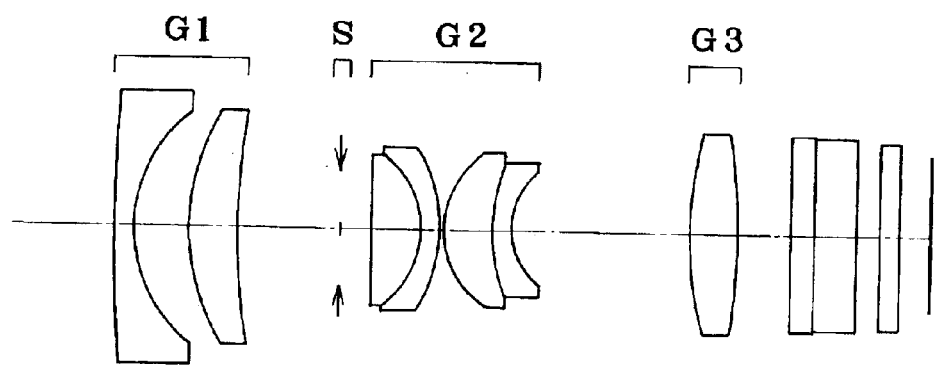
Figure 11C:
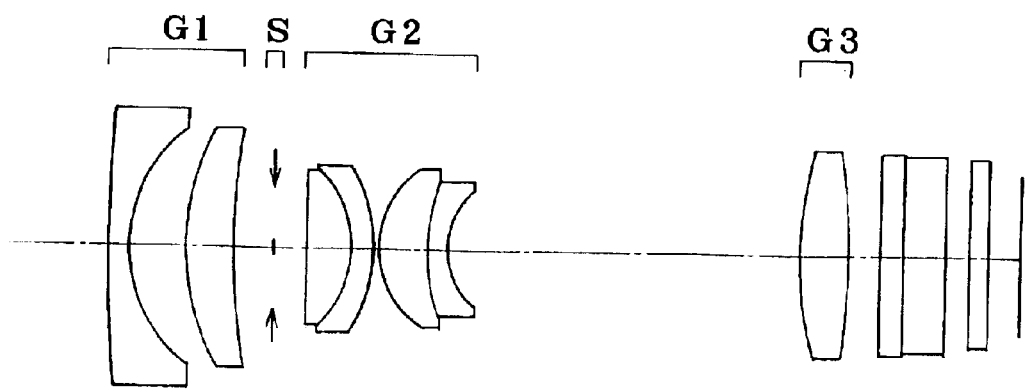

In Example 11, as shown in FIG. 11, the zoom lens is made up of a first lens group G1 having negative refracting power and composed of a negative meniscus lens element convex on its object side and a positive meniscus lens element convex on its object side, an aperture stop S, a second lens group G2 having positive refracting power and composed of a doublet (C1) having positive refracting power and consisting of a double-convex positive lens element and a negative meniscus lens element convex on its plane side and a doublet (C2) having negative refracting power and consisting of a positive meniscus lens element convex on its object side and a negative meniscus lens element convex on its object side, and a third lens group G3 having positive refracting power and composed only of one double-convex positive lens element. Upon zooming from the wide-angle end to the telephoto end of the zoom lens, the first lens group G1 moves toward the object side of the zoom lens in a concave locus and is positioned nearer to the image plane side at the telephoto end than at the wide-angle end, the second lens group G2 moves together with the aperture stop S toward the object side, and the third lens group G3 moves toward the object side in a convex locus and is positioned nearer to the object side at the telephoto end than at the wide-angle end. For focusing on a nearby subject, the third lens group G3 moves toward the object side.

Three aspheric surfaces are used, one at the image plane side-surface of the negative meniscus lens element in the first lens group G1, one at the object side-surface of C1 and one at the object side-surface of C2 in the second lens group G2.

Figure 12A:
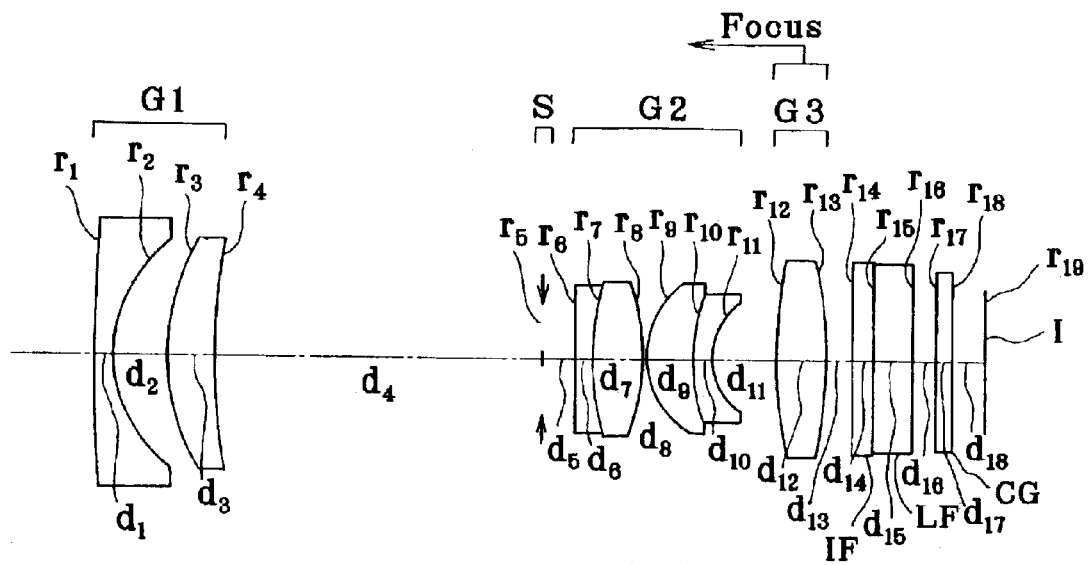
FIGS. 12(a), 12(b) and 12(c) are sectional views of Example 12 of the zoom lens, similar to FIGS. 1(a), 1(b) and 1(c).
Figure 12B:
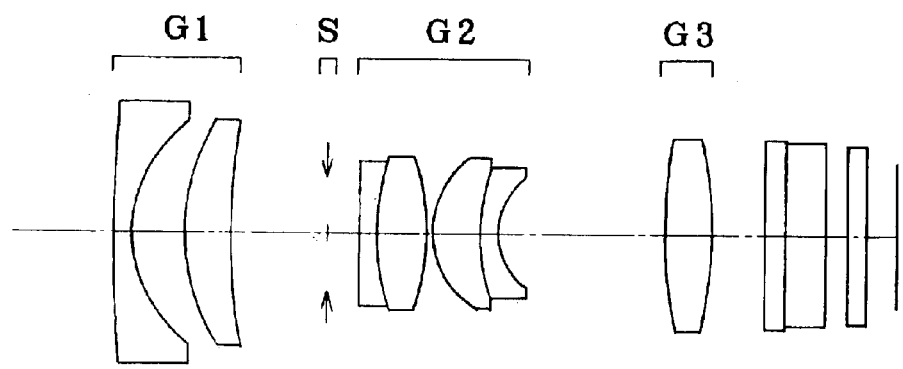
Figure 12C:
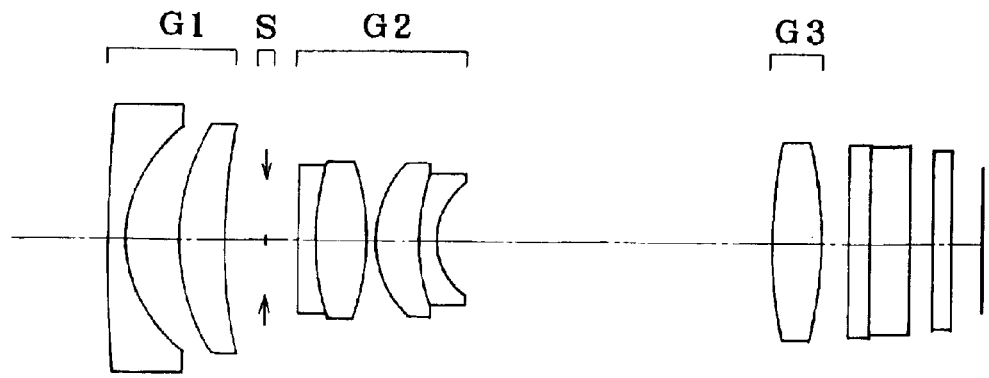
Figure 13A:
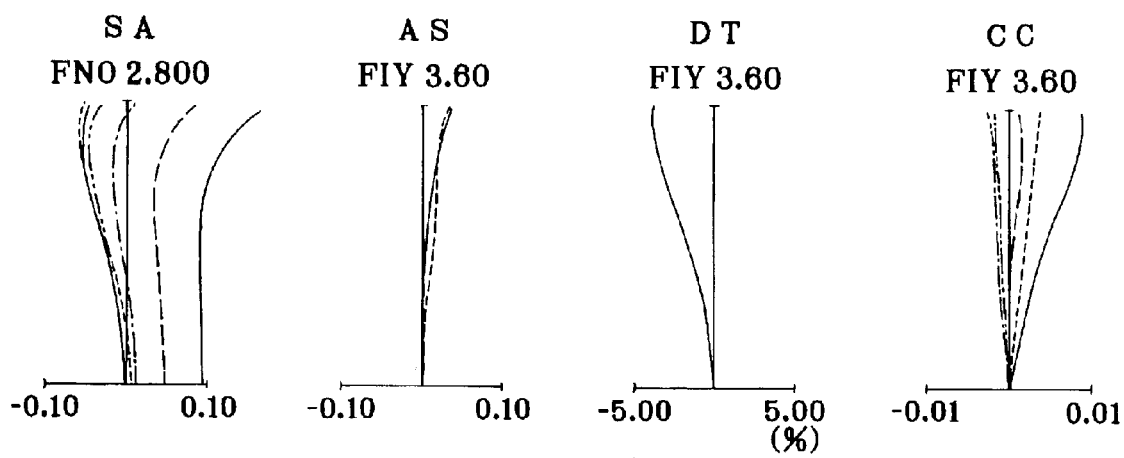
FIGS. 13(a), 13(b) and 13(c) are aberration diagrams for Example 1 upon focused on an object point at infinity.
Figure 13B:
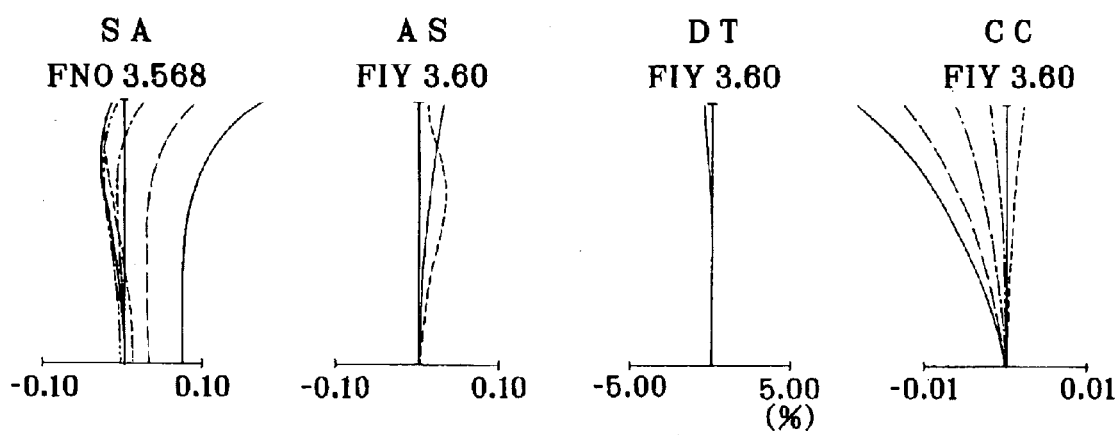
Figure 13C:
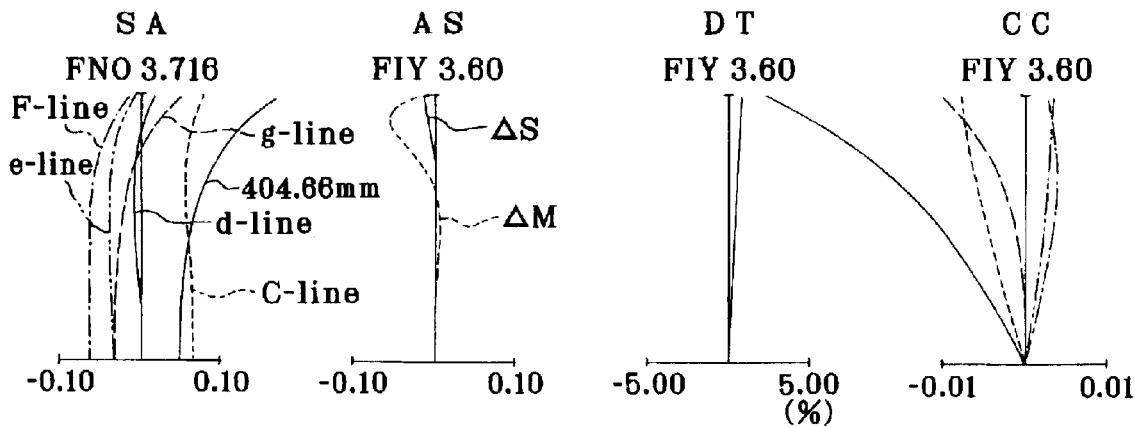
Figure 14A:
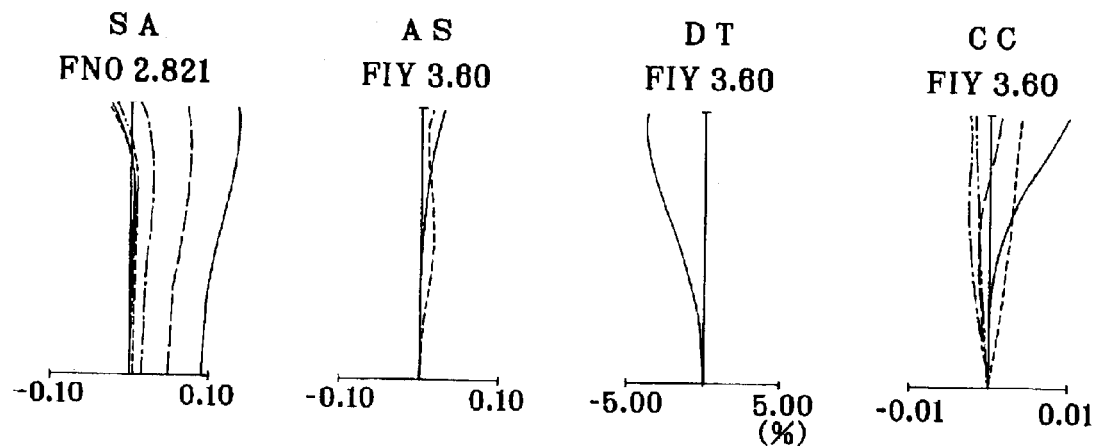
FIGS. 14(a), 14(b) and 14(c) are aberration diagrams for Example 2 upon focused on an object point at infinity.
Figure 14B:
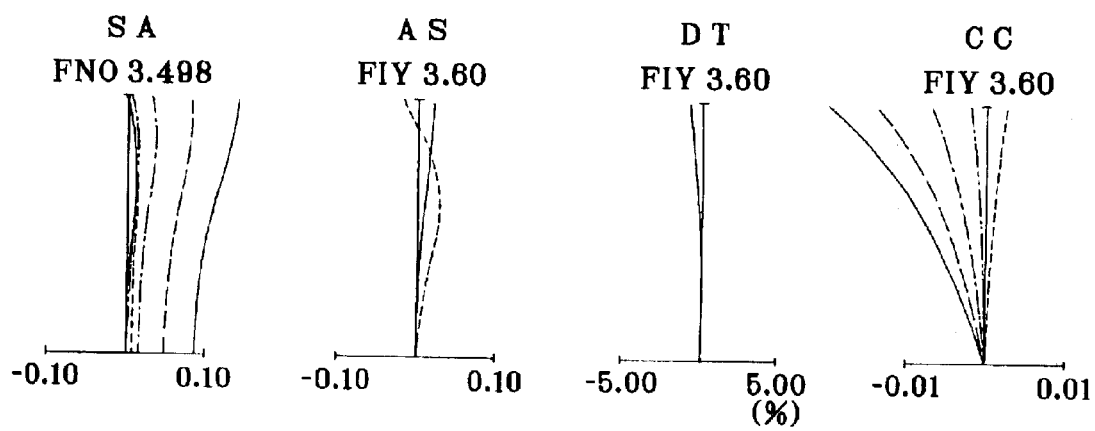
Figure 14C:
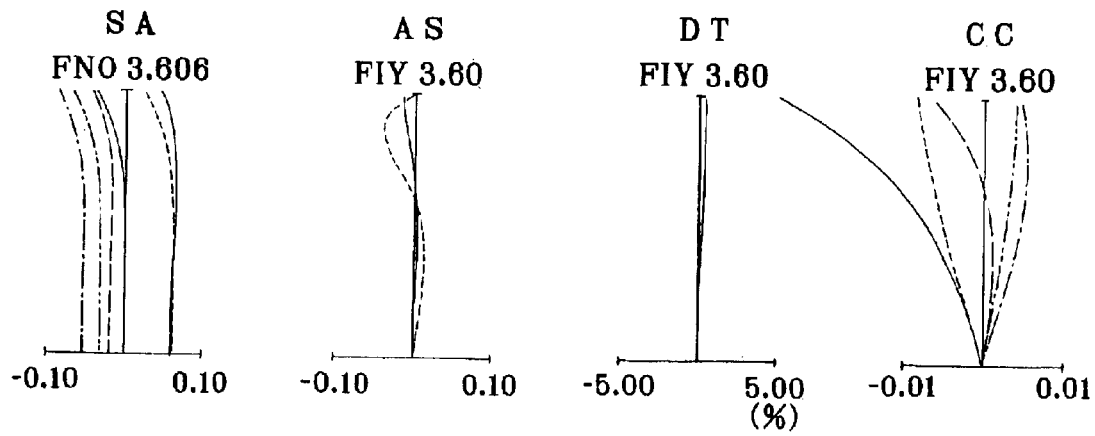
Figure 15A:
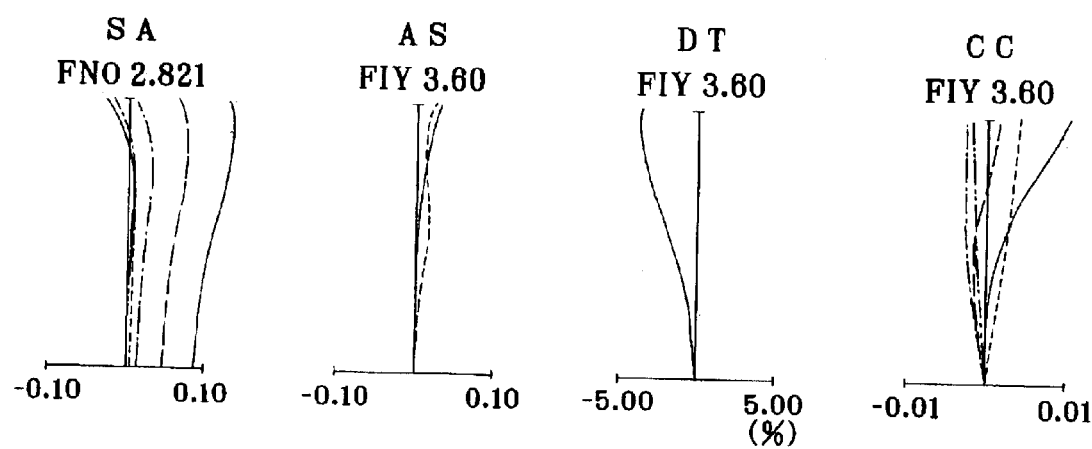
FIGS. 15(a), 15(b) and 15(c) are aberration diagrams for Example 3 upon focused on an object point at infinity.
Figure 15B:
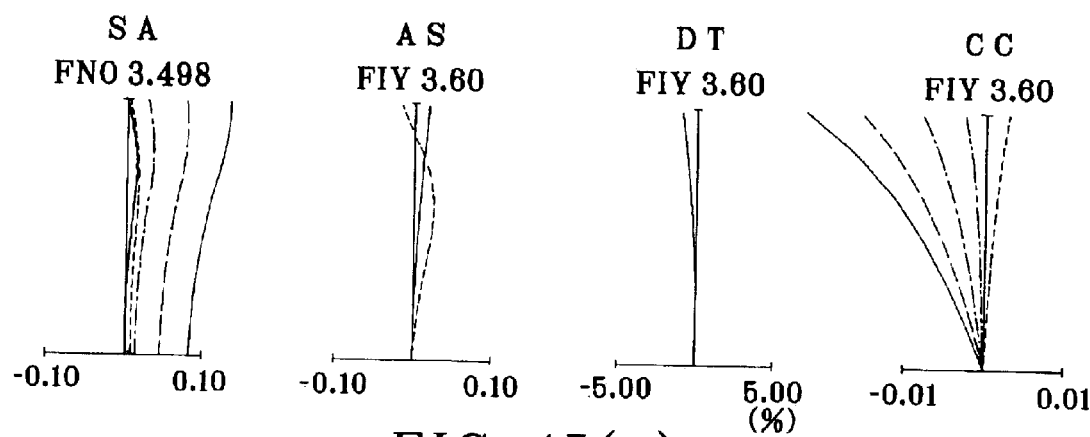
Figure 15C:
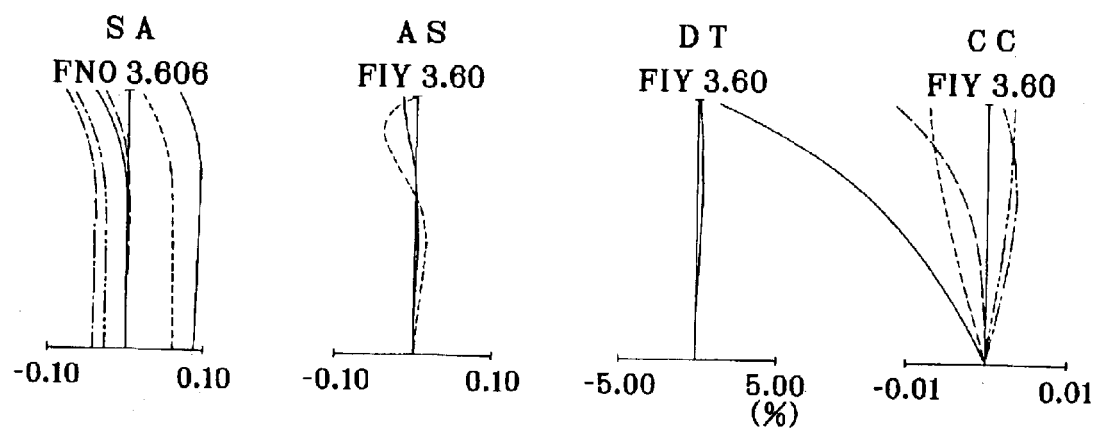
Figure 16A:
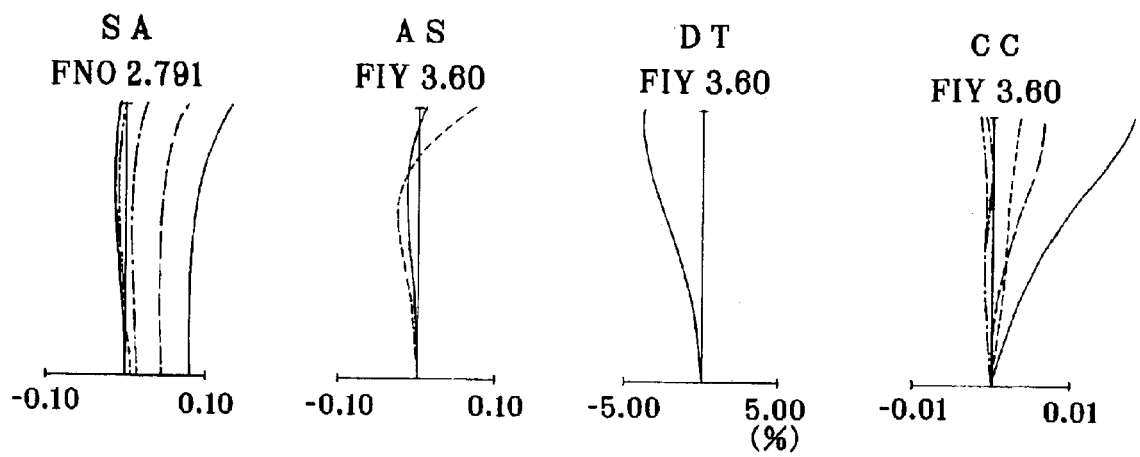
FIGS. 16(a), 16(b) and 16(c) are aberration diagrams for Example 4 upon focused on an object point at infinity.
Figure 16B:
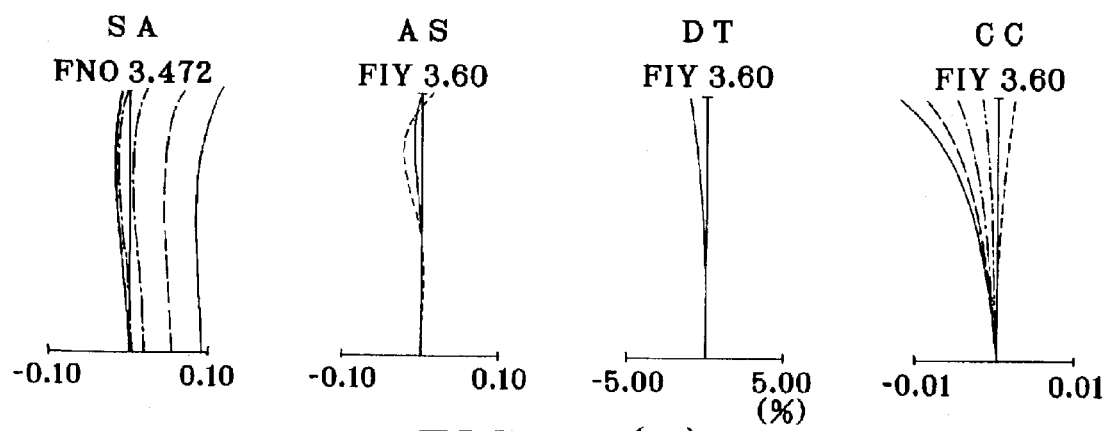
Figure 16C:
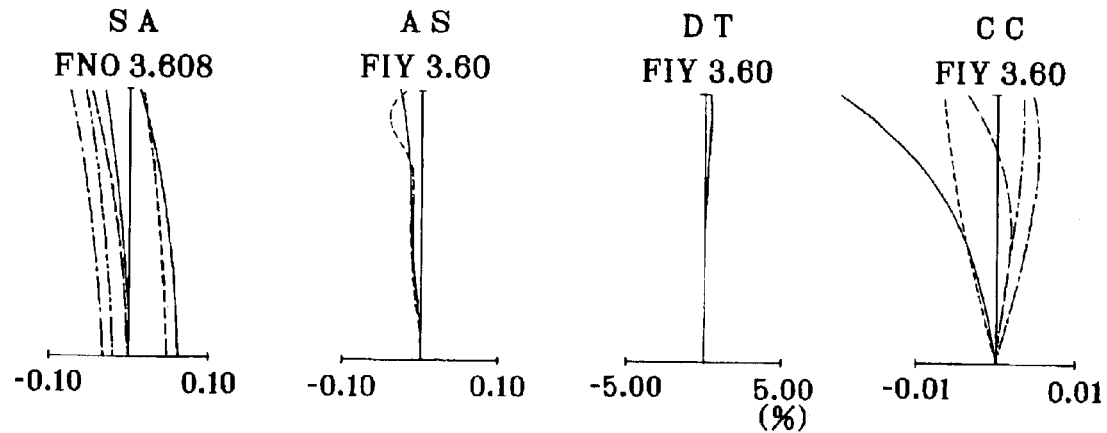
Figure 17A:
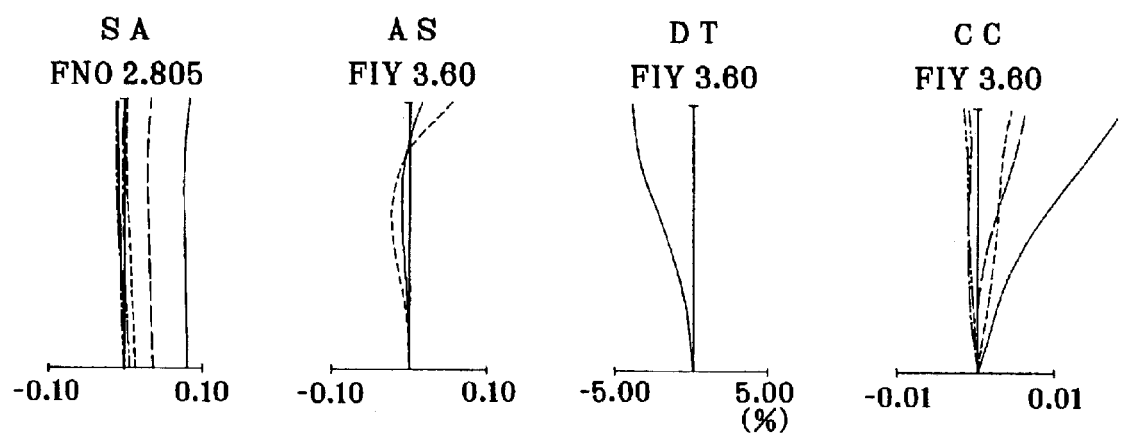
FIGS. 17(a), 17(b) and 17(c) are aberration diagrams for Example 5 upon focused on an object point at infinity.
Figure 17B:
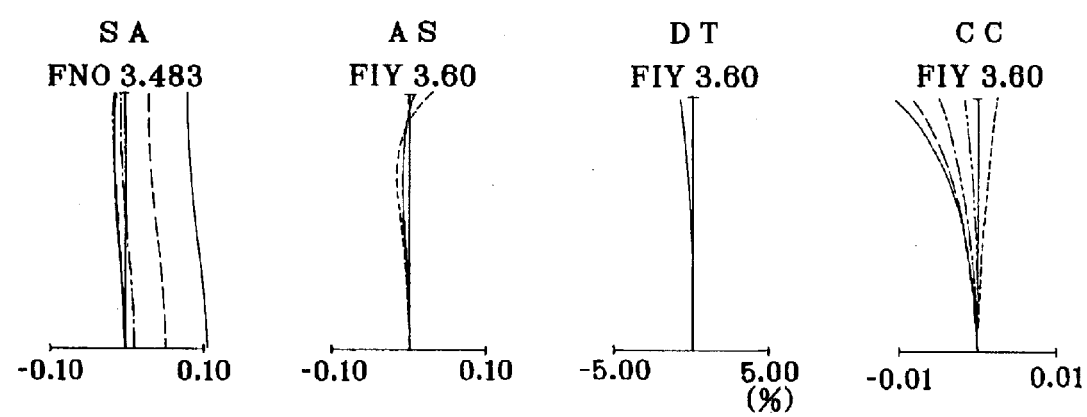
Figure 17C:
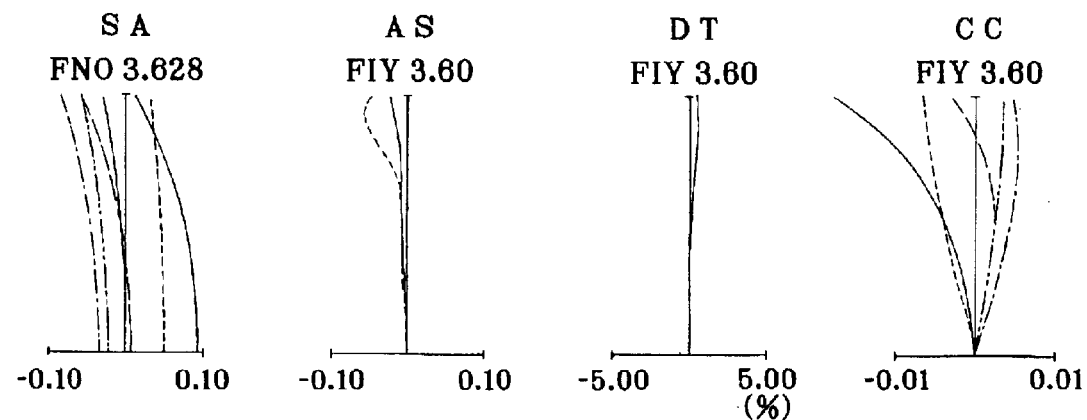
Figure 18A:
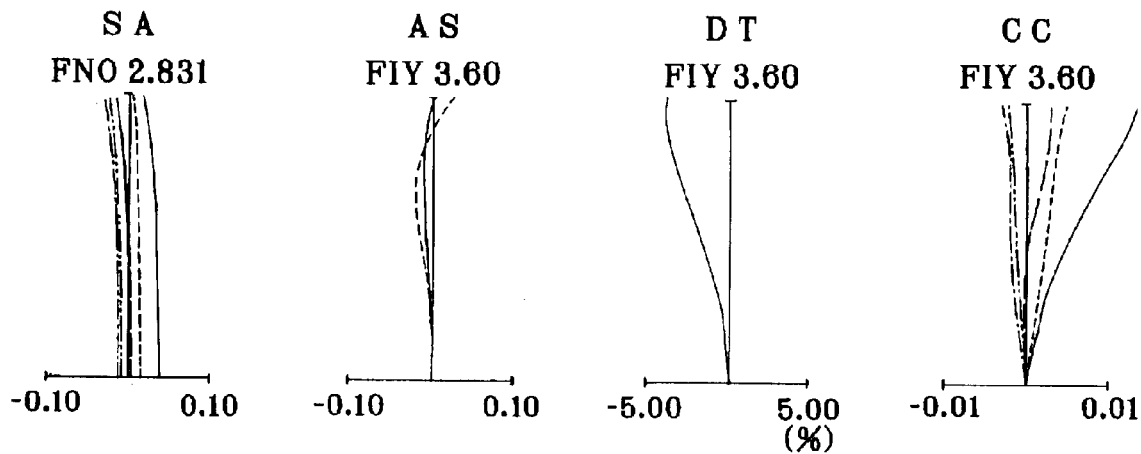
FIGS. 18(a), 18(b) and 18(c) are aberration diagrams for Example 6 upon focused on an object point at infinity.
Figure 18B:
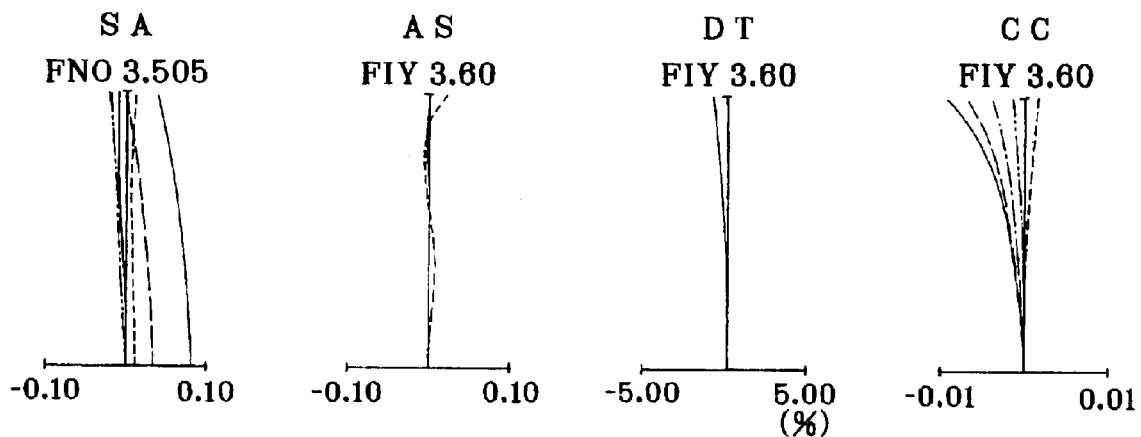
Figure 18C:
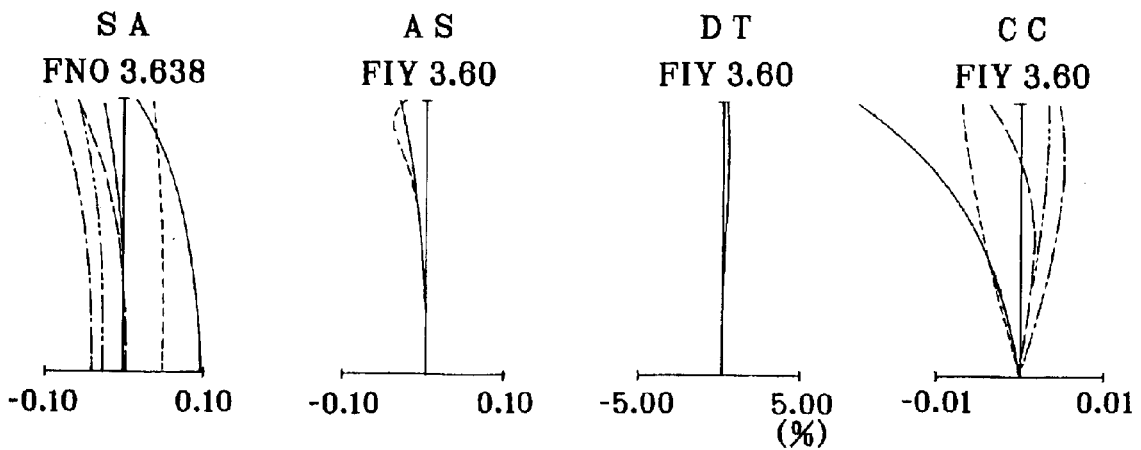
Figure 19A:
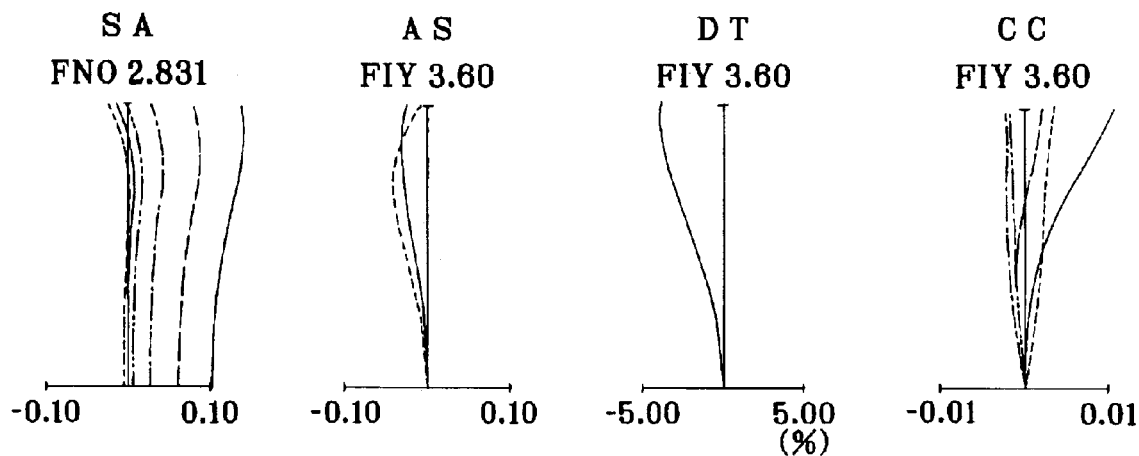
FIGS. 19(a), 19(b) and 19(c) are aberration diagrams for Example 7 upon focused on an object point at infinity.
Figure 19B:
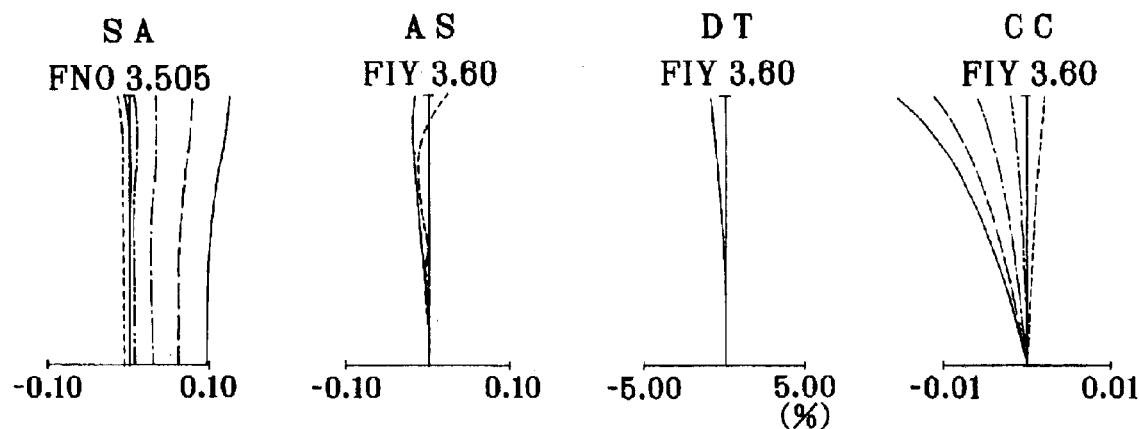
Figure 19C:
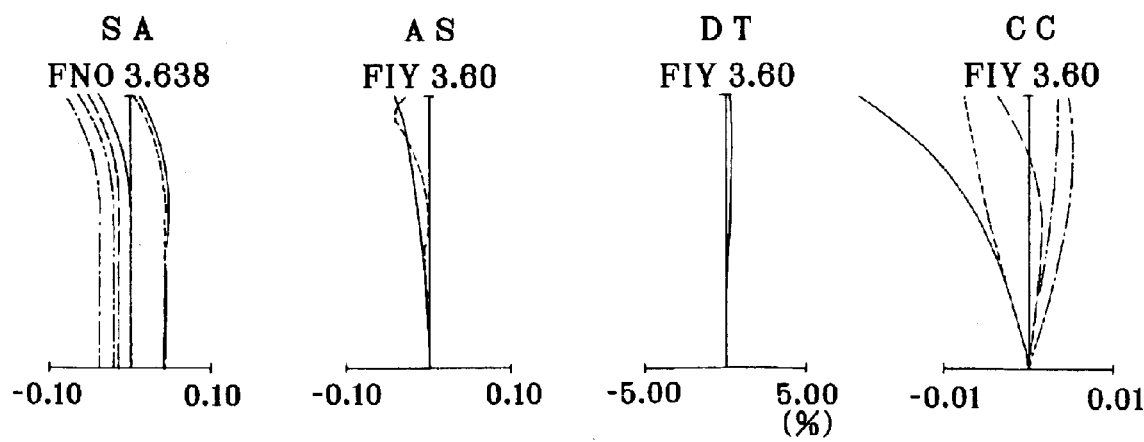
Figure 20A:
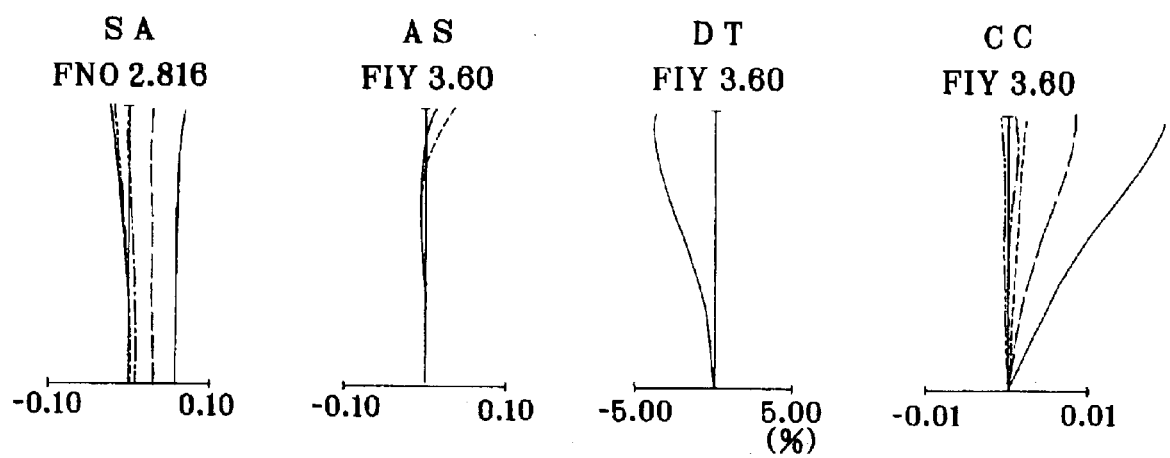
FIGS. 20(a), 20(b) and 20(c) are aberration diagrams for Example 8 upon focused on an object point at infinity.
Figure 20B:
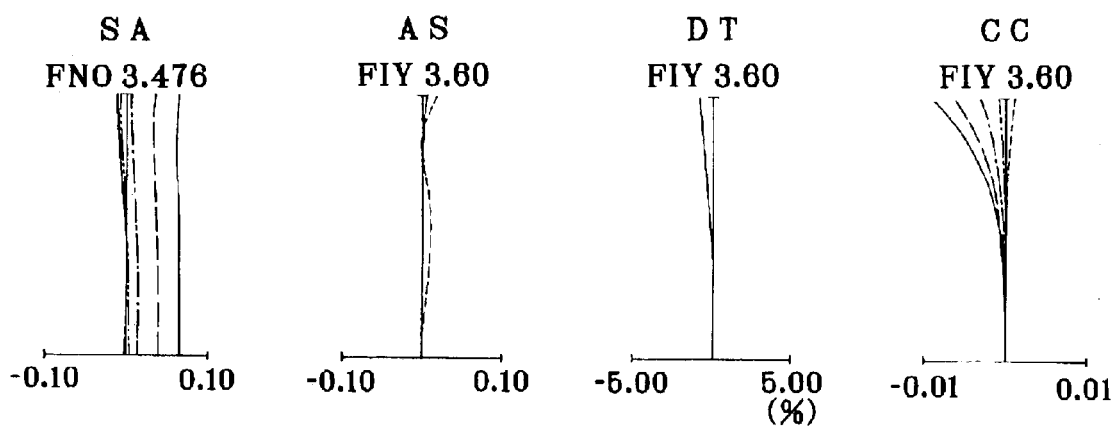
Figure 20C:
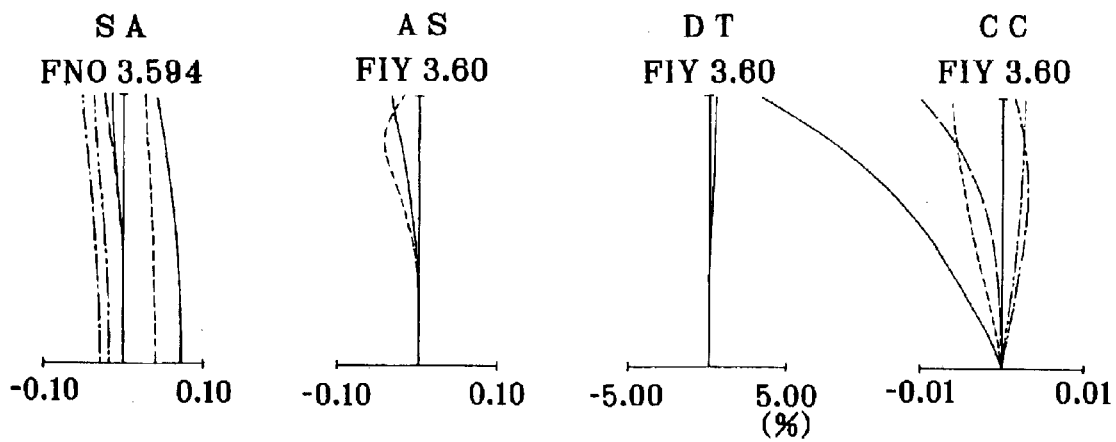
Figure 21A:
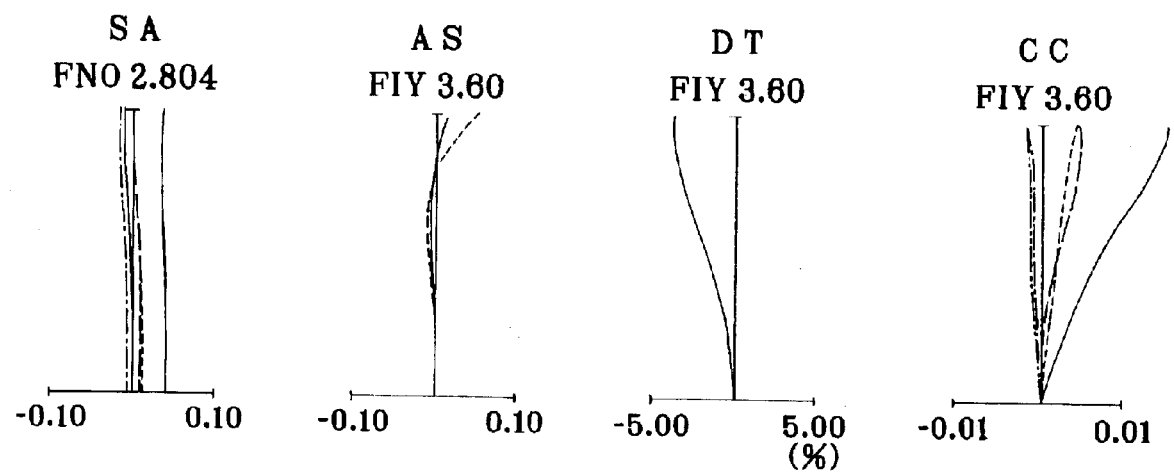
FIGS. 21(a), 21(b) and 21(c) are aberration diagrams for Example 9 upon focused on an object point at infinity.
Figure 21B:
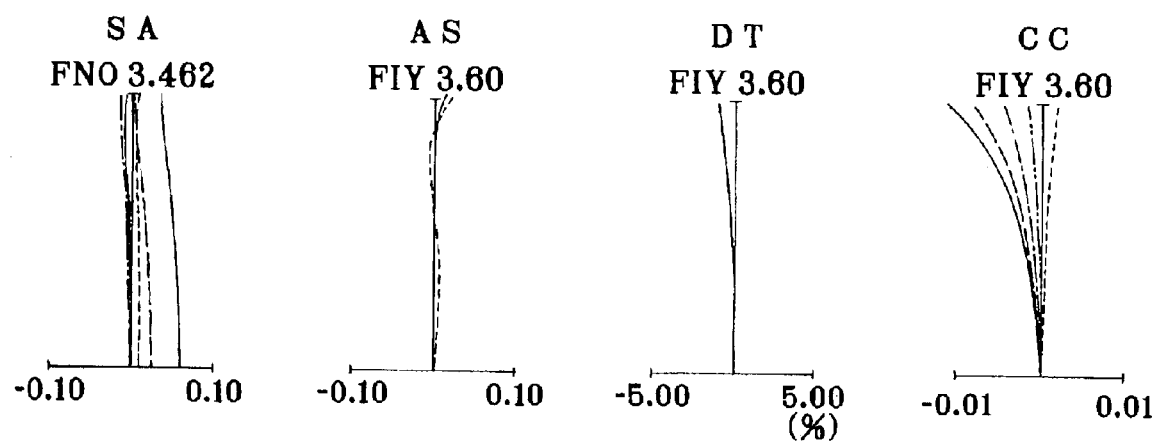
Figure 21C:
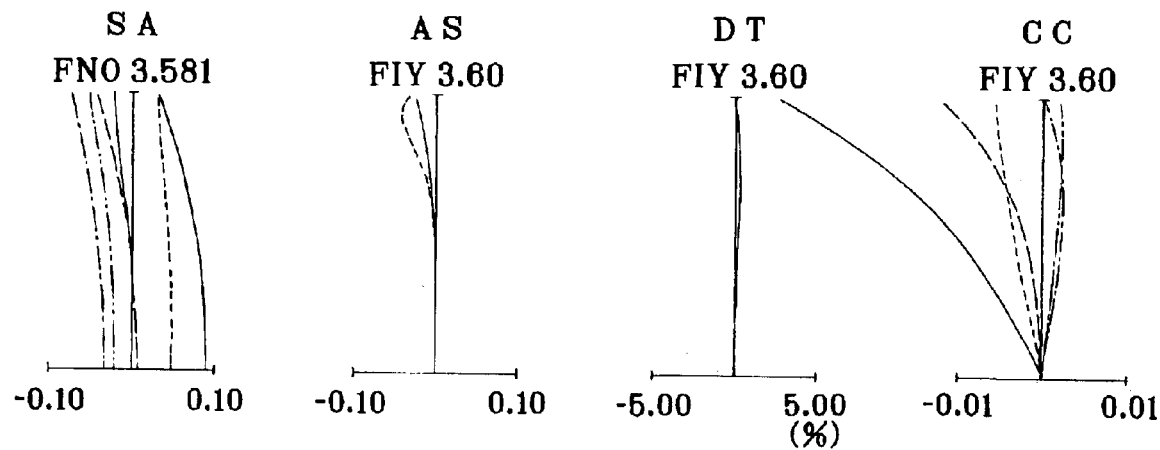
Figure 22A:
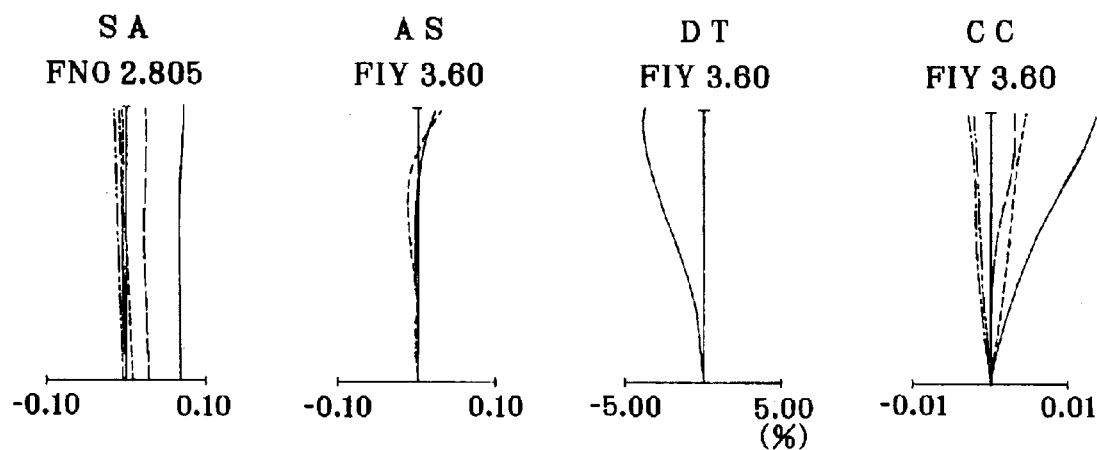
FIGS. 22(a), 22(b) and 22(c) are aberration diagrams for Example 10 upon focused on an object point at infinity.
Figure 22B:
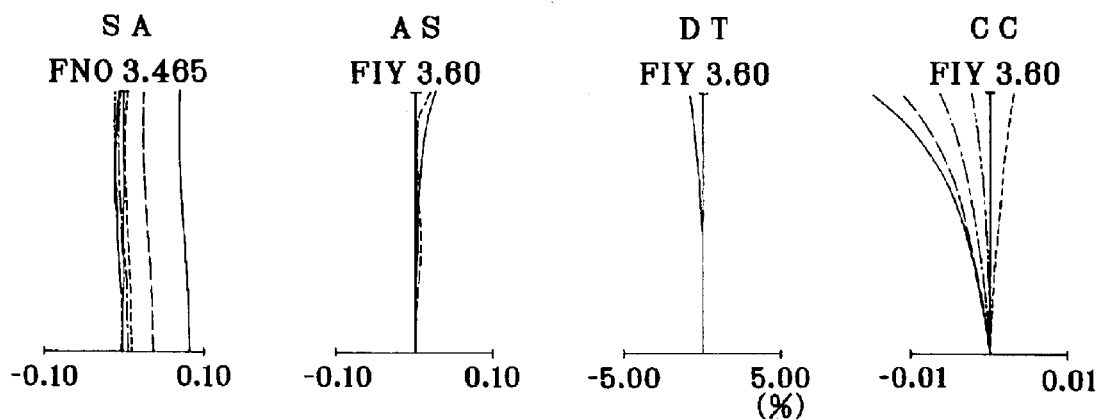
Figure 22C:
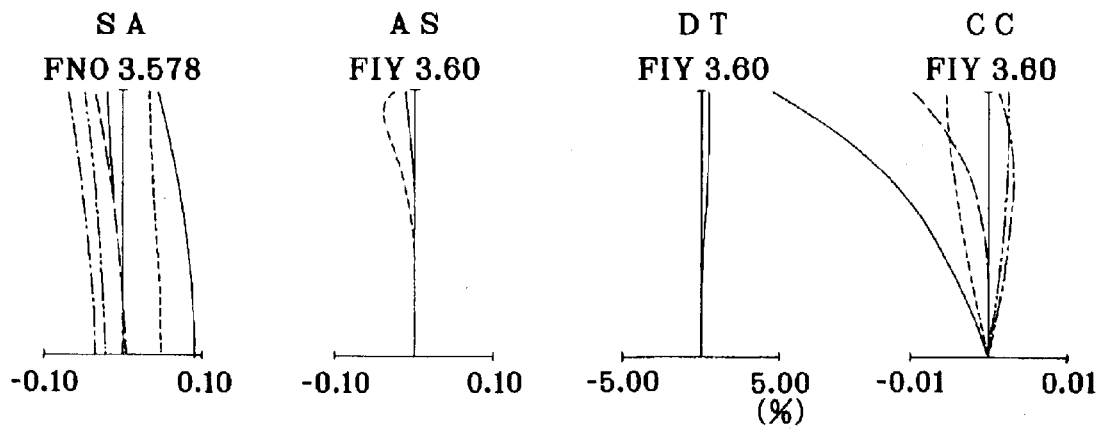
Figure 23A:
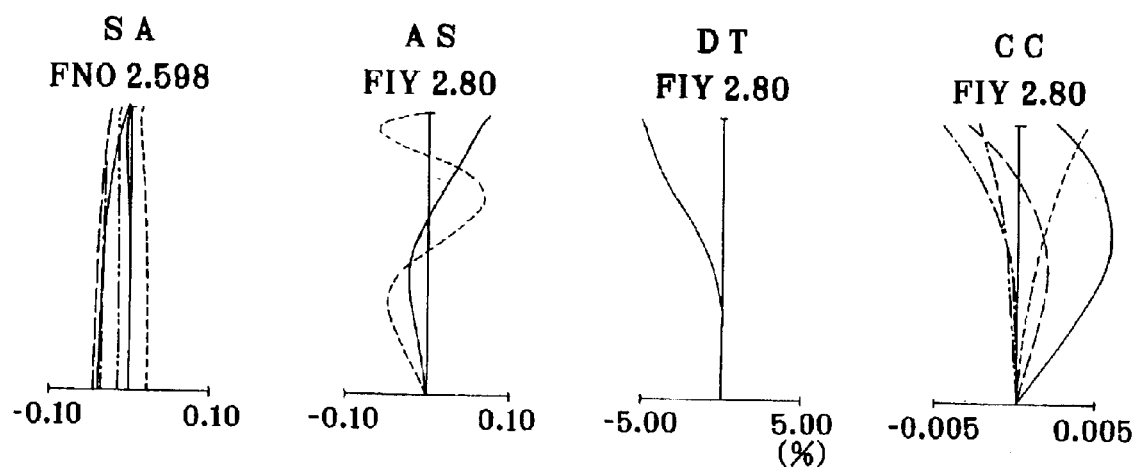
FIGS. 23(a), 23(b) and 23(c) are aberration diagrams for Example 11 upon focused on an object point at infinity.
Figure 23B:
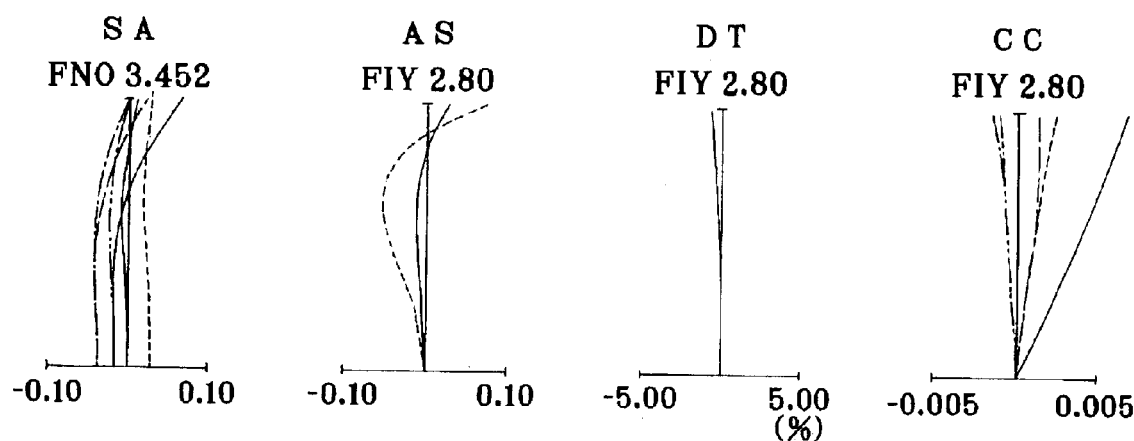
Figure 23C:
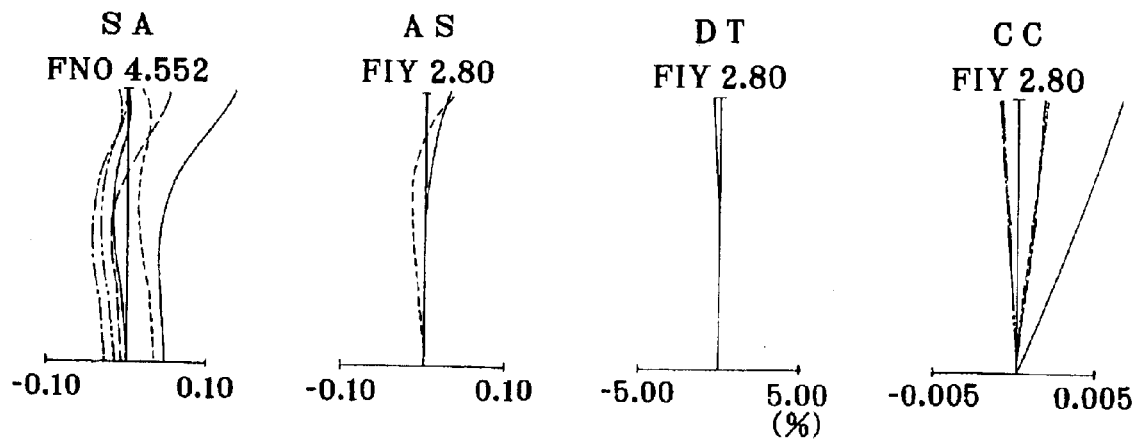
Figure 24A:
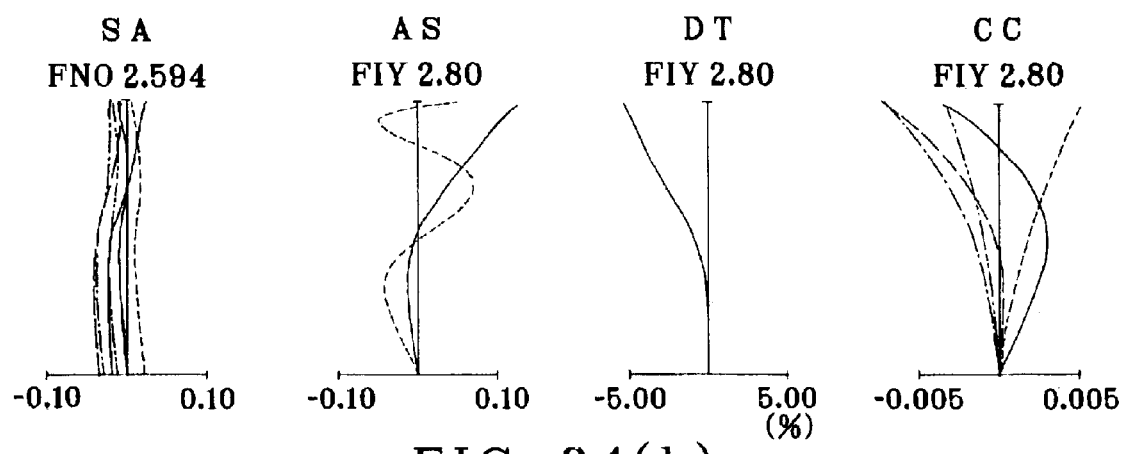
FIGS. 24(a), 24(b) and 24(c) are aberration diagrams for Example 12 upon focused on an object point at infinity.
Figure 24B:
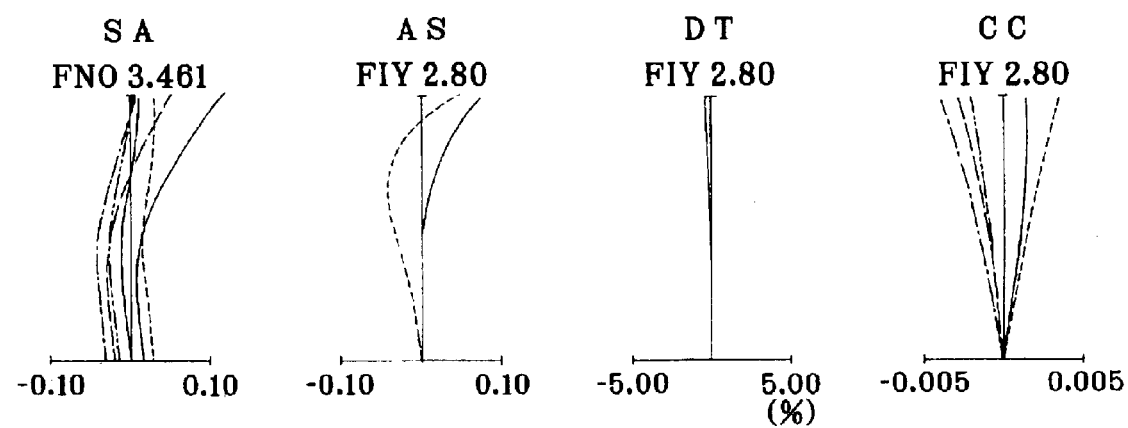
Figure 24C:
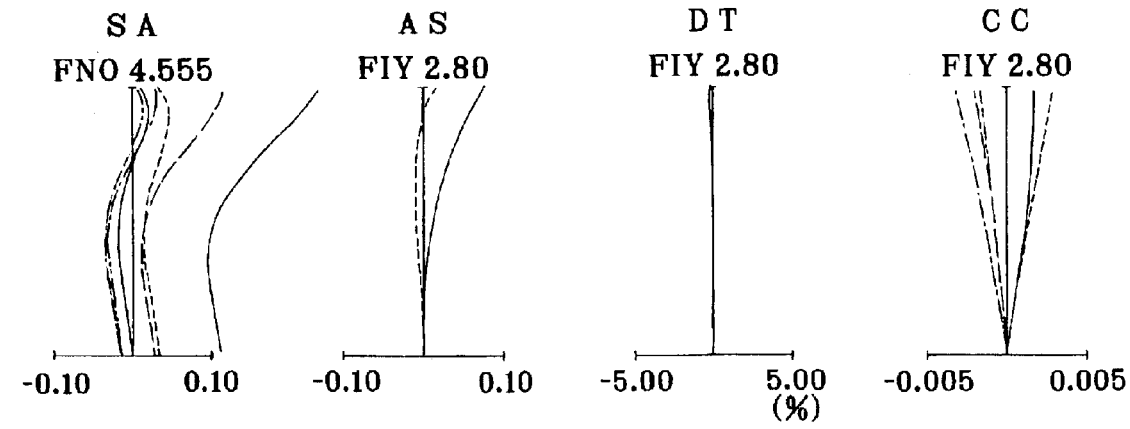

In Example 12, as shown in FIG. 12, the zoom lens is made up of a first lens group G1 having negative refracting power and composed of a negative meniscus lens element convex on its object side and a positive meniscus lens element convex on its object side, an aperture stop S, a second lens group G2 having positive refracting power and composed of a doublet (C1) having positive refracting power and consisting of a negative meniscus lens element convex on its object side and a double-convex positive lens element and a doublet (C2) having negative refracting power and consisting of a positive meniscus lens element convex on its object side and a negative meniscus lens element convex on its object side, and a third lens group G3 having positive refracting power and composed only of a double-convex positive lens element. Upon zooming from the wide-angle end to the telephoto end of the zoom lens, the first lens group G1 moves toward the object side of the zoom lens in a concave locus and is positioned nearer to the image plane side at the telephoto end than at the wide-angle end, the second lens group G2 moves together with the aperture stop S toward the object side, and the third lens group G3 moves toward the object side in a convex locus and is positioned nearer to the object side at the telephoto end than at the wide-angle end. For focusing on a nearby subject, the third lens group G3 moves toward the object side.

Three aspheric surfaces are used, one at the image plane side-surface of the negative meniscus lens element in the first lens group G1, one at the image plane side-surface of C1 and one at the image plane side-surface of C2 in the second lens group G2.

Set out below are the numerical data on each example. Symbols used hereinafter but not hereinbefore have the following meanings:

f: focal length of the zoom lens
$F_{NO}$: F-number
ω: half angle of view
WE: wide-angle end
ST: intermediate state
TE: telephoto end
$r_1, r_2, \ldots$ : radius of curvature of each lens element
$d_1, d_2, \ldots$ : spacing between the adjacent lens elements
$n_{d1}, n_{d2}, \ldots$ : d-line refractive index of each lens element
$v_{d1}, v_{d2}, \ldots$ : Abbe number of each lens element Here let x be an optical axis on condition that the direction of propagation of light is positive and y be a direction perpendicular to the optical axis. Then, aspheric configuration is given by $$x=(y^2/r)/[1+\{1-(K+1)(y/r)^2\}^{1/2}]+A_4y^4+A_6y^6+A_8y^8+A_{10}y^{10}$$

where r is a paraxial radius of curvature, K is a conical coefficient, and $A_4$, $A_6$, $A_8$ and $A_{10}$ are the fourth, sixth, eighth and tenth aspheric coefficients, respectively.

Example 1

| | | | |
|---|---|---|---|
| $r_1 = 44.9186$ | $d_1 = 1.8000$ | $n_{d1} = 1.84666$ | $v_{d1} = 23.78$ |
| $r_2 = 29.2256$ | $d_2 = 6.7000$ | $n_{d2} = 1.48749$ | $v_{d2} = 70.23$ |
| $r_3 = -256.3779$ | $d_3 = 0.1000$ | | |
| $r_4 = 25.1547$ | $d_4 = 4.1000$ | $n_{d3} = 1.61800$ | $v_{d3} = 63.33$ |
| $r_5 = 74.2475$ | $d_5 = $ (Variable) | | |
| $r_6 = 87.3958$ | $d_6 = 1.1000$ | $n_{d4} = 1.88300$ | $v_{d4} = 40.76$ |
| $r_7 = 8.2457$ | $d_7 = 4.3000$ | | |
| $r_8 = -22.1978$ | $d_8 = 0.8500$ | $n_{d5} = 1.51633$ | $v_{d5} = 64.14$ |
| $r_9 = 10.9872$ | $d_9 = 3.2000$ | $n_{d6} = 1.84666$ | $v_{d6} = 23.78$ |
| $r_{10} = 67.0434$ | $d_{10} = $ (Variable) | | |
| $r_{11} = \infty$ (Stop) | $d_{11} = $ (Variable) | | |
| $r_{12} = 8.8629$ (Aspheric) | $d_{12} = 2.5000$ | $n_{d7} = 1.69350$ | $v_{d7} = 53.21$ |
| $r_{13} = -9.8254$ | $d_{13} = 0.7000$ | $n_{d8} = 1.80100$ | $v_{d8} = 34.97$ |
| $r_{14} = -31.7314$ | $d_{14} = 0.1500$ | | |
| $r_{15} = 7.8387$ | $d_{15} = 2.3000$ | $n_{d9} = 1.49700$ | $v_{d9} = 81.54$ |
| $r_{16} = -57.4149$ | $d_{16} = 1.0000$ | $n_{d10} = 1.83400$ | $v_{d10} = 37.16$ |
| $r_{17} = 5.1149$ | $d_{17} = $ (Variable) | | |
| $r_{18} = 13.5959$ (Aspheric) | $d_{18} = 2.7000$ | $n_{d11} = 1.58913$ | $v_{d11} = 61.15$ |
| $r_{19} = -29.9870$ (Aspheric) | $d_{19} = $ (Variable) | | |
| $r_{20} = \infty$ | $d_{20} = 1.2000$ | $n_{d12} = 1.51633$ | $v_{d12} = 64.14$ |
| $r_{21} = \infty$ | $d_{21} = 1.1000$ | $n_{d13} = 1.54771$ | $v_{d13} = 62.84$ |
| $r_{22} = \infty$ | $d_{22} = 0.8000$ | | |
| $r_{23} = \infty$ | $d_{23} = 0.7500$ | $n_{d14} = 1.51633$ | $v_{d14} = 64.14$ |
| $r_{24} = \infty$ | $d_{24} = 1.2006$ | | |
| $r_{25} = \infty$ (Image Plane) | | | |

Aspherical Coefficients

12th surface

K = −0.9580
$A_4 = 7.5172 \times 10^{-5}$
$A_6 = 2.9092 \times 10^{-7}$
$A_8 = -4.4597 \times 10^{-9}$
$A_{10} = 0.0000$

18th surface

K = −0.0061
$A_4 = -1.7402 \times 10^{-4}$
$A_6 = -1.4408 \times 10^{-5}$
$A_8 = 5.6345 \times 10^{-7}$
$A_{10} = -4.2084 \times 10^{-9}$

19th surface

K = 29.8544
$A_4 = -5.5146 \times 10^{-5}$
$A_6 = -1.2498 \times 10^{-5}$
$A_8 = 2.8008 \times 10^{-7}$
$A_{10} = 1.3134 \times 10^{-8}$

Zooming Data (∞)

| | WE | ST | TE |
|---|---|---|---|
| f (mm) | 6.38777 | 19.92911 | 62.70110 |
| $F_{NO}$ | 2.8000 | 3.5682 | 3.7160 |
| ω (°) | 30.4 | 10.3 | 3.3 |
| $d_5$ | 0.85000 | 12.94104 | 22.20362 |
| $d_{10}$ | 23.55354 | 11.46231 | 2.20000 |
| $d_{11}$ | 5.07650 | 0.96535 | 0.80000 |
| $d_{17}$ | 4.17463 | 5.42065 | 10.91449 |
| $d_{19}$ | 4.87409 | 7.73933 | 2.41065 |

Example 2

| | | | |
|---|---|---|---|
| $r_1 = 45.0101$ | $d_1 = 1.8000$ | $n_{d1} = 1.84666$ | $v_{d1} = 23.78$ |
| $r_2 = 29.5441$ | $d_2 = 6.7000$ | $n_{d2} = 1.48749$ | $v_{d2} = 70.23$ |
| $r_3 = -274.6902$ | $d_3 = 0.1000$ | | |
| $r_4 = 25.5780$ | $d_4 = 4.1000$ | $n_{d3} = 1.61800$ | $v_{d3} = 63.33$ |
| $r_5 = 79.7690$ | $d_5 = $ (Variable) | | |
| $r_6 = 92.3771$ | $d_6 = 1.1000$ | $n_{d4} = 1.88300$ | $v_{d4} = 40.76$ |
| $r_7 = 8.1665$ | $d_7 = 4.3000$ | | |
| $r_8 = -19.9989$ | $d_8 = 0.8500$ | $n_{d5} = 1.51742$ | $v_{d5} = 52.43$ |
| $r_9 = 10.6201$ | $d_9 = 3.2000$ | $n_{d6} = 1.84666$ | $v_{d6} = 23.78$ |
| $r_{10} = 84.7023$ | $d_{10} = $ (Variable) | | |
| $r_{11} = \infty$ (Stop) | $d_{11} = $ (Variable) | | |
| $r_{12} = 7.2960$ (Aspheric) | $d_{12} = 3.0000$ | $n_{d7} = 1.58913$ | $v_{d7} = 61.15$ |
| $r_{13} = -12.9869$ | $d_{13} = 0.7000$ | $n_{d8} = 1.80100$ | $v_{d8} = 34.97$ |
| $r_{14} = -23.1751$ | $d_{14} = 0.1500$ | | |
| $r_{15} = 7.8786$ | $d_{15} = 2.2000$ | $n_{d9} = 1.49700$ | $v_{d9} = 81.54$ |
| $r_{16} = -68.1977$ | $d_{16} = 0.7000$ | $n_{d10} = 1.83400$ | $v_{d10} = 37.16$ |
| $r_{17} = 4.7984$ | $d_{17} = $ (Variable) | | |
| $r_{18} = 12.3782$ (Aspheric) | $d_{18} = 2.7000$ | $n_{d11} = 1.58913$ | $v_{d11} = 61.15$ |
| $r_{19} = -35.1364$ (Aspheric) | $d_{19} = $ (Variable) | | |
| $r_{20} = \infty$ | $d_{20} = 1.2000$ | $n_{d12} = 1.51633$ | $v_{d12} = 64.14$ |
| $r_{21} = \infty$ | $d_{21} = 1.1000$ | $n_{d13} = 1.54771$ | $v_{d13} = 62.84$ |
| $r_{22} = \infty$ | $d_{22} = 0.8000$ | | |
| $r_{23} = \infty$ | $d_{23} = 0.7500$ | $n_{d14} = 1.51633$ | $v_{d14} = 64.14$ |
| $r_{24} = \infty$ | $d_{24} = 1.2005$ | | |
| $r_{25} = \infty$ (Image Plane) | | | |

Aspherical Coefficients

12th surface

K = −0.9581
$A_4 = 6.7652 \times 10^{-5}$
$A_6 = 9.4290 \times 10^{-8}$
$A_8 = 7.8370 \times 10^{-9}$
$A_{10} = 0.0000$

18th surface

K = 0.0020
$A_4 = -2.8798 \times 10^{-4}$
$A_6 = -2.7305 \times 10^{-6}$
$A_8 = 8.1674 \times 10^{-8}$
$A_{10} = -1.0557 \times 10^{-8}$

19th surface

K = 29.8553
$A_4 = -2.5179 \times 10^{-4}$

-continued $A_6 = -6.7828 \times 10^{-6}$
$A_8 = 2.9431 \times 10^{-7}$
$A_{10} = -9.8389 \times 10^{-9}$ Zooming Data (∞)

|  | WE | ST | TE |
|---|---|---|---|
| f (mm) | 6.41052 | 19.89499 | 62.69826 |
| $F_{NO}$ | 2.8208 | 3.4980 | 3.6062 |
| ω (°) | 30.3 | 10.4 | 3.3 |
| $d_5$ | 0.85000 | 12.95959 | 22.23615 |
| $d_{10}$ | 23.58679 | 11.47731 | 2.20000 |
| $d_{11}$ | 5.09606 | 1.00119 | 0.80000 |
| $d_{17}$ | 4.20733 | 5.42781 | 10.92865 |
| $d_{19}$ | 4.88161 | 7.75590 | 2.45661 |

Example 3

| $r_1 = 45.0310$ | $d_1 = 1.8000$ | $n_{d1} = 1.84666$ | $ν_{d1} = 23.78$ |
|---|---|---|---|
| $r_2 = 29.3095$ | $d_2 = 6.7000$ | $n_{d2} = 1.48749$ | $ν_{d2} = 70.23$ |
| $r_3 = -290.1414$ | $d_3 = 0.1000$ | | |
| $r_4 = 25.4602$ | $d_4 = 4.1000$ | $n_{d3} = 1.61800$ | $ν_{d3} = 63.33$ |
| $r_5 = 80.9817$ | $d_5$ = (Variable) | | |
| $r_6 = 89.3180$ | $d_6 = 1.1000$ | $n_{d4} = 1.88300$ | $ν_{d4} = 40.76$ |
| $r_7 = 8.1133$ | $d_7 = 4.3000$ | | |
| $r_8 = -20.1431$ | $d_8 = 0.8500$ | $n_{d5} = 1.51742$ | $ν_{d5} = 52.43$ |
| $r_9 = 10.5087$ | $d_9 = 3.2000$ | $n_{d6} = 1.84666$ | $ν_{d6} = 23.78$ |
| $r_{10} = 82.7409$ | $d_{10}$ = (Variable) | | |
| $r_{11} = \infty$ (Stop) | $d_{11}$ = (Variable) | | |
| $r_{12} = 7.2892$ (Aspheric) | $d_{12} = 3.0000$ | $n_{d7} = 1.58913$ | $ν_{d7} = 61.15$ |
| $r_{13} = -13.1265$ | $d_{13} = 0.7000$ | $n_{d8} = 1.80100$ | $ν_{d8} = 34.97$ |
| $r_{14} = -23.1377$ | $d_{14} = 0.1500$ | | |
| $r_{15} = 7.8765$ | $d_{15} = 2.2000$ | $n_{d9} = 1.49700$ | $ν_{d9} = 81.54$ |
| $r_{16} = -63.5402$ | $d_{16} = 0.7000$ | $n_{d10} = 1.83400$ | $ν_{d10} = 37.16$ |
| $r_{17} = 4.7903$ | $d_{17}$ = (Variable) | | |
| $r_{18} = 12.3780$ (Aspheric) | $d_{18} = 2.7000$ | $n_{d11} = 1.58913$ | $ν_{d11} = 61.15$ |
| $r_{19} = -35.0895$ (Aspheric) | $d_{19}$ = (Variable) | | |
| $r_{20} = \infty$ | $d_{20} = 1.2000$ | $n_{d12} = 1.51633$ | $ν_{d12} = 64.14$ |
| $r_{21} = \infty$ | $d_{21} = 1.1000$ | $n_{d13} = 1.54771$ | $ν_{d13} = 62.84$ |
| $r_{22} = \infty$ | $d_{22} = 0.8000$ | | |
| $r_{23} = \infty$ | $d_{23} = 0.7500$ | $n_{d14} = 1.51633$ | $ν_{d14} = 64.14$ |
| $r_{24} = \infty$ | $d_{24} = 1.2005$ | | |
| $r_{25} = \infty$ (Image Plane) | | | |

Aspherical Coefficients

12th surface $K = -0.9581$
$A_4 = 6.6273 \times 10^{-5}$
$A_6 = 8.7196 \times 10^{-8}$
$A_8 = 9.1629 \times 10^{-9}$
$A_{10} = 0.0000$ 18th surface $K = 0.0024$
$A_4 = -2.8817 \times 10^{-4}$
$A_6 = -2.2988 \times 10^{-6}$
$A_8 = 7.3987 \times 10^{-8}$
$A_{10} = -1.0293 \times 10^{-8}$ 19th surface $K = 29.8553$
$A_4 = -2.5748 \times 10^{-4}$
$A_6 = -6.0606 \times 10^{-6}$
$A_8 = 2.7124 \times 10^{-7}$
$A_{10} = -9.3226 \times 10^{-9}$ Zooming Data (∞)

|  | WE | ST | TE |
|---|---|---|---|
| f (mm) | 6.40915 | 19.89530 | 62.69793 |
| $F_{NO}$ | 2.8208 | 3.4980 | 3.6062 |
| ω (°) | 30.3 | 10.3 | 3.3 |
| $d_5$ | 0.85000 | 12.96298 | 22.23920 |
| $d_{10}$ | 23.58986 | 11.47702 | 2.20000 |
| $d_{11}$ | 5.09982 | 1.00367 | 0.80000 |
| $d_{17}$ | 4.21061 | 5.42628 | 10.93454 |
| $d_{19}$ | 4.87978 | 7.76015 | 2.45592 |

Example 4

| $r_1 = 46.2398$ | $d_1 = 1.8000$ | $n_{d1} = 1.84666$ | $ν_{d1} = 23.78$ |
|---|---|---|---|
| $r_2 = 30.7754$ | $d_2 = 0.1600$ | | |
| $r_3 = 31.6906$ | $d_3 = 6.1500$ | $n_{d2} = 1.49700$ | $ν_{d2} = 81.54$ |
| $r_4 = -390.6903$ | $d_4 = 0.1500$ | | |
| $r_5 = 25.5787$ | $d_5 = 4.2500$ | $n_{d3} = 1.61800$ | $ν_{d3} = 63.33$ |
| $r_6 = 88.2493$ | $d_6$ = (Variable) | | |
| $r_7 = 98.0703$ | $d_7 = 1.1000$ | $n_{d4} = 1.88300$ | $ν_{d4} = 40.76$ |
| $r_8 = 8.1048$ | $d_8 = 4.2000$ | | |
| $r_9 = -24.3003$ | $d_9 = 0.8500$ | $n_{d5} = 1.51742$ | $ν_{d5} = 52.43$ |
| $r_{10} = 9.9255$ | $d_{10} = 3.5500$ | $n_{d6} = 1.84666$ | $ν_{d6} = 23.78$ |
| $r_{11} = 56.1004$ | $d_{11}$ = (Variable) | | |
| $r_{12} = \infty$ (Stop) | $d_{12}$ = (Variable) | | |
| $r_{13} = 7.7319$ (Aspheric) | $d_{13} = 3.5000$ | $n_{d7} = 1.58913$ | $ν_{d7} = 61.15$ |
| $r_{14} = -9.9174$ | $d_{14} = 0.8000$ | $n_{d8} = 1.77250$ | $ν_{d8} = 49.60$ |
| $r_{15} = -21.1212$ | $d_{15} = 0.2000$ | | |
| $r_{16} = 9.5539$ | $d_{16} = 2.2000$ | $n_{d9} = 1.49700$ | $ν_{d9} = 81.54$ |
| $r_{17} = -26.0741$ | $d_{17} = 0.8000$ | $n_{d10} = 1.72047$ | $ν_{d10} = 34.71$ |
| $r_{18} = 5.0712$ | $d_{18}$ = (Variable) | | |
| $r_{19} = 12.8580$ (Aspheric) | $d_{19} = 2.9000$ | $n_{d11} = 1.58913$ | $ν_{d11} = 61.15$ |
| $r_{20} = -35.2494$ (Aspheric) | $d_{20}$ = (Variable) | | |
| $r_{21} = \infty$ | $d_{21} = 1.2000$ | $n_{d12} = 1.51633$ | $ν_{d12} = 64.14$ |
| $r_{22} = \infty$ | $d_{22} = 1.1000$ | $n_{d13} = 1.54771$ | $ν_{d13} = 62.84$ |
| $r_{23} = \infty$ | $d_{23} = 0.8000$ | | |
| $r_{24} = \infty$ | $d_{24} = 0.7500$ | $n_{d14} = 1.51633$ | $ν_{d14} = 64.14$ |
| $r_{25} = \infty$ | $d_{25} = 1.2001$ | | |
| $r_{26} = \infty$ (Image Plane) | | | |

Aspherical Coefficients

13th surface $K = -0.9665$
$A_4 = 6.2484 \times 10^{-5}$
$A_6 = 3.1140 \times 10^{-7}$
$A_8 = 7.2537 \times 10^{-9}$
$A_{10} = 0.0000$ 19th surface $K = 0.4582$
$A_4 = -1.4134 \times 10^{-4}$
$A_6 = -2.6646 \times 10^{-5}$
$A_8 = 1.7736 \times 10^{-6}$
$A_{10} = -5.1345 \times 10^{-8}$ 20th surface $K = 29.8614$
$A_4 = -1.0841 \times 10^{-4}$
$A_6 = -2.6708 \times 10^{-5}$
$A_8 = 1.7081 \times 10^{-6}$
$A_{10} = -4.3709 \times 10^{-8}$ Zooming Data (∞)

|  | WE | ST | TE |
|---|---|---|---|
| f (mm) | 6.39642 | 19.90012 | 62.69469 |
| $F_{NO}$ | 2.7910 | 3.4716 | 3.6078 |
| ω (°) | 30.3 | 10.3 | 3.3 |
| $d_6$ | 1.00000 | 13.02304 | 22.19501 |
| $d_{11}$ | 23.39496 | 11.37193 | 2.20000 |
| $d_{12}$ | 5.18696 | 0.97626 | 0.80000 |
| $d_{18}$ | 3.94257 | 5.33431 | 10.93395 |
| $d_{20}$ | 4.87221 | 7.69115 | 2.26774 |

Example 5

| $r_1 = 44.6556$ | $d_1 = 1.8000$ | $n_{d1} = 1.84666$ | $ν_{d1} = 23.78$ |
|---|---|---|---|
| $r_2 = 30.0106$ | $d_2 = 0.1600$ | | |

-continued

| | | | |
|---|---|---|---|
| $r_3 = 30.8829$ | $d_3 = 6.1500$ | $n_{d2} = 1.49700$ | $\nu_{d2} = 81.54$ |
| $r_4 = -626.8590$ | $d_4 = 0.1500$ | | |
| $r_5 = 26.1624$ | $d_5 = 4.2500$ | $n_{d3} = 1.61800$ | $\nu_{d3} = 63.33$ |
| $r_6 = 97.7276$ | $d_6 = $ (Variable) | | |
| $r_7 = 102.2113$ | $d_7 = 1.1000$ | $n_{d4} = 1.88300$ | $\nu_{d4} = 40.76$ |
| $r_8 = 8.2110$ | $d_8 = 4.2000$ | | |
| $r_9 = -24.5554$ | $d_9 = 0.8500$ | $n_{d5} = 1.51742$ | $\nu_{d5} = 52.43$ |
| $r_{10} = 9.9994$ | $d_{10} = 3.5500$ | $n_{d6} = 1.84666$ | $\nu_{d6} = 23.78$ |
| $r_{11} = 53.5317$ | $d_{11} = $ (Variable) | | |
| $r_{12} = \infty$ (Stop) | $d_{12} = $ (Variable) | | |
| $r_{13} = 7.8453$ (Aspheric) | $d_{13} = 3.5000$ | $n_{d7} = 1.58913$ | $\nu_{d7} = 61.15$ |
| $r_{14} = -10.8879$ | $d_{14} = 0.8000$ | $n_{d8} = 1.72916$ | $\nu_{d8} = 54.68$ |
| $r_{15} = -26.0761$ | $d_{15} = 0.2000$ | | |
| $r_{16} = 9.9883$ | $d_{16} = 2.2000$ | $n_{d9} = 1.49700$ | $\nu_{d9} = 81.54$ |
| $r_{17} = 54.8075$ | $d_{17} = 0.8000$ | $n_{d10} = 1.71736$ | $\nu_{d10} = 29.52$ |
| $r_{18} = 5.0104$ | $d_{18} = $ (Variable) | | |
| $r_{19} = 13.8018$ (Aspheric) | $d_{19} = 2.9000$ | $n_{d11} = 1.58913$ | $\nu_{d11} = 61.15$ |
| $r_{20} = -33.2179$ (Aspheric) | $d_{20} = $ (Variable) | | |
| $r_{21} = \infty$ | $d_{21} = 1.2000$ | $n_{d12} = 1.51633$ | $\nu_{d12} = 64.14$ |
| $r_{22} = \infty$ | $d_{22} = 1.1000$ | $n_{d13} = 1.54771$ | $\nu_{d13} = 62.84$ |
| $r_{23} = \infty$ | $d_{23} = 0.8000$ | | |
| $r_{24} = \infty$ | $d_{24} = 0.7500$ | $n_{d14} = 1.51633$ | $\nu_{d14} = 64.14$ |
| $r_{25} = \infty$ | $d_{25} = 1.2000$ | | |
| $r_{26} = \infty$ (Image Plane) | | | |

Aspherical Coefficients

13th surface $K = -0.9700$
$A_4 = 3.5298 \times 10^{-5}$
$A_6 = 1.0823 \times 10^{-7}$
$A_8 = 1.1598 \times 10^{-9}$
$A_{10} = 0.0000$ 19th surface $K = 0.4510$
$A_4 = -2.5179 \times 10^{-4}$
$A_6 = -1.8540 \times 10^{-5}$
$A_8 = 1.2085 \times 10^{-6}$
$A_{10} = -4.1443 \times 10^{-8}$ 20th surface $K = 29.8002$
$A_4 = -2.5326 \times 10^{-4}$
$A_6 = -1.5387 \times 10^{-5}$
$A_8 = 9.5607 \times 10^{-7}$
$A_{10} = -2.7511 \times 10^{-8}$ Zooming Data ($\infty$)

| | WE | ST | TE |
|---|---|---|---|
| f (mm) | 6.39641 | 19.90019 | 62.70339 |
| $F_{NO}$ | 2.8054 | 3.4834 | 3.6279 |
| $\omega$ (°) | 30.3 | 10.3 | 3.3 |
| $d_6$ | 1.00000 | 13.04070 | 22.20214 |
| $d_{11}$ | 23.40210 | 11.36142 | 2.20000 |
| $d_{12}$ | 5.09401 | 0.98072 | 0.80000 |
| $d_{18}$ | 3.95660 | 5.27410 | 10.93142 |
| $d_{20}$ | 4.90851 | 7.70430 | 2.22767 |

Example 6

| | | | |
|---|---|---|---|
| $r_1 = 46.4625$ | $d_1 = 1.8000$ | $n_{d1} = 1.84666$ | $\nu_{d1} = 23.78$ |
| $r_2 = 30.6454$ | $d_2 = 0.1600$ | | |
| $r_3 = 31.5579$ | $d_3 = 6.1500$ | $n_{d2} = 1.49700$ | $\nu_{d2} = 81.54$ |
| $r_4 = -396.8751$ | $d_4 = 0.1500$ | | |
| $r_5 = 26.0058$ | $d_5 = 4.2500$ | $n_{d3} = 1.61800$ | $\nu_{d3} = 63.33$ |
| $r_6 = 97.7731$ | $d_6 = $ (Variable) | | |
| $r_7 = 110.1228$ | $d_7 = 1.1000$ | $n_{d4} = 1.88300$ | $\nu_{d4} = 40.76$ |
| $r_8 = 8.4370$ | $d_8 = 4.2000$ | | |
| $r_9 = -22.0281$ | $d_9 = 0.8500$ | $n_{d5} = 1.51742$ | $\nu_{d5} = 52.43$ |
| $r_{10} = 10.6180$ | $d_{10} = 3.5500$ | $n_{d6} = 1.84666$ | $\nu_{d6} = 23.78$ |
| $r_{11} = 63.2347$ | $d_{11} = $ (Variable) | | |
| $r_{12} = \infty$ (Stop) | $d_{12} = $ (Variable) | | |
| $r_{13} = 7.5612$ (Aspheric) | $d_{13} = 3.5000$ | $n_{d7} = 1.58313$ | $\nu_{d7} = 59.38$ |
| $r_{14} = -10.2086$ | $d_{14} = 0.8000$ | $n_{d8} = 1.72916$ | $\nu_{d8} = 54.68$ |
| $r_{15} = -21.8741$ | $d_{15} = 0.2000$ | | |
| $r_{16} = 12.4993$ | $d_{16} = 2.2000$ | $n_{d9} = 1.49700$ | $\nu_{d9} = 81.54$ |
| $r_{17} = 43.6982$ | $d_{17} = 0.8000$ | $n_{d10} = 1.71736$ | $\nu_{d10} = 29.52$ |
| $r_{18} = 5.0730$ | $d_{18} = $ (Variable) | | |
| $r_{19} = 10.3805$ (Aspheric) | $d_{19} = 2.9000$ | $n_{d11} = 1.49700$ | $\nu_{d11} = 81.54$ |
| $r_{20} = -34.5689$ (Aspheric) | $d_{20} = $ (Variable) | | |
| $r_{21} = \infty$ | $d_{21} = 1.2000$ | $n_{d12} = 1.51633$ | $\nu_{d12} = 64.14$ |
| $r_{22} = \infty$ | $d_{22} = 1.1000$ | $n_{d13} = 1.54771$ | $\nu_{d13} = 62.84$ |
| $r_{23} = \infty$ | $d_{23} = 0.8000$ | | |
| $r_{24} = \infty$ | $d_{24} = 0.7500$ | $n_{d14} = 1.51633$ | $\nu_{d14} = 64.14$ |
| $r_{25} = \infty$ | $d_{25} = 1.2001$ | | |
| $r_{26} = \infty$ (Image Plane) | | | |

Aspherical Coefficients

13th surface $K = -0.9699$
$A_4 = 1.5746 \times 10^{-5}$
$A_6 = -6.7190 \times 10^{-8}$
$A_8 = 1.7530 \times 10^{-9}$
$A_{10} = 0.0000$ 19th surface $K = 0.4544$
$A_4 = -1.7737 \times 10^{-4}$
$A_6 = -1.4118 \times 10^{-5}$
$A_8 = 1.0786 \times 10^{-6}$
$A_{10} = -2.8820 \times 10^{-8}$ 20th surface $K = 29.7571$
$A_4 = -9.0947 \times 10^{-5}$
$A_6 = -1.5903 \times 10^{-5}$
$A_8 = 1.2881 \times 10^{-6}$
$A_{10} = -2.9941 \times 10^{-8}$ Zooming Data ($\infty$)

| | WE | ST | TE |
|---|---|---|---|
| f (mm) | 6.39763 | 19.89997 | 62.69730 |
| $F_{NO}$ | 2.8312 | 3.5055 | 3.6378 |
| $\omega$ (°) | 30.3 | 10.3 | 3.3 |
| $d_6$ | 1.00000 | 13.04920 | 22.19680 |
| $d_{11}$ | 23.39674 | 11.34755 | 2.20000 |
| $d_{12}$ | 5.09105 | 0.97942 | 0.80000 |
| $d_{18}$ | 3.97902 | 5.27649 | 10.92290 |
| $d_{20}$ | 4.89005 | 7.70421 | 2.23718 |

Example 7

| | | | |
|---|---|---|---|
| $r_1 = 45.5895$ | $d_1 = 1.8000$ | $n_{d1} = 1.84666$ | $\nu_{d1} = 23.78$ |
| $r_2 = 30.6401$ | $d_2 = 0.1600$ | | |
| $r_3 = 31.5313$ | $d_3 = 6.1500$ | $n_{d2} = 1.49700$ | $\nu_{d2} = 81.54$ |
| $r_4 = -476.4638$ | $d_4 = 0.1500$ | | |
| $r_5 = 26.4000$ | $d_5 = 4.2500$ | $n_{d3} = 1.61800$ | $\nu_{d3} = 63.33$ |
| $r_6 = 100.7281$ | $d_6 = $ (Variable) | | |
| $r_7 = 116.6110$ | $d_7 = 1.1000$ | $n_{d4} = 1.88300$ | $\nu_{d4} = 40.76$ |
| $r_8 = 8.5804$ | $d_8 = 4.2000$ | | |
| $r_9 = -22.0814$ | $d_9 = 0.8500$ | $n_{d5} = 1.51823$ | $\nu_{d5} = 58.90$ |
| $r_{10} = 10.6621$ | $d_{10} = 3.5500$ | $n_{d6} = 1.84666$ | $\nu_{d6} = 23.78$ |
| $r_{11} = 60.0640$ | $d_{11} = $ (Variable) | | |
| $r_{12} = \infty$ (Stop) | $d_{12} = $ (Variable) | | |
| $r_{13} = 6.7969$ (Aspheric) | $d_{13} = 3.5000$ | $n_{d7} = 1.49700$ | $\nu_{d7} = 81.54$ |
| $r_{14} = -11.6908$ | $d_{14} = 0.8000$ | $n_{d8} = 1.80100$ | $\nu_{d8} = 34.97$ |
| $r_{15} = -16.7603$ | $d_{15} = 0.2000$ | | |
| $r_{16} = 11.5899$ | $d_{16} = 2.2000$ | $n_{d9} = 1.61800$ | $\nu_{d9} = 63.33$ |
| $r_{17} = 65.8021$ | $d_{17} = 0.8000$ | $n_{d10} = 1.76200$ | $\nu_{d10} = 40.10$ |
| $r_{18} = 4.9647$ | $d_{18} = $ (Variable) | | |
| $r_{19} = 10.1974$ (Aspheric) | $d_{19} = 2.9000$ | $n_{d11} = 1.49700$ | $\nu_{d11} = 81.54$ |
| $r_{20} = -37.6218$ | $d_{20} = $ (Variable) | | |

-continued (Aspheric)

| | | | |
|---|---|---|---|
| $r_{21} = \infty$ | $d_{21} = 1.2000$ | $n_{d12} = 1.51633$ | $\nu_{d12} = 64.14$ |
| $r_{22} = \infty$ | $d_{22} = 1.1000$ | $n_{d13} = 1.54771$ | $\nu_{d13} = 62.84$ |
| $r_{23} = \infty$ | $d_{23} = 0.8000$ | | |
| $r_{24} = \infty$ | $d_{24} = 0.7500$ | $n_{d14} = 1.51633$ | $\nu_{d14} = 64.14$ |
| $r_{25} = \infty$ | $d_{25} = 1.2000$ | | |
| $r_{26} = \infty$ (Image Plane) | | | |

Aspherical Coefficients

13th surface $K = -0.9699$
$A_4 = -1.0395 \times 10^{-5}$
$A_6 = -5.3998 \times 10^{-7}$
$A_8 = 5.0966 \times 10^{-9}$
$A_{10} = 0.0000$ 19th surface $K = 0.4544$
$A_4 = -1.8492 \times 10^{-4}$
$A_6 = -1.3019 \times 10^{-5}$
$A_8 = 9.8312 \times 10^{-7}$
$A_{10} = -2.4051 \times 10^{-8}$ 20th surface $K = 29.7574$
$A_4 = -1.3922 \times 10^{-4}$
$A_6 = -1.3125 \times 10^{-5}$
$A_8 = 1.0653 \times 10^{-6}$
$A_{10} = -2.2655 \times 10^{-8}$ Zooming Data ($\infty$)

| | WE | ST | TB |
|---|---|---|---|
| f (mm) | 6.39276 | 19.90291 | 62.69856 |
| $F_{NO}$ | 2.8312 | 3.5055 | 3.6378 |
| $\omega$ (°) | 30.3 | 10.3 | 3.3 |
| $d_6$ | 1.00000 | 13.04307 | 22.19804 |
| $d_{11}$ | 23.39792 | 11.35485 | 2.20000 |
| $d_{12}$ | 5.07989 | 0.98530 | 0.80000 |
| $d_{18}$ | 3.98154 | 5.27954 | 10.92973 |
| $d_{20}$ | 4.90317 | 7.69977 | 2.23480 |

Example 8

| | | | |
|---|---|---|---|
| $r_1 = 47.2089$ | $d_1 = 1.8000$ | $n_{d1} = 1.84666$ | $\nu_{d1} = 23.78$ |
| $r_2 = 30.6191$ | $d_2 = 0.1600$ | | |
| $r_3 = 31.5515$ | $d_3 = 6.1500$ | $n_{d2} = 1.49700$ | $\nu_{d2} = 81.54$ |
| $r_4 = -343.0695$ | $d_4 = 0.1500$ | | |
| $r_5 = 25.6126$ | $d_5 = 4.2500$ | $n_{d3} = 1.61800$ | $\nu_{d3} = 63.33$ |
| $r_6 = 94.3624$ | $d_6 = $ (Variable) | | |
| $r_7 = 103.8659$ | $d_7 = 1.1000$ | $n_{d4} = 1.88300$ | $\nu_{d4} = 40.76$ |
| $r_8 = 8.3426$ | $d_8 = 4.2000$ | | |
| $r_9 = -22.5897$ | $d_9 = 0.8500$ | $n_{d5} = 1.51823$ | $\nu_{d5} = 58.90$ |
| $r_{10} = 10.5805$ | $d_{10} = 3.5500$ | $n_{d6} = 1.84666$ | $\nu_{d6} = 23.78$ |
| $r_{11} = 63.1204$ | $d_{11} = $ (Variable) | | |
| $r_{12} = \infty$ (Stop) | $d_{12} = $ (Variable) | | |
| $r_{13} = 7.9669$ (Aspheric) | $d_{13} = 3.5000$ | $n_{d7} = 1.61800$ | $\nu_{d7} = 63.33$ |
| $r_{14} = -9.6982$ | $d_{14} = 0.8000$ | $n_{d8} = 1.69350$ | $\nu_{d8} = 53.21$ |
| $r_{15} = -26.4073$ | $d_{15} = 0.2000$ | | |
| $r_{16} = 11.3436$ | $d_{16} = 2.2000$ | $n_{d9} = 1.49700$ | $\nu_{d9} = 81.54$ |
| $r_{17} = -40.9591$ | $d_{17} = 0.8000$ | $n_{d10} = 1.72047$ | $\nu_{d10} = 34.71$ |
| $r_{18} = 5.2191$ | $d_{18} = $ (Variable) | | |
| $r_{19} = 9.9801$ (Aspheric) | $d_{19} = 2.9000$ | $n_{d11} = 1.49700$ | $\nu_{d11} = 81.54$ |
| $r_{20} = -35.3067$ (Aspheric) | $d_{20} = $ (Variable) | | |
| $r_{21} = \infty$ | $d_{21} = 1.2000$ | $n_{d12} = 1.51633$ | $\nu_{d12} = 64.14$ |
| $r_{22} = \infty$ | $d_{22} = 1.1000$ | $n_{d13} = 1.54771$ | $\nu_{d13} = 62.84$ |
| $r_{23} = \infty$ | $d_{23} = 0.8000$ | | |
| $r_{24} = \infty$ | $d_{24} = 0.7500$ | $n_{d14} = 1.51633$ | $\nu_{d14} = 64.14$ |
| $r_{25} = \infty$ | $d_{25} = 1.2000$ | | |
| $r_{26} = \infty$ (Image Plane) | | | |

Aspherical Coefficients

13th surface $K = -0.9793$
$A_4 = 3.6708 \times 10^{-5}$
$A_6 = 7.4520 \times 10^{-8}$
$A_8 = -4.0705 \times 10^{-9}$
$A_{10} = 0.0000$ 19th surface $K = 0.4553$
$A_4 = -1.9995 \times 10^{-4}$
$A_6 = -1.7051 \times 10^{-6}$
$A_8 = 3.9508 \times 10^{-7}$
$A_{10} = -1.0605 \times 10^{-8}$ 20th surface $K = 29.7493$
$A_4 = -5.3623 \times 10^{-5}$
$A_6 = -5.1337 \times 10^{-6}$
$A_8 = 7.9397 \times 10^{-7}$
$A_{10} = -1.7128 \times 10^{-8}$ Zooming Data ($\infty$)

| | WE | ST | TE |
|---|---|---|---|
| f (mm) | 6.40231 | 19.90046 | 62.70041 |
| $F_{NO}$ | 2.8160 | 3.4764 | 3.5941 |
| $\omega$ (°) | 30.3 | 10.3 | 3.3 |
| $d_6$ | 1.00000 | 13.05206 | 22.19600 |
| $d_{11}$ | 23.39592 | 11.34386 | 2.20000 |
| $d_{12}$ | 5.09544 | 0.97854 | 0.80000 |
| $d_{18}$ | 3.97781 | 5.27566 | 10.90990 |
| $d_{20}$ | 4.88211 | 7.70115 | 2.24542 |

Example 9

| | | | |
|---|---|---|---|
| $r_1 = 47.0685$ | $d_1 = 1.8000$ | $n_{d1} = 1.84666$ | $\nu_{d1} = 23.78$ |
| $r_2 = 30.5349$ | $d_2 = 0.1600$ | | |
| $r_3 = 31.4093$ | $d_3 = 6.1500$ | $n_{d2} = 1.49700$ | $\nu_{d2} = 81.54$ |
| $r_4 = -375.8331$ | $d_4 = 0.1500$ | | |
| $r_5 = 25.7020$ | $d_5 = 4.2500$ | $n_{d3} = 1.61800$ | $\nu_{d3} = 63.33$ |
| $r_6 = 96.3347$ | $d_6 = $ (Variable) | | |
| $r_7 = 107.1331$ | $d_7 = 1.1000$ | $n_{d4} = 1.88300$ | $\nu_{d4} = 40.76$ |
| $r_8 = 8.5079$ | $d_8 = 4.2000$ | | |
| $r_9 = -22.4321$ | $d_9 = 0.8500$ | $n_{d5} = 1.51823$ | $\nu_{d5} = 58.90$ |
| $r_{10} = 10.7350$ | $d_{10} = 3.5500$ | $n_{d6} = 1.84666$ | $\nu_{d6} = 23.78$ |
| $r_{11} = 60.3091$ | $d_{11} = $ (Variable) | | |
| $r_{12} = \infty$ (Stop) | $d_{12} = $ (Variable) | | |
| $r_{13} = 7.8716$ (Aspheric) | $d_{13} = 3.5000$ | $n_{d7} = 1.61800$ | $\nu_{d7} = 63.33$ |
| $r_{14} = -9.9498$ | $d_{14} = 0.8000$ | $n_{d8} = 1.69680$ | $\nu_{d8} = 55.53$ |
| $r_{15} = -31.3860$ | $d_{15} = 0.2000$ | | |
| $r_{16} = 12.1116$ | $d_{16} = 2.2000$ | $n_{d9} = 1.48749$ | $\nu_{d9} = 70.23$ |
| $r_{17} = 30.8177$ | $d_{17} = 0.8000$ | $n_{d10} = 1.71736$ | $\nu_{d10} = 29.52$ |
| $r_{18} = 5.0799$ | $d_{18} = $ (Variable) | | |
| $r_{19} = 10.0882$ (Aspheric) | $d_{19} = 2.9000$ | $n_{d11} = 1.49700$ | $\nu_{d11} = 81.54$ |
| $r_{20} = -35.7059$ (Aspheric) | $d_{20} = $ (Variable) | | |
| $r_{21} = \infty$ | $d_{21} = 1.2000$ | $n_{d12} = 1.51633$ | $\nu_{d12} = 64.14$ |
| $r_{22} = \infty$ | $d_{22} = 1.1000$ | $n_{d13} = 1.54771$ | $\nu_{d13} = 62.84$ |
| $r_{23} = \infty$ | $d_{23} = 0.8000$ | | |
| $r_{24} = \infty$ | $d_{24} = 0.7500$ | $n_{d14} = 1.51633$ | $\nu_{d14} = 64.14$ |
| $r_{25} = \infty$ | $d_{25} = 1.2000$ | | |
| $r_{26} = \infty$ (Image Plane) | | | |

Aspherical Coefficients

13th surface $K = -0.9794$
$A_4 = 3.5160 \times 10^{-5}$
$A_6 = 1.8145 \times 10^{-7}$
$A_8 = -3.9751 \times 10^{-9}$
$A_{10} = 0.0000$ -continued

19th surface

K = 0.4551
$A_4 = -1.8810 \times 10^{-4}$
$A_6 = -8.4565 \times 10^{-6}$
$A_8 = 7.7469 \times 10^{-7}$
$A_{10} = -1.7709 \times 10^{-8}$

20th surface

K = 29.7489
$A_4 = -8.9536 \times 10^{-5}$
$A_6 = -1.0100 \times 10^{-5}$
$A_8 = 9.8405 \times 10^{-7}$
$A_{10} = -1.8918 \times 10^{-8}$

Zooming Data (∞)

|  | WE | ST | TE |
|---|---|---|---|
| f (mm) | 6.39674 | 19.90008 | 62.70040 |
| $F_{NO}$ | 2.8042 | 3.4621 | 3.5811 |
| ω (°) | 30.3 | 10.3 | 3.3 |
| $d_6$ | 1.00000 | 13.05245 | 22.19610 |
| $d_{11}$ | 23.39609 | 11.34368 | 2.20000 |
| $d_{12}$ | 5.09037 | 0.98019 | 0.80000 |
| $d_{18}$ | 3.97650 | 5.27791 | 10.91590 |
| $d_{20}$ | 4.89013 | 7.69891 | 2.24107 |

Example 10

| | | |
|---|---|---|
| $r_1 = 46.7372$ | $d_1 = 1.8000$ | $n_{d1} = 1.84666$ $v_{d1} = 23.78$ |
| $r_2 = 30.7447$ | $d_2 = 0.1600$ | |
| $r_3 = 31.6872$ | $d_3 = 6.1500$ | $n_{d2} = 1.49700$ $v_{d2} = 81.54$ |
| $r_4 = -376.2259$ | $d_4 = 0.1500$ | |
| $r_5 = 25.9570$ | $d_5 = 4.2500$ | $n_{d3} = 1.61800$ $v_{d3} = 63.33$ |
| $r_6 = 97.5281$ | $d_6 = $ (Variable) | |
| $r_7 = 110.7491$ | $d_7 = 1.1000$ | $n_{d4} = 1.88300$ $v_{d4} = 40.76$ |
| $r_8 = 8.5070$ | $d_8 = 4.2000$ | |
| $r_9 = -22.1162$ | $d_9 = 0.8500$ | $n_{d5} = 1.51823$ $v_{d5} = 58.90$ |
| $r_{10} = 10.7795$ | $d_{10} = 3.5500$ | $n_{d6} = 1.84666$ $v_{d6} = 23.78$ |
| $r_{11} = 63.0843$ | $d_{11} = $ (Variable) | |
| $r_{12} = \infty$ (Stop) | $d_{12} = $ (Variable) | |
| $r_{13} = 7.8179$ (Aspheric) | $d_{13} = 3.5000$ | $n_{d7} = 1.61800$ $v_{d7} = 63.33$ |
| $r_{14} = -9.9739$ | $d_{14} = 0.8000$ | $n_{d8} = 1.69680$ $v_{d8} = 55.53$ |
| $r_{15} = -29.5518$ | $d_{15} = 0.2000$ | |
| $r_{16} = 11.9593$ | $d_{16} = 2.2000$ | $n_{d9} = 1.48749$ $v_{d9} = 70.23$ |
| $r_{17} = 77.5578$ | $d_{17} = 0.8000$ | $n_{d10} = 1.71736$ $v_{d10} = 29.52$ |
| $r_{18} = 5.0858$ | $d_{18} = $ (Variable) | |
| $r_{19} = 11.3314$ (Aspheric) | $d_{19} = 2.9000$ | $n_{d11} = 1.58913$ $v_{d11} = 61.15$ |
| $r_{20} = -50.6448$ (Aspheric) | $d_{20} = $ (Variable) | |
| $r_{21} = \infty$ | $d_{21} = 1.2000$ | $n_{d12} = 1.51633$ $v_{d12} = 64.14$ |
| $r_{22} = \infty$ | $d_{22} = 1.1000$ | $n_{d13} = 1.54771$ $v_{d13} = 62.84$ |
| $r_{23} = \infty$ | $d_{23} = 0.8000$ | |
| $r_{24} = \infty$ | $d_{24} = 0.7500$ | $n_{d14} = 1.51633$ $v_{d14} = 64.14$ |
| $r_{25} = \infty$ | $d_{25} = 1.2000$ | |
| $r_{26} = \infty$ (Image Plane) | | |

Aspherical Coefficients

13th surface

K = -0.9798
$A_4 = 3.7702 \times 10^{-5}$
$A_6 = -2.0914 \times 10^{-7}$
$A_8 = 9.9962 \times 10^{-9}$
$A_{10} = 0.0000$

19th surface

K = 0.4553
$A_4 = -1.7395 \times 10^{-4}$
$A_6 = -6.7665 \times 10^{-6}$
$A_8 = 5.9083 \times 10^{-7}$
$A_{10} = -1.6446 \times 10^{-8}$

20th surface

K = 29.7506
$A_4 = -1.6427 \times 10^{-4}$
$A_6 = -9.5281 \times 10^{-6}$
$A_8 = 7.7745 \times 10^{-7}$
$A_{10} = -1.9113 \times 10^{-8}$

Zooming Data (∞)

|  | WE | ST | TE |
|---|---|---|---|
| f (mm) | 6.39758 | 19.90305 | 62.70091 |
| $F_{NO}$ | 2.8050 | 3.4652 | 3.5783 |
| ω (°) | 30.3 | 10.3 | 3.3 |
| $d_6$ | 1.00000 | 13.04725 | 22.19659 |
| $d_{11}$ | 23.39641 | 11.34911 | 2.20000 |
| $d_{12}$ | 5.08854 | 0.98395 | 0.80000 |
| $d_{18}$ | 3.97879 | 5.27789 | 10.91343 |
| $d_{20}$ | 4.89041 | 7.69590 | 2.24422 |

Example 11

| | | |
|---|---|---|
| $r_1 = 75.8116$ | $d_1 = 0.7000$ | $n_{d1} = 1.80610$ $v_{d1} = 40.92$ |
| $r_2 = 4.7120$ (Aspheric) | $d_2 = 2.0000$ | |
| $r_3 = 8.5819$ | $d_3 = 1.8000$ | $n_{d2} = 1.84666$ $v_{d2} = 23.78$ |
| $r_4 = 21.0066$ | $d_4 = $ (Variable) | |
| $r_5 = \infty$ (Stop) | $d_5 = 1.2000$ | |
| $r_6 = 116.9933$ (Aspheric) | $d_6 = 1.8000$ | $n_{d3} = 1.61772$ $v_{d3} = 49.81$ |
| $r_7 = -3.5000$ | $d_7 = 0.7000$ | $n_{d4} = 1.77250$ $v_{d4} = 49.60$ |
| $r_8 = -6.0042$ | $d_8 = 0.1500$ | |
| $r_9 = 3.5277$ (Aspheric) | $d_9 = 1.8000$ | $n_{d5} = 1.61800$ $v_{d5} = 63.33$ |
| $r_{10} = 7.0000$ | $d_{10} = 0.7000$ | $n_{d6} = 1.84666$ $v_{d6} = 23.78$ |
| $r_{11} = 2.6610$ | $d_{11} = $ (Variable) | |
| $r_{12} = 13.8625$ | $d_{12} = 1.8000$ | $n_{d7} = 1.48749$ $v_{d7} = 70.23$ |
| $r_{13} = -18.5488$ | $d_{13} = $ (Variable) | |
| $r_{14} = \infty$ | $d_{14} = 0.8000$ | $n_{d8} = 1.51633$ $v_{d8} = 64.14$ |
| $r_{15} = \infty$ | $d_{15} = 1.5000$ | $n_{d9} = 1.54771$ $v_{d9} = 62.84$ |
| $r_{16} = \infty$ | $d_{16} = 0.8000$ | |
| $r_{17} = \infty$ | $d_{17} = 0.7500$ | $n_{d10} = 1.51633$ $v_{d10} = 64.14$ |
| $r_{18} = \infty$ | $d_{18} = 1.2102$ | |
| $r_{19} = \infty$ (Images Plane) | | |

Aspherical Coefficients

2nd surface

K = 0
$A_4 = -1.0943 \times 10^{-3}$
$A_6 = 3.8208 \times 10^{-5}$
$A_8 = -4.1725 \times 10^{-6}$
$A_{10} = 0.0000$

6th surface

K = 0
$A_4 = -1.5470 \times 10^{-3}$
$A_6 = 1.0295 \times 10^{-4}$
$A_8 = -3.2151 \times 10^{-6}$
$A_{10} = 0.0000$

9th surface

K = 0
$A_4 = 5.8224 \times 10^{-4}$
$A_6 = -3.5184 \times 10^{-5}$
$A_8 = -1.2415 \times 10^{-6}$
$A_{10} = 0.0000$

Zooming Data (∞)

|  | WE | ST | TE |
|---|---|---|---|
| f (mm) | 4.50123 | 8.69180 | 12.89931 |
| $F_{NO}$ | 2.5978 | 3.4518 | 4.5516 |
| ω (°) | 33.2 | 18.0 | 12.3 |
| $d_4$ | 12.83567 | 3.76600 | 1.50000 |
| $d_{11}$ | 2.53628 | 6.64793 | 13.12278 |
| $d_{13}$ | 0.92173 | 1.78312 | 0.99896 |

-continued

Example 12

| | | | |
|---|---|---|---|
| $r_1 = 64.2184$ | $d_1 = 0.7000$ | $n_{d1} = 1.80610$ | $\nu_{d1} = 40.92$ |
| $r_2 = 4.6497$ (Aspheric) | $d_2 = 2.0000$ | | |
| $r_3 = 8.3957$ | $d_3 = 1.8000$ | $n_{d2} = 1.84666$ | $\nu_{d2} = 23.78$ |
| $r_4 = 19.5987$ | $d_4 =$ (Variable) | | |
| $r_5 = \infty$ (Stop) | $d_5 = 1.2000$ | | |
| $r_6 = 132.5487$ | $d_6 = 0.7000$ | $n_{d3} = 1.69680$ | $\nu_{d3} = 55.53$ |
| $r_7 = 9.3894$ | $d_7 = 2.0000$ | $n_{d4} = 1.61800$ | $\nu_{d4} = 63.33$ |
| $r_8 = -7.9922$ (Aspheric) | $d_8 = 0.1500$ | | |
| $r_9 = 3.4987$ (Aspheric) | $d_9 = 1.8000$ | $n_{d5} = 1.74320$ | $\nu_{d5} = 49.34$ |
| $r_{10} = 6.9089$ | $d_{10} = 0.7000$ | $n_{d6} = 1.84666$ | $\nu_{d6} = 23.78$ |
| $r_{11} = 2.5638$ | $d_{11} =$ (Variable) | | |
| $r_{12} = 18.7489$ | $d_{12} = 1.8000$ | $n_{d7} = 1.58913$ | $\nu_{d7} = 61.14$ |
| $r_{13} = -19.7491$ | $d_{13} =$ (Variable) | | |
| $r_{14} = \infty$ | $d_{14} = 0.8000$ | $n_{d8} = 1.51633$ | $\nu_{d8} = 64.14$ |
| $r_{15} = \infty$ | $d_{15} = 1.5000$ | $n_{d9} = 1.54771$ | $\nu_{d9} = 62.84$ |
| $r_{16} = \infty$ | $d_{16} = 0.8000$ | | |
| $r_{17} = \infty$ | $d_{17} = 0.7500$ | $n_{d10} = 1.51633$ | $\nu_{d10} = 64.14$ |
| $r_{18} = \infty$ | $d_{18} = 1.2099$ | | |
| $r_{19} = \infty$ (Image Plane) | | | |

Aspherical Coefficients

2nd surface $K = 0$
$A_4 = -1.1025 \times 10^{-3}$
$A_6 = 3.8561 \times 10^{-5}$
$A_8 = -4.3968 \times 10^{-6}$
$A_{10} = 0.0000$ 8th surface $K = 0$
$A_4 = 1.8035 \times 10^{-3}$
$A_6 = -2.3483 \times 10^{-4}$
$A_8 = 1.2407 \times 10^{-5}$
$A_{10} = 0.0000$ 9th surface $K = 0$
$A_4 = 9.9312 \times 10^{-4}$
$A_6 = -1.9052 \times 10^{-4}$
$A_8 = 3.4770 \times 10^{-6}$
$A_{10} = 0.0000$ Zomming Data ($\infty$)

| | WE | ST | TE |
|---|---|---|---|
| f (mm) | 4.49946 | 8.69114 | 12.89906 |
| $F_{NO}$ | 2.5943 | 3.4614 | 4.5554 |
| $\omega$ (°) | 33.3 | 17.9 | 12.3 |
| $d_4$ | 12.63777 | 3.67812 | 1.50000 |
| $d_{11}$ | 2.53628 | 6.49668 | 12.98144 |
| $d_{13}$ | 0.92173 | 1.85245 | 0.99588 |

Aberration diagrams for Examples 1 to 12 upon focused on an object point at infinity are shown in FIGS. 13 to 24, wherein spherical aberrations SA, astigmatisms AS, distortions DT and chromatic aberrations of magnification CC at the wide-angle end (a), in the intermediate state (b) and at the telephoto end (c), respectively, are illustrated. Throughout FIGS. 13 to 24, "FLY" stands for an image height.

Enumerated below are the values of the parameters regarding the conditions in Examples 1 to 12.

| | Examples | | | | |
|---|---|---|---|---|---|
| | 1 | 2 | 3 | 4 | 5 |
| L | 7.2 | 7.2 | 7.2 | 7.2 | 7.2 |
| $(\Delta\theta_{gF})$ C1p | -0.0081 | -0.0043 | -0.0043 | -0.0043 | -0.0043 |
| $(\Delta\theta_{gF})$ C2p | 0.0280 | 0.0280 | 0.0280 | 0.0280 | 0.0280 |
| $(\Delta\theta_{gF})$ C1n | 0.0015 | 0.0015 | 0.0015 | -0.0092 | -0.0086 |
| $(\Delta\theta_{gF})$ C2n | -0.0037 | -0.0037 | -0.0037 | -0.0019 | -0.0110 |
| $(\nu_d)$ C1p | 53.21 | 61.15 | 61.15 | 61.15 | 61.15 |
| $(\nu_d)$ C2p | 81.54 | 81.54 | 81.54 | 81.54 | 81.54 |
| $(\nu_d)$ C1n | 34.97 | 34.97 | 34.97 | 49.60 | 54.68 |
| $(\nu_d)$ C2n | 37.16 | 37.16 | 37.16 | 34.71 | 29.52 |
| $(R_{C21} + R_{C22})/(R_{C21} - R_{C22})$ | 4.75576 | 4.11571 | 4.10439 | 3.26257 | 3.01310 |
| $\Phi p \cdot (\Delta\theta_{gF}) \, p \cdot L$ | -0.008204 | -0.003690 | -0.003680 | -0.003889 | -0.003723 |
| | 0.014357 | 0.014050 | 0.014151 | 0.014036 | 0.008337 |
| $\Phi n \cdot (\Delta\theta_{gF}) \, n \cdot L$ | -0.000599 | -0.000284 | -0.000276 | 0.002652 | 0.002362 |
| | 0.004765 | 0.004978 | 0.005011 | 0.002346 | -0.010234 |
| $(\Phi C1n + \Phi C2n) \cdot L$ | -1.68768 | -1.53432 | -1.53864 | -1.5228 | -1.20456 |
| dA/L | 0.020833 | 0.020833 | 0.020833 | 0.027778 | 0.027778 |
| $L/R_{c2c}$ | -0.12540 | -0.10558 | -0.11331 | -0.27614 | 0.13137 |
| mST/mWS | 0.040220 | 0.049132 | 0.029973 | 0.041860 | 0.043936 |
| $(\Delta\theta_{gF})^*$ | 0.0051 | 0.0051 | 0.0051 | 0.0280 | 0.0280 |
| $(\Delta\theta_{gF})^{**}$ | 0.0022 | 0.0022 | 0.0022 | 0.0051 | 0.0051 |
| $n_{21}$ | 1.88300 | 1.88300 | 1.88300 | 1.88300 | 1.88300 |
| $n_{cp} - n_{cn}$ | 0.33033 | 0.32924 | 0.32924 | 0.32924 | 0.32924 |
| AspRR – AspRF | -0.00261 | -0.00544 | -0.00575 | -0.00634 | -0.00848 |
| $\beta 2T$ | -3.81216 | -3.87184 | -3.87001 | -3.88667 | -3.83441 |
| $\beta RT$ | -0.40630 | -0.40115 | -0.40168 | -0.40138 | -0.40597 |
| $s \cdot p/L$ | 0.029 | 0.029 | 0.029 | 0.026 | 0.026 |
| $p/L \times 10^3$ | 0.39 | 0.39 | 0.39 | 0.34 | 0.34 |
| $\tau_{400}/\tau_{550}$ | 0.0 | 0.0 | 0.0 | 0.0 | 0.0 |
| $\tau_{440}/\tau_{550}$ | 1.06 | 1.06 | 1.06 | 1.06 | 1.06 |
| $\tau_{600}/\tau_{550}$ | 1.0 | 1.0 | 1.0 | 1.0 | 1.0 |
| $\tau_{700}/\tau_{550}$ | 0.04 | 0.04 | 0.04 | 0.04 | 0.04 |

-continued

| | 实施例 | | | | |
|---|---|---|---|---|---|
| | 6 | 7 | 8 | 9 | 10 |
| L | 7.2 | 7.2 | 7.2 | 7.2 | 7.2 |
| $(\Delta\theta_{gF})$ C1p | −0.0031 | 0.0280 | 0.0051 | 0.0051 | 0.0051 |
| $(\Delta\theta_{gF})$ C2p | 0.0280 | 0.0051 | 0.0280 | 0.0022 | 0.0022 |
| $(\Delta\theta_{gF})$ C1n | −0.0086 | 0.0015 | −0.0081 | −0.0082 | −0.0082 |
| $(\Delta\theta_{gF})$ C2n | 0.0110 | −0.0001 | −0.0019 | 0.0110 | 0.0110 |
| $(\nu_d)$ C1p | 59.38 | 81.54 | 63.33 | 63.33 | 63.33 |
| $(\nu_d)$ C2p | 54.68 | 63.33 | 81.54 | 70.23 | 70.23 |
| $(\nu_d)$ C1n | 81.54 | 34.97 | 53.21 | 55.53 | 55.53 |
| $(\nu_d)$ C2n | 29.52 | 40.10 | 34.71 | 29.52 | 29.52 |
| $(R_{C21} + R_{C22})/(R_{C21} - R_{C22})$ | 2.36621 | 2.49874 | 2.70433 | 2.44485 | 2.47985 |
| $\Phi p \cdot (\Delta\theta_{gF}) p \cdot L$ | −0.002779 | 0.021847 | 0.004796 | 0.004776 | 0.005722 |
| | 0.005857 | 0.001638 | 0.011121 | 0.000402 | 0.000521 |
| $\Phi n \cdot (\Delta\theta_{gF}) n \cdot L$ | 0.002290 | −0.000208 | 0.002587 | 0.002781 | 0.004418 |
| | −0.009814 | 0.000102 | 0.002145 | −0.009219 | −0.010355 |
| $(\Phi C1n + \Phi C2n) \cdot L$ | −1.15848 | −1.15488 | −1.44864 | −1.1772 | −1.27224 |
| dA/L | 0.027778 | 0.027778 | 0.027778 | 0.027778 | 0.027778 |
| $L/R_{c2c}$ | 0.16477 | 0.10942 | −0.17579 | 0.23363 | 0.09283 |
| mST/mWS | 0.043637 | 0.045255 | 0.043368 | 0.043840 | 0.043292 |
| $(\Delta\theta_{gF})^*$ | 0.0280 | 0.0280 | 0.0280 | 0.0280 | 0.0280 |
| $(\Delta\theta_{gF})^{**}$ | 0.0051 | 0.0051 | 0.0051 | 0.0051 | 0.0051 |
| $n_{21}$ | 1.88300 | 1.88300 | 1.88300 | 1.88300 | 1.88300 |
| $n_{cp} - n_{cn}$ | 0.32924 | 0.32843 | 0.32843 | 0.32843 | 0.32843 |
| AspRR − AspRF | −0.00497 | −0.00587 | −0.00116 | −0.00373 | −0.00513 |
| $\beta 2T$ | −3.96939 | −3.99353 | −4.03766 | −4.02199 | −4.04474 |
| $\beta RT$ | −0.39405 | −0.39082 | −0.38836 | −0.38922 | −0.38704 |
| $s \cdot p/L$ | 0.022 | 0.022 | 0.022 | 0.026 | 0.026 |
| $p/L \times 10^3$ | 0.29 | 0.29 | 0.29 | 0.34 | 0.34 |
| $\tau_{400}/\tau_{550}$ | 0.0 | 0.0 | 0.0 | 0.0 | 0.0 |
| $\tau_{440}/\tau_{550}$ | 1.06 | 1.06 | 1.06 | 1.06 | 1.06 |
| $\tau_{600}/\tau_{550}$ | 1.0 | 1.0 | 1.0 | 1.0 | 1.0 |
| $\tau_{700}/\tau_{550}$ | 0.04 | 0.04 | 0.04 | 0.04 | 0.04 |

| | 实施例 | |
|---|---|---|
| | 11 | 12 |
| L | 5.6 | 5.6 |
| $(\Delta\theta_{gF})$ C1p | −0.0006 | 0.0051 |
| $(\Delta\theta_{gF})$ C2p | 0.0051 | −0.0085 |
| $(\Delta\theta_{gF})$ C1n | −0.0092 | −0.0082 |
| $(\Delta\theta_{gF})$ C2n | 0.0174 | 0.0174 |
| $(\nu_d)$ C1p | 49.81 | 63.33 |
| $(\nu_d)$ C2p | 63.33 | 49.34 |
| $(\nu_d)$ C1n | 49.60 | 55.53 |
| $(\nu_d)$ C2n | 23.78 | 23.78 |
| $(R_{C21} + R_{C22})/(R_{C21} - R_{C22})$ | 7.1405 | 6.4847 |
| $\Phi p \cdot (\Delta\theta_{gF}) p \cdot L$ | −0.000607 | 0.003910 |
| | 0.002973 | −0.006112 |
| $\Phi n \cdot (\Delta\theta_{gF}) n \cdot L$ | 0.004163 | 0.003159 |
| | −0.017793 | −0.018738 |
| $(\Phi C1n + \Phi C2n) \cdot L$ | −1.47504 | −1.46216 |
| dA/L | 0.02679 | 0.02679 |
| $L/R_{c2c}$ | 0.80000 | 0.81055 |
| mST/mWS | — | — |
| $(\Delta\theta_{gF})^*$ | — | — |
| $(\Delta\theta_{gF})^{**}$ | — | — |
| $n_{21}$ | — | — |
| $n_{cp} - n_{cn}$ | — | — |
| AspRR − AspRF | — | — |
| $\beta 2T$ | — | — |
| $\beta RT$ | — | — |
| $s \cdot p/L$ | 0.022 | 0.022 |
| $p/L \times 10^3$ | 0.29 | 0.29 |
| $\tau_{400}/\tau_{550}$ | 0.0 | 0.0 |
| $\tau_{440}/\tau_{550}$ | 1.06 | 1.06 |
| $\tau_{600}/\tau_{550}$ | 1.0 | 1.0 |
| $\tau_{700}/\tau_{550}$ | 0.04 | 0.04 |

It is noted that in Examples 1 to 10, the low-pass filter LF has a total thickness, $t_{LPF}$, of 1.100 mm and a triple-layer structure, and in Examples 11 and 12, the low-pass filter LF has a total thickness, $t_{LPF}$, of 1.500 mm and a triple-layer structure. It is also appreciated that many modifications may be made to the aforesaid examples without departing from the scope of the invention. For instance, the low-pass filter may be formed of one single low-pass filter element LF.

Figure 25:
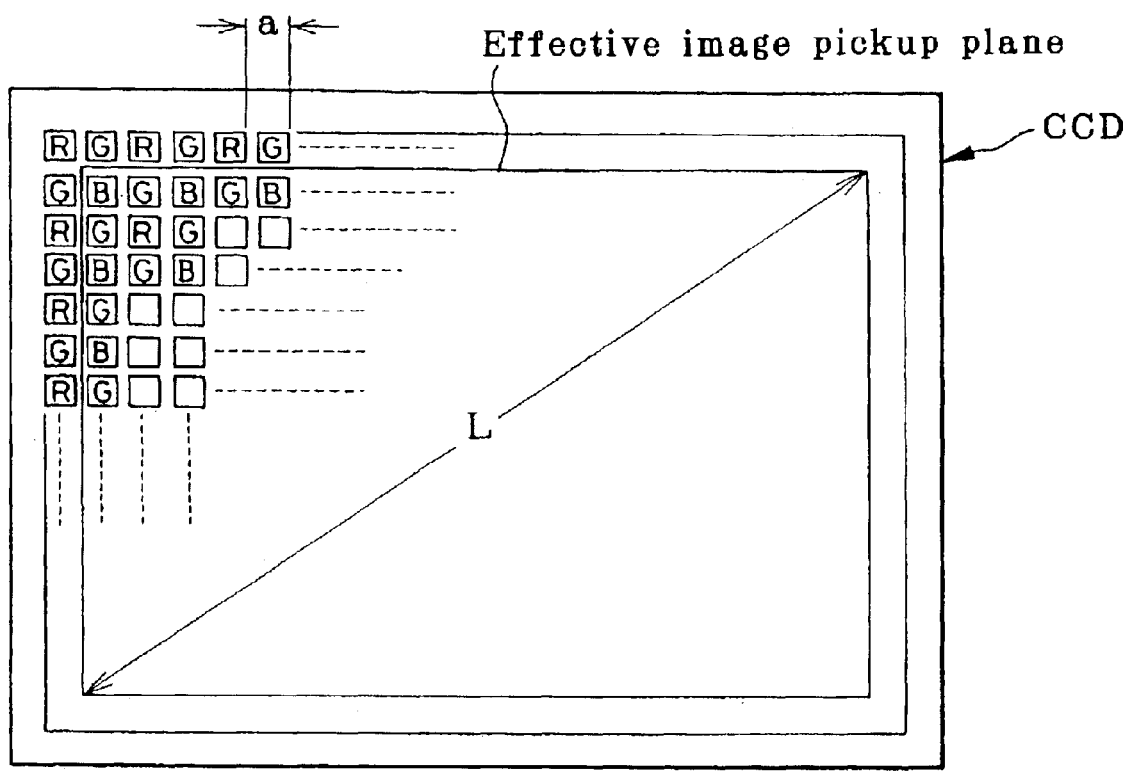
FIG. 25 is illustrative of the diagonal length of an effective image pickup surface when an image pickup device is used for phototaking.
Figure 26:
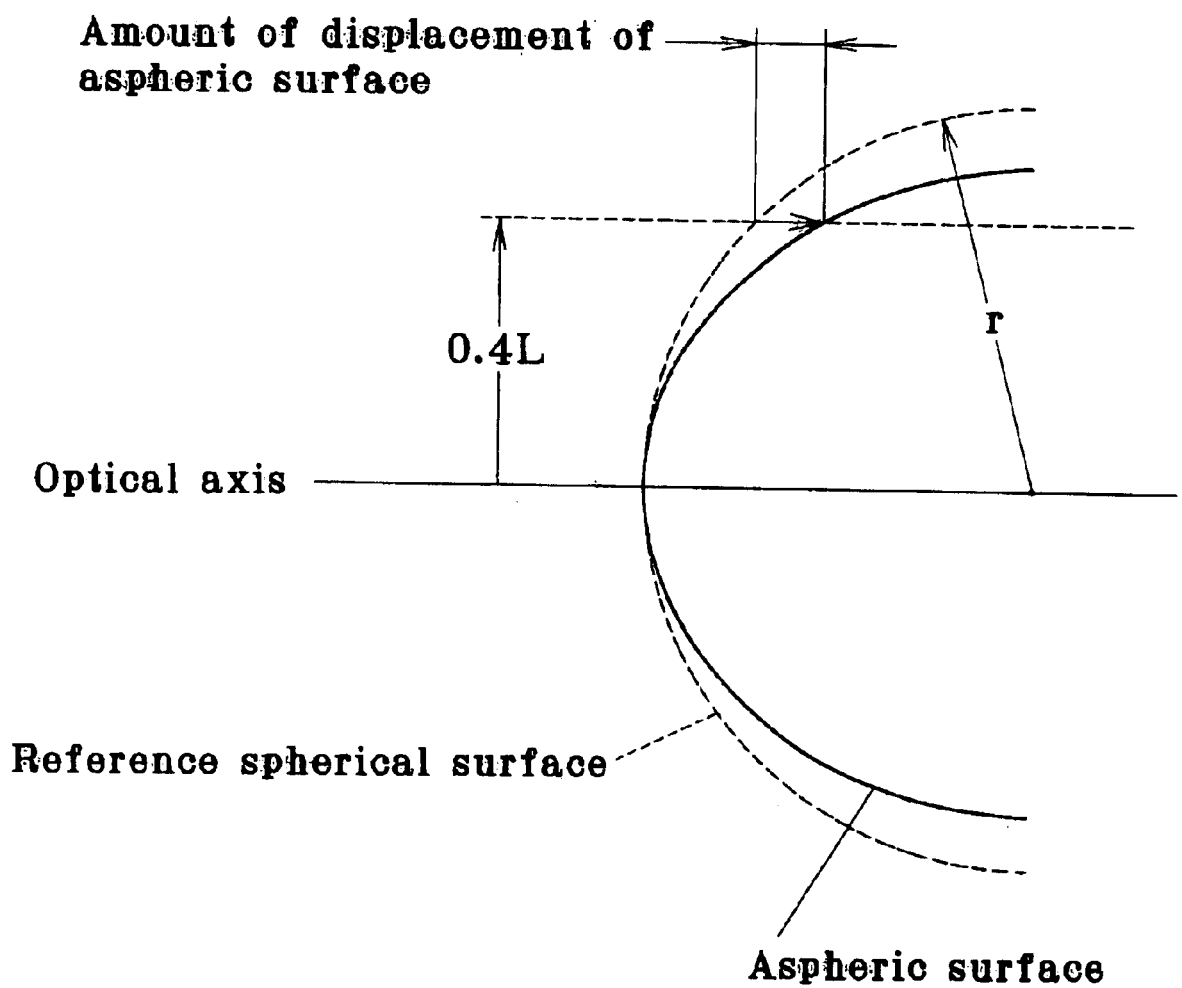
FIG. 26 is illustrative of the definition of the amount of displacement of an aspheric surface in the invention.

Here the diagonal length L of the effective image pickup surface and the pixel spacing a that is equivalent to the horizontal pixel pitch p are explained. FIG. 25 is illustrative of one exemplary pixel array of an image pickup device, wherein R (red), G (green) and B (blue) pixels or cyan, magenta, yellow and green (G) pixels are mosaically arranged at the pixel spacing a. The "effective image pickup surface" used herein is understood to mean a certain area in the photoelectric conversion surface on an image pickup device used for the reproduction of a phototaken image (on a personal computer or by a printer). The effective image pickup surface shown in FIG. 25 is set at an area narrower than the total photoelectric conversion surface on the image pickup device, depending on the performance of the optical system used (an image circle that can be ensured by the performance of the optical system). The diagonal length L of an effective image pickup surface is thus defined by that of this effective image pickup surface. Although the image pickup range used for image reproduction may be variable, it is noted that when the zoom lens of the invention is used on an image pickup system having such functions, the diagonal length L of its effective image pickup surface varies. In that case, the diagonal length L of the effective image pickup surface according to the invention is defined by the maximum value in the widest possible range for L.

The infrared cut means includes an infrared cut absorption filter IF and an infrared sharp cut coat. The infrared cut absorption filter IF is formed of a glass having an infrared absorber therein, and the infrared sharp cut coat cuts infrared rays by reflection rather than by absorption. Instead of this infrared cut absorption filter, it is thus acceptable to use a low-pass filter LF or dummy transparent plane plate with an infrared sharp cut coat applied directly thereon.

Preferably in this case, the near-infrared sharp cut coat is designed to have a transmittance of at least 80% at 600 nm wavelength and a transmittance of up to 10% at 700 nm wavelength. More specifically, the near-infrared sharp cut coat has a multilayer structure made up of 27 such layers as mentioned below; however, the design wavelength is 780 nm.

| Substrate | Material | Physical Thickness (nm) | λ/4 |
| --- | --- | --- | --- |
| 1st layer | Al$_2$O$_3$ | 58.96 | 0.50 |
| 2nd layer | TiO$_2$ | 84.19 | 1.00 |
| 3rd layer | SiO$_2$ | 134.14 | 1.00 |
| 4th layer | TiO$_2$ | 84.19 | 1.00 |
| 5th layer | SiO$_2$ | 134.14 | 1.00 |
| 6th layer | TiO$_2$ | 84.19 | 1.00 |
| 7th layer | SiO$_2$ | 134.14 | 1.00 |
| 8th layer | TiO$_2$ | 84.19 | 1.00 |
| 9th layer | SiO$_2$ | 134.14 | 1.00 |
| 10th layer | TiO$_2$ | 84.19 | 1.00 |
| 11th layer | SiO$_2$ | 134.14 | 1.00 |
| 12th layer | TiO$_2$ | 84.19 | 1.00 |
| 13th layer | SiO$_2$ | 134.14 | 1.00 |
| 14th layer | TiO$_2$ | 84.19 | 1.00 |
| 15th layer | SiO$_2$ | 178.41 | 1.33 |
| 16th layer | TiO$_2$ | 101.03 | 1.21 |
| 17th layer | SiO$_2$ | 167.67 | 1.25 |
| 18th layer | TiO$_2$ | 96.82 | 1.15 |
| 19th layer | SiO$_2$ | 147.55 | 1.05 |
| 20th layer | TiO$_2$ | 84.19 | 1.00 |
| 21st layer | SiO$_2$ | 160.97 | 1.20 |
| 22nd layer | TiO$_2$ | 84.19 | 1.00 |
| 23rd layer | SiO$_2$ | 154.26 | 1.15 |
| 24th layer | TiO$_2$ | 95.13 | 1.13 |
| 25th layer | SiO$_2$ | 160.97 | 1.20 |
| 26th layer | TiO$_2$ | 99.34 | 1.18 |
| 27th layer | SiO$_2$ | 87.19 | 0.65 |

Air

Figure 27:
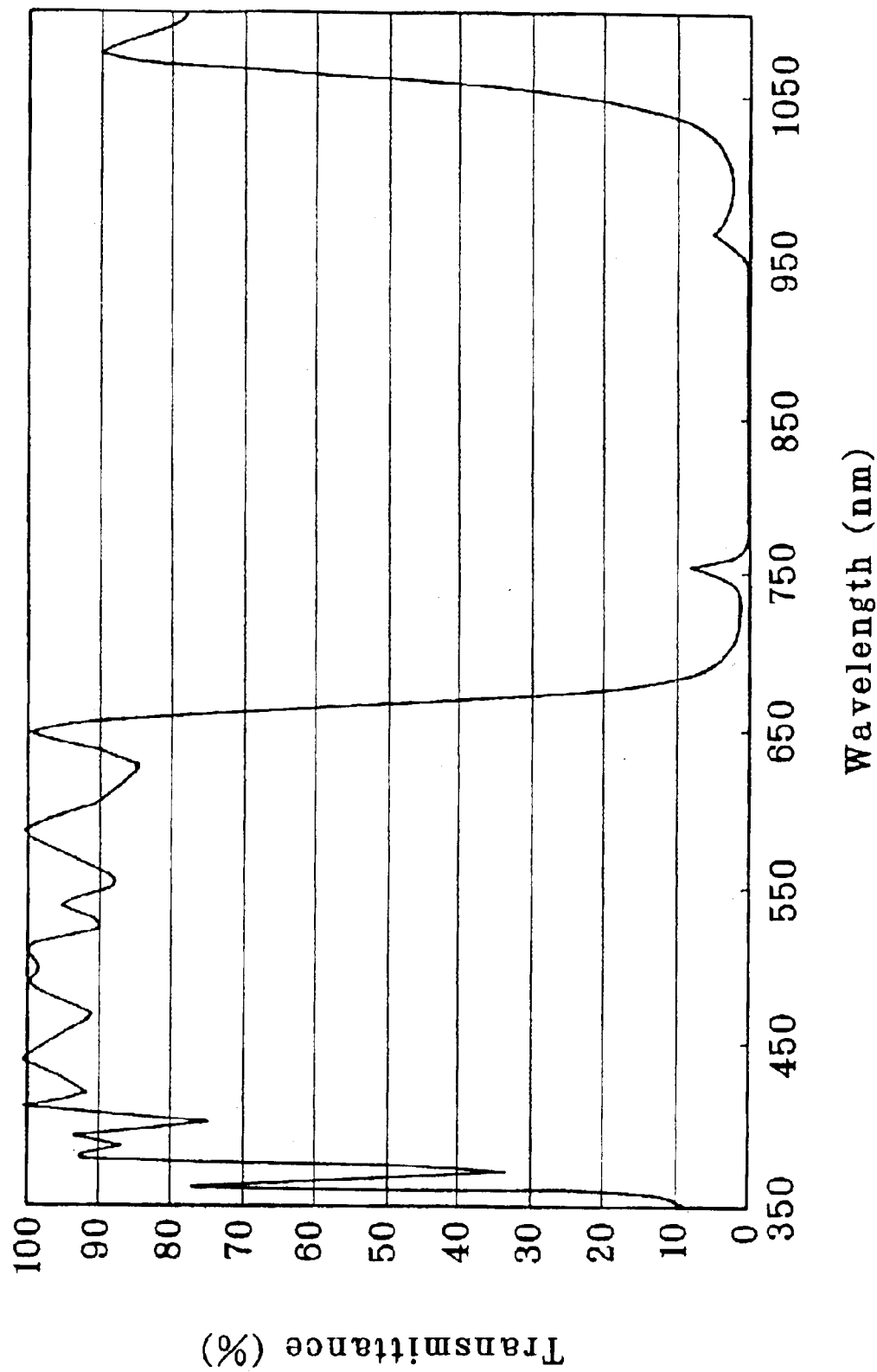
FIG. 27 is a diagram of the transmittance properties of one example of a near-infrared cut coat.

The aforesaid near-infrared sharp cut coat has such transmittance characteristics as shown in FIG. 27.

Figure 28:
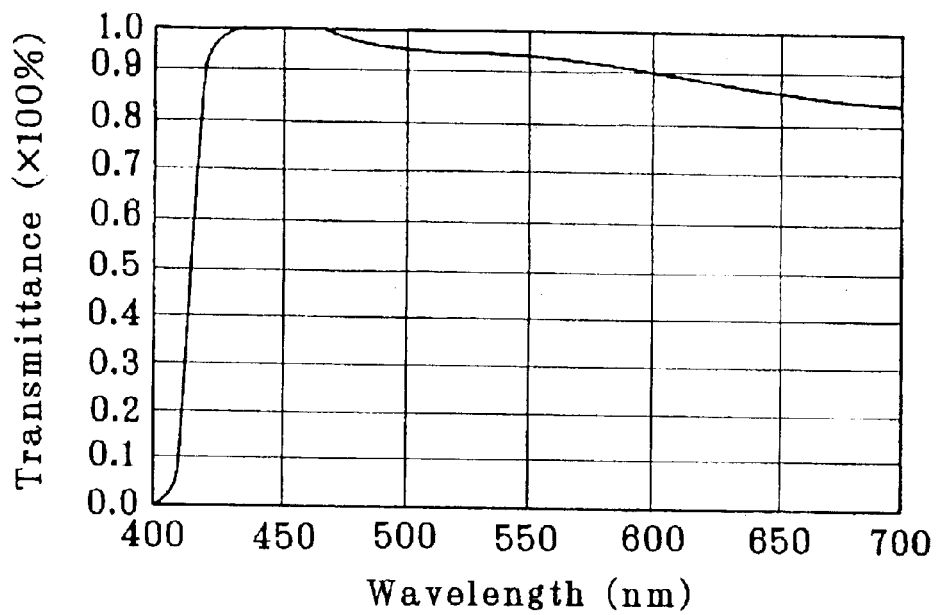
FIG. 28 is a diagram of the transmittance properties of one example of a color filter provided on the emergent surface side of a low-pass filter.

The low-pass filter LF is provided on its exit surface side with a color filter or coat for reducing the transmission of colors at such a short wavelength region as shown in FIG. 28, thereby further enhancing the color reproducibility of an electronic image.

Preferably, that filter or coat should be designed such that the ratio of the transmittance of 420 nm wavelength with respect to the transmittance of a wavelength in the range of 400 nm to 700 nm at which the highest transmittance is found is at least 15% and that the ratio of 400 nm wavelength with respect to the highest wavelength transmittance is up to 6%.

It is thus possible to reduce a discernible difference between the colors perceived by the human eyes and the colors of the image to be picked up and reproduced. In other words, it is possible to prevent degradation in images due to the fact that a color of short wavelength less likely to be perceived through the human sense of sight can be readily seen by the human eyes.

When the ratio of the 400 nm wavelength transmittance is greater than 6%, the short wavelength region less likely to be perceived by the human eyes would be reproduced with perceivable wavelengths. Conversely, when the ratio of the 420 nm wavelength transmittance is less than 15%, a wavelength region perceivable by the human eyes is less likely to be reproduced, putting colors in an ill-balanced state.

Such means for limiting wavelengths can be more effective for image pickup systems using a complementary colors mosaic filter.

In each of the aforesaid examples, coating is applied in such a way that, as shown in FIG. 28, the transmittance for 400 nm wavelength is 0%, the transmittance for 420 nm is 90%, and the transmittance for 440 nm peaks or reaches 100%.

With the synergistic action of the aforesaid near-infrared sharp cut coat and that coating, the transmittance for 400 nm is set at 0%, the transmittance for 420 nm at 80%, the transmittance for 600 nm at 82%, and the transmittance for 700 nm at 2% with the transmittance for 450 nm wavelength peaking at 99%, thereby ensuring more faithful color reproduction.

The low-pass filter LF is made up of three different filter elements stacked one upon another in the optical axis direction, each filter element having crystallographic axes in directions where, upon projected onto the image plane, the azimuth angle is horizontal (=0°) and ±45° therefrom. Three such filter elements are mutually displaced by a μm in the horizontal direction and by SQRT(½)×a in the ±45° direction for the purpose of moirécontrol, wherein SQRT means a square root.

Figure 29:
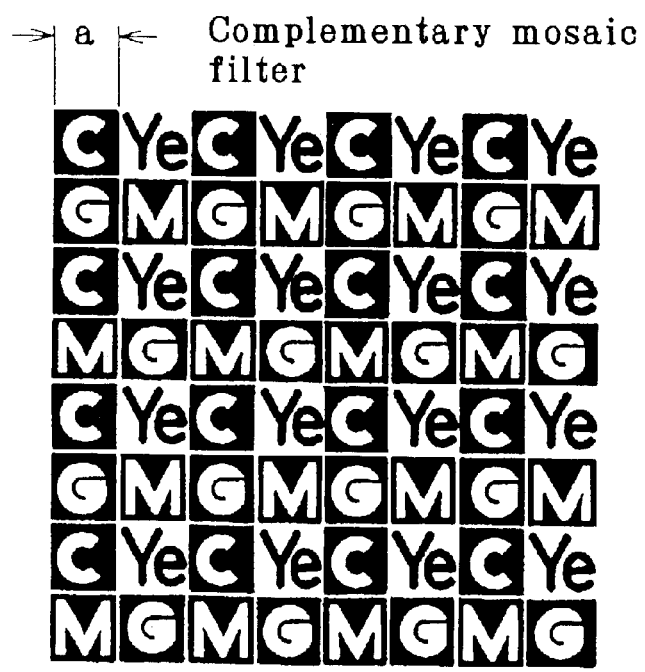
FIG. 29 is illustrative of one array of color filter elements in a complementary colors mosaic filter.

The image pickup surface I of a CCD is provided thereon with a complementary colors mosaic filter wherein, as shown in FIG. 29, color filter elements of four colors, cyan, magenta, yellow and green are arranged in a mosaic fashion corresponding to image pickup pixels. More specifically, these four different color filter elements, used in almost equal numbers, are arranged in such a mosaic fashion that neighboring pixels do not correspond to the same type of color filter elements, thereby ensuring more faithful color reproduction.

To be more specific, the complementary colors mosaic filter is composed of at least four different color filter elements as shown in FIG. 29, which should preferably have such characteristics as given below.

Each green color filter element G has a spectral strength peak at a wavelength $G_p$, each yellow filter element $Y_e$ has a spectral strength peak at a wavelength $Y_p$, each cyan filter element C has a spectral strength peak at a wavelength $C_p$, and each magenta filter element M has spectral strength peaks at wavelengths $M_{p1}$ and $M_{p2}$, and these wavelengths satisfy the following conditions.

510 nm<$G_p$<540 nm 5 nm<$Y_p$−$G_p$<35 nm

−100 nm<$C_p$−$G_p$<−5 nm 430 nm<$M_{p1}$<480 nm 580 nm<$M_{p2}$<640 nm

To ensure higher color reproducibility, it is preferred that the green, yellow and cyan filter elements have a strength of at least 80% at 530 nm wavelength with respect to their respective spectral strength peaks, and the magenta filter elements have a strength of 10% to 50% at 530 nm wavelength with their spectral strength peak.

Figure 30:
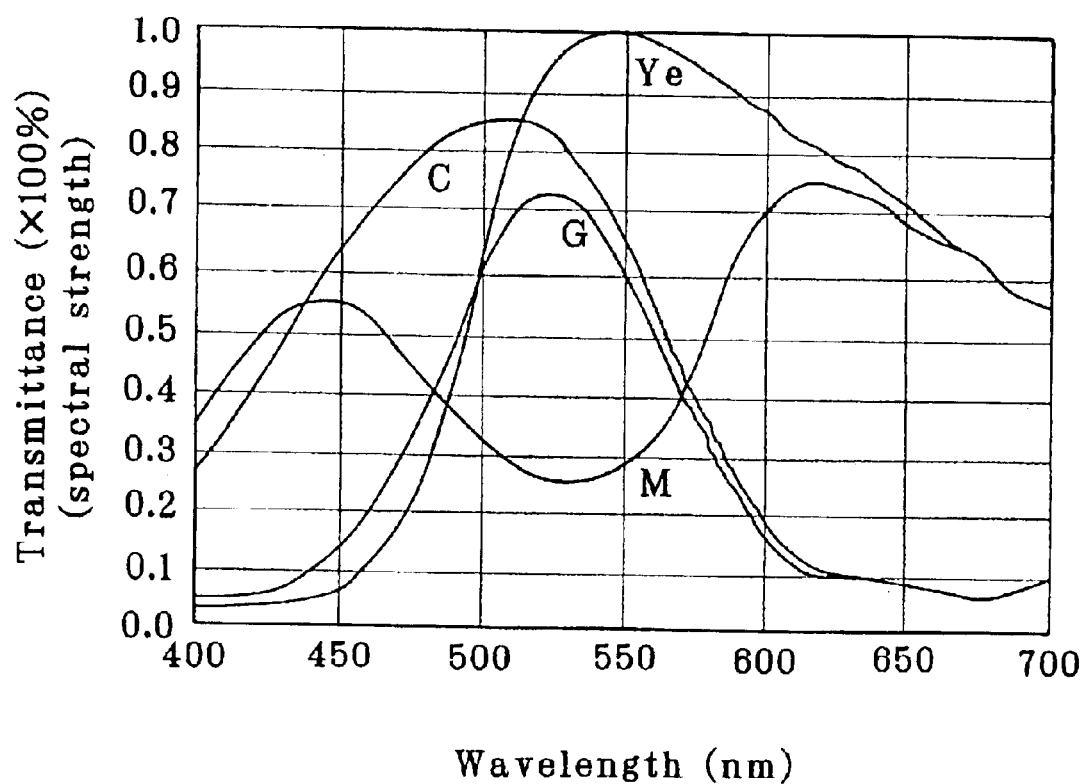
FIG. 30 is a diagram that represents one example of the wavelength properties of the complementary colors mosaic filter.

One example of the wavelength characteristics in the aforesaid respective examples is shown in FIG. 30. The green filter element G has a spectral strength peak at 525 nm. The yellow filter element $Y_e$ has a spectral strength peak at 555 nm. The cyan filter element C has a spectral strength peak at 510 nm. The magenta filter element M has peaks at 445 nm and 620 nm. At 530 nm, the respective color filter elements have, with respect to their respective spectral strength peaks, strengths of 99% for G, 95% for $Y_e$, 97% for C and 38% for M.

For such a complementary colors filter, such signal processing as mentioned below is electrically carried out by means of a controller (not shown) (or a controller used with digital cameras).

For luminance signals, $$Y = |G + M + Y_e + C| \times \frac{1}{4}$$

For chromatic signals, $$R − Y = |(M + Y_e) − (G + C)|$$

$$B − Y = |(M + C) − (G + Y_e)|$$

Through this signal processing, the signals from the complementary colors filter are converted into R (red), G (green) and B (blue) signals.

In this regard, it is noted that the aforesaid near-infrared sharp cut coat may be located anywhere on the optical path, and that the number of low-pass filters LF may be either two as mentioned above or one.

The electronic image pickup apparatus constructed as described above may be applied to phototaking systems where object images formed through zoom lenses are received at image pickup devices such as CCDs, inter alia, digital cameras or video cameras as well as PCs and telephone sets which are typical information processors, in particular, easy-to-carry cellular phones. Given below are some such embodiments.

Figure 31:
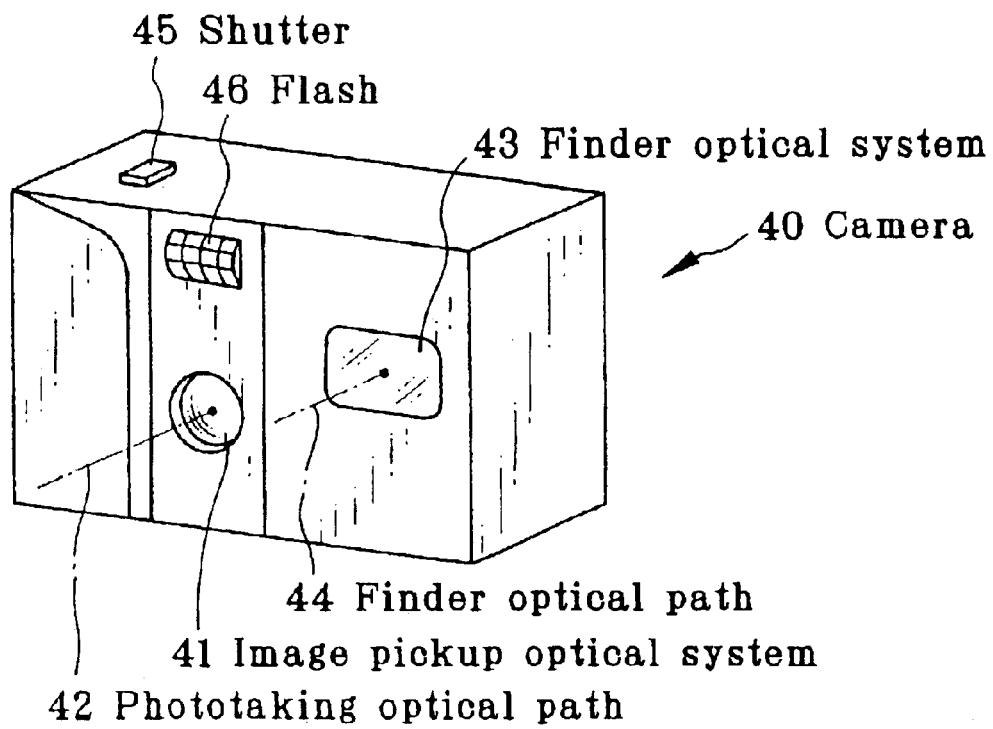
FIG. 31 is a front perspective view of a digital camera in which the zoom lens of the invention is built.
Figure 32:
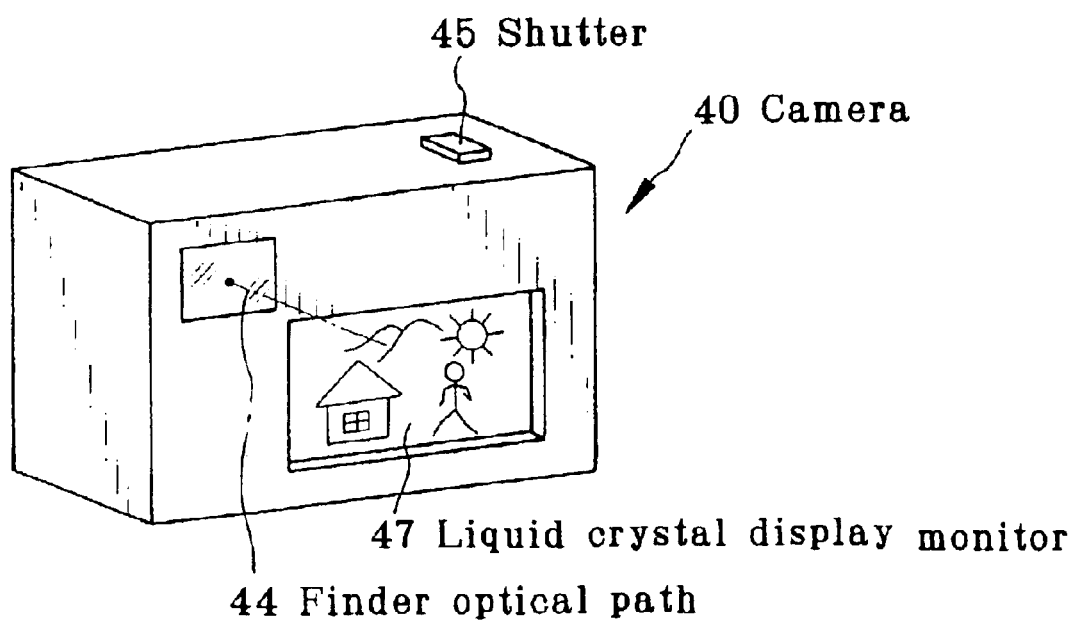
FIG. 32 is a rear perspective view of the digital camera of FIG. 31.
Figure 33:
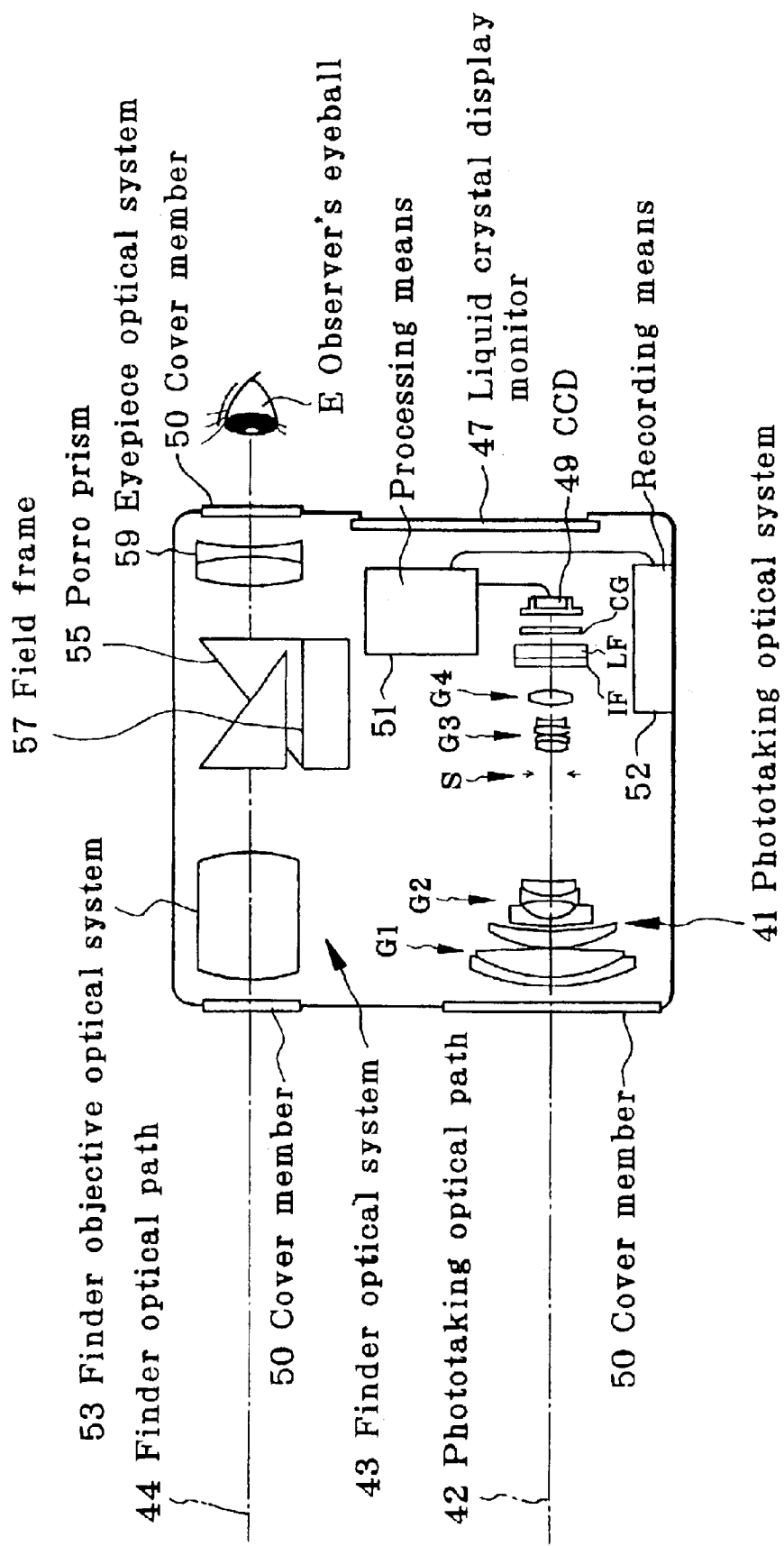
FIG. 33 is a sectional view of the digital camera of FIG. 31.

FIGS. 31, 32 and 33 are conceptual illustrations of a phototaking optical system 41 for digital cameras, in which the zoom lens of the invention is incorporated. FIG. 31 is a front perspective view of the outside shape of a digital camera 40, and FIG. 32 is a rear perspective view of the same. FIG. 33 is a sectional view of the construction of the digital camera 40. In this embodiment, the digital camera 40 comprises a phototaking optical system 41 including a phototaking optical path 42, a finder optical system 43 including a finder optical path 44, a shutter 45, a flash 46, a liquid crystal monitor 47 and so on. As the shutter 45 mounted on the upper portion of the camera 40 is pressed down, phototaking takes place through the phototaking optical system 41, for instance, the zoom lens according to Example 1. An object image formed by the phototaking optical system 41 is formed on the image pickup surface of a CCD 49 via an infrared cut absorption filter IF comprising a dummy transparent plane plate provided thereon with a near-infrared cut coat and an optical low-pass filter LF. The object image received at CCD 49 is shown as an electronic image on the liquid crystal monitor 47 via processing means 51, which monitor is mounted on the back of the camera. This processing means 51 is connected with recording means 52 in which the phototaken electronic image may be recorded. It is here noted that the recording means 52 may be provided separately from the processing means 51 or, alternatively, it may be constructed in such a way that images are electronically recorded and written therein by means of floppy discs, memory cards, MOs or the like. This camera may also be constructed in the form of a silver-halide camera using a silver-halide film in place of CCD 49.

Moreover, a finder objective optical system 53 is located on the finder optical path 44. An object image formed by the finder objective optical path 53 is in turn formed on the field frame 57 of a Porro prism 55 that is an image erecting member. In the rear of the Porro prism 55 there is located an eyepiece optical system 59 for guiding an erected image into the eyeball E of an observer. It is here noted that cover members 50 are provided on the entrance sides of the phototaking optical system 41 and finder objective optical system 53 as well as on the exit side of the eyepiece optical system 59.

With the thus constructed digital camera 40, it is possible to achieve high performance and cost reductions, because the phototaking optical system 41 is constructed of a fast zoom lens having a high zoom ratio with a wide angle of view and satisfactory aberrations and a back focus large enough to receive a filter, etc. therein.

In the embodiment of FIG. 32, plane-parallel plates are used as the cover members 50; however, it is acceptable to use powered lenses.

As can be appreciated from the foregoing explanation, the present invention can provide a digital still camera which is compatible with an image pickup device having as many pixels as about 3,000,000 or greater and uses a zoom lens having a high zoom ratio yet compact, simple construction, wherein it is possible to reduce or eliminate color blurring ascribable to chromatic aberrations caused by secondary spectra unavoidably incidental to a high-zoom-ratio zoom lens.

What we claim is:

1. A zoom lens including a negative lens group having negative refracting power and at least one positive lens group located on an image side thereof, with no intervening lenses between, and having positive refracting power, wherein:

a spacing between said negative lens group and said positive lens group changes upon zooming, said positive lens group consists of two doublet components in each of which a positive lens element and a negative lens element are cemented together in order from an object side of said positive lens group, and a doublet component of said two doublet components, which is located on an image side of said positive lens group, has a meniscus form concave on the image side of said positive lens group.

2. A zoom lens including a negative lens group having negative refracting power and at least one positive lens group located on an image side thereof, with no intervening lenses between, and having positive refracting power, wherein:

a spacing between said negative lens group and said positive lens group changes upon zooming, said positive lens group consists of two doublet components in each of which a positive lens element and a negative lens element are cemented together in order from an object side of said positive lens group, and a doublet component of said two doublet components, which is located on an image side of said positive lens group, has negative refracting power.

3. A zoom lens including a negative lens group having negative refracting power and at least one positive lens group located on an image side thereof, with no intervening lenses between, and having positive refracting power, wherein:

a spacing between said negative lens group and said positive lens group changes upon zooming, said positive lens group includes two doublet components in each of which a positive lens element and a negative lens element are cemented together in order from an object side of said positive lens group, and said two doublet components satisfy the following conditions (1) and (2):

$$0.000 < AVE[(\Delta\theta_{gF})C1p, (\Delta\theta_{gF})C2p] < 0.080 \quad (1)$$

$$-0.030 < AVE[(\Delta\theta_{gF})C1n, (\Delta\theta_{gF})C2n] < 0.003 \quad (2)$$

where ($\Delta\theta_{gF}$)C1p is an anomalous dispersibility of a medium forming the positive lens element in the doublet component of said two doublet components, which is located on the object side of said positive lens group, ($\Delta\theta_{gF}$)C1n is an anomalous dispersibility of a medium forming the negative lens element in the doublet component of said two doublet components, which is located on the object side of said positive lens group, ($\Delta\theta_{gF}$)C2p is an anomalous dispersibility of a medium forming the positive lens element in the doublet component of said two doublet components, which is located on an image side of said positive lens group, ($\Delta\theta_{gF}$)C2n is an anomalous dispersibility of a medium forming the negative lens element in the doublet component of said two doublet components, which is located on the image side of said positive lens group, AVE[($\Delta\theta_{gF}$)C1p, ($\Delta\theta_{gF}$)C2p] is an arithmetic mean of ($\Delta\theta_{gF}$)C1p and ($\Delta\theta_{gF}$)C2p, and AVE[($\Delta\theta_{gF}$)C1n, ($\Delta\theta_{gF}$)C2n] is an arithmetic mean of ($\Delta\theta_{gF}$)C1n and ($\Delta\theta_{gF}$)C2n.

4. A zoom lens including a negative lens group having negative refracting power and at least one positive lens group located on an image side thereof, with no intervening lenses between, and having positive refracting power, wherein:

a spacing between said negative lens group and said positive lens group changes upon zooming, said positive lens group includes two doublet components in each of which a positive lens element and a negative lens element are cemented together in order from an object side of said positive lens group, and said two doublet components satisfy at least one of the following conditions (3-1) and (3-2) and at least one of the following conditions (4-1) and (4-2):

$$0.0000 < (\Delta\theta_{gF})C1p < 0.1000 \quad (3\text{-}1)$$

$$0.0000 < (\Delta\theta_{gF})C2p < 0.1000 \quad (3\text{-}2)$$

$$-0.0300 < (\Delta\theta_{gF})C1n < 0.0000 \quad (4\text{-}1)$$

$$-0.0300 < (\Delta\theta_{gF})C2n < 0.0000 \quad (4\text{-}2)$$

where ($\Delta\theta_{gF}$)C1p is an anomalous dispersibility of a medium forming the positive lens element in the doublet component of said two doublet components, which component is located on the object side of said positive lens group, ($\Delta\theta_{gF}$)C1n is an anomalous dispersibility of a medium forming the negative lens element in the doublet component of said two doublet components, which component is located on the object side of said positive lens group, ($\Delta\theta_{gF}$)C2p is an anomalous dispersibility of a medium forming the positive lens element in the doublet component of said two doublet components, which component is located on an image side of said positive lens group, and ($\Delta\theta_{gF}$)C2n is an anomalous dispersibility of a medium forming the negative lens element in the doublet component of said two doublet components, which component is located on the image side of said positive lens group.

5. The zoom lens according to claim 1, wherein the positive lens element of the doublet component of said two doublet components, which component is located on the object side of said positive lens group, has an aspheric surface.

6. The zoom lens according to claim 1, wherein an aperture stop is interposed between said negative lens group and said positive lens group.

7. The zoom lens according to claim 6, wherein all lens groups located on an image side of said zoom lens with respect to said aperture stop move on an optical axis of said zoom lens upon zooming or focusing.

8. The zoom lens according to claim 1, wherein the doublet component of said two doublet components, which component is located on the image side of the positive lens group, has a shape satisfying the following condition (e)

$$1.6 < (R_{C21} + R_{C22})/(R_{C21} - R_{C22}) < 8.0 \quad (e)$$

where $R_{C21}$ is an axial radius of curvature of an object side-surface of the doublet component located on the image side of the positive lens group, and $R_{C22}$ is an axial radius of curvature of an image side-surface of the doublet component located on the image side of the positive lens group.

9. A zoom lens including a negative lens group having negative refracting power and at least one positive lens group located on an image side thereof, with no intervening lenses between, and having positive refracting power, wherein:

a spacing between said negative lens group and said positive lens group changes upon zooming, said positive lens group includes two doublet components in each of which a positive lens element and a negative lens element are cemented together in order from an object side of said positive lens group, and said positive lens group satisfies the following condition (f):

$$0.000 < AVE[(\Delta\theta_{gF})pi] < 0.080 \quad (f)$$

where $AVE[(\Delta\theta_{gF})pi]$ is an arithmetic mean of anomalous dispersibilities of all positive lens elements included in the positive lens group.

10. The zoom lens according to claim 1, which further satisfies the following conditions (g) and (h):

$$50 < AVE[(v_d)C1p, (v_d)C2p] \quad (g)$$

$$AVE[(v_d)C1n, (v_d)C2n] < 50 \quad (h)$$

where $(v_d)C1p$ is an Abbe number on a d-line basis of a medium forming the positive lens element in the doublet component of the two doublet components, which component is located on the object side of said positive lens group, $(v_d)C2p$ is an Abbe number on a d-line basis of a medium forming the positive lens element in the doublet component of the two doublet components, which component is located on the image side of said positive lens group, $(v_d)C1n$ is an Abbe number on a d-line basis of a medium forming the negative lens element in the doublet component of the two doublet components, which component is located on the object side of said positive lens group, $(v_d)C2n$ is the Abbe number on a d-line basis of a medium forming the negative lens element in the doublet component of the two doublet components, which component is located on the image side of said positive lens group, $AVE[(v_d)C1p, (v_d)C2p]$ is an arithmetic mean of $(v_d)C1p$ and $(v_d)C2p$, and $AVE[(v_d)C1n, (v_d)C2n]$ is an arithmetic mean of $(v_d)C1n$ and $(v_d)C2n$.

11. The zoom lens according to claim 1, which further satisfies at least one of the following conditions (i-1) and (i-2) and at least one of the following conditions (j-1) and (j-2):

$$60 < (v_d)C1p \quad (i\text{-}1)$$

$$60 < (v_d)C2p \quad (i\text{-}2)$$

$$(v_d)C1n < 30 \quad (j\text{-}1)$$

$$(v_d)C2n < 30 \quad (j\text{-}2)$$

where $(v_d)C1p$ is an Abbe number on a d-line basis of a medium forming the positive lens element in the doublet component of the two doublet components, which component is located on the object side of said positive lens group, $(v_d)C2p$ is an Abbe number on a d-line basis of a medium forming the positive lens element in the doublet component of the two doublet components, which component is located on the image side of said positive lens group, $(v_d)C1n$ is an Abbe number on a d-line basis of a medium forming the negative lens element in the doublet component of the two doublet components, which component is located on the object side of said positive lens group, and $(v_d)C2n$ is an Abbe number on a d-line basis of a medium forming the negative lens element in the doublet component of the two doublet components, which component is located on the image side of said positive lens group.

12. The zoom lens according to claim 1, which further satisfies the following conditions (o) and (p):

$$-20 < (v_d)C1p - (v_d)C1n < 50 \quad (o)$$

$$20 < (v_d)C2p - (v_d)C2n < 70 \quad (p)$$

where $(v_d)C1p$ is an Abbe number on a d-line basis of a medium forming the positive lens element in the doublet component of the two doublet components, which component is located on the object side of said positive lens group, $(v_d)C2p$ is an Abbe number on a d-line basis of a medium forming the positive lens element of the doublet component of the two doublet components, which component is located on the image side of said positive lens group, $(v_d)C1n$ is an Abbe number on a d-line basis of a medium forming the negative lens element in the doublet component of the two doublet components, which component is located on the object side of said positive lens group, and $(v_d)C2n$ is an Abbe number on a d-line basis of a medium forming the negative lens element in the doublet component of the two doublet components, which component is located on the image side of said positive lens group.

13. The zoom lens according to claim 1, wherein a first lens group having positive refracting power is located nearest to the object side of said zoom lens.

14. The zoom lens according to claim 13, wherein said positive lens group, which is located on an image side of said negative lens group, satisfies the following condition (r) with respect to an amount of zooming movement of said positive lens group upon focused on an object point at infinity:

$$-0.05 < mST/mWS < 0.15 \quad (r)$$

where, on condition that a direction of movement of the positive lens group is positive on the image side of the zoom lens, mWS is an amount of movement of the positive lens group from a wide-angle end to an intermediate focal length state of the zoom lens, and mST is an amount of movement of the positive lens group from the intermediate focal length state to a telephoto end of the zoom lens, wherein the intermediate focal length state is defined as a state where an intermediate focal length can be determined by a geometric mean of a focal length at the wide-angle end and a focal length at the telephoto end.

15. The zoom lens according to claim 13, wherein said positive lens group, which is located on an image side of said negative lens group, remains fixed upon focusing.

16. The zoom lens according to claim 13, wherein said negative lens group is a second lens group located just after an image side of said first lens group.

17. The zoom lens according to claim 16, wherein a lens element located nearest to an object side of said negative lens group is a negative lens element that satisfies the following condition (s):

$$1.83 < n_{21} < 2.01 \quad (s)$$

where $n_{21}$ is a d-line refractive index of a medium forming said negative lens element.

18. The zoom lens according to claim 13, wherein at least one positive lens element in said first lens group satisfies the following condition (u):

$$0.004 < (\Delta\theta_{gF})^* < 0.1 \quad (u)$$

where $(\Delta\theta_{gF})^*$ is an anomalous dispersibility of any positive lens element in the first lens group.

19. The zoom lens according to claim 13, wherein:

said first lens group includes a plurality of positive lens elements, and at least one positive lens element in said first lens group satisfies the following condition (u) whereas at least another positive lens element satisfies the following condition (v):

$$0.004 < (\Delta\theta_{gF})^* < 0.1 \quad (u)$$

$$0.000 < (\Delta\theta_{gF})^{**} < 0.1 \quad (v)$$

where $(\Delta\theta_{gF})^*$ is an anomalous dispersibility of any positive lens element in the first lens group, and $(\Delta\theta_{gF})^{**}$ is an anomalous dispersibility of another positive lens element in the first lens group.

20. The zoom lens according to claim 13, which satisfies the following conditions (x) and (y):

$$1.2 \leq -\beta 2T \leq 10 \quad (x)$$

$$0.1 \leq -\beta RT \leq 0.6 \quad (y)$$

where β2T is a magnification at the telephoto end of the negative lens group upon focused on an object point at infinity, and βRT is a magnification at the telephoto end of all lens groups located on the image side with respect to the negative lens group upon focused on an object point at infinity.

21. An image pickup apparatus, comprising a zoom lens as recited in claim 1, and an image pickup device located on an image plane side of said zoom lens.

22. The image pickup apparatus according to claim 21, wherein any positive lens element included in said positive lens group satisfies the following condition (k):

$$0.000 < \Phi p \cdot L < 0.1 \quad (k)$$

where Φp is a refracting power in air of any positive lens element included in the positive lens group, $(\Delta\theta_{gF})p$ is an anomalous dispersibility of a medium forming the positive lens element, and L is a diagonal length in mm of an effective image pickup area of the image pickup device.

23. The image pickup apparatus according to claim 21, wherein any negative lens element included in said positive lens group satisfies the following condition (1):

$$0.000 < \Phi n \cdot (\Delta\theta_{gF}) n \cdot L < 0.1 \quad (1)$$

where Φn is a refracting power in air of any negative lens element included in the positive lens group, $(\Delta\theta_{gF})$ n is an anomalous dispersibility of a medium forming the negative lens element, and L is a diagonal length in mm of an effective image pickup area of the image pickup device.

24. The image pickup apparatus according to claim 21, wherein any negative lens element included in said positive lens group satisfies the following condition (m):

$$-2.8 < (\Phi C1n + \Phi C2n) \cdot L < -0.6 \quad (m)$$

Here

ΦC1n is a refracting power in air of the negative lens element in the doublet component of the two doublet components, which component is located on an object side of the positive lens group, ΦC2n is a refracting power in air of the negative lens element in the doublet component of the two doublet components, which component is located on an image side of the positive lens group, and L is the diagonal length in mm of an effective image pickup area of the image pickup device.

25. The image pickup apparatus according to claim 21, wherein the doublet component of said two doublet components, which component is located on an object side of the positive lens group, has positive refracting power, the doublet component that is located on an image side of the positive lens group has negative refracting power, and an air separation between said both doublet components satisfies the following condition (q):

$$0.01 < dA/L < 0.06 \quad (q)$$

where dA is an air separation on an optical axis of the zoom lens between two doublet components in the positive lens group, and L is a diagonal length in mm of an effective image pickup area of the image pickup device.

26. The image pickup apparatus according to claim 21, wherein a cementing surface in the doublet component of said two doublet components, which component is located on an image side of the positive lens group, satisfies the following condition (5):

$$-0.4 < L/R_{C2C} < 1.2 \quad (5)$$

where $R_{C2C}$ is an axial radius of curvature of the cementing surface in the doublet component of the two doublet components, which component is located on an image side of the positive lens group, and L is a diagonal length in mm of an effective image pickup area of the image pickup device.

27. The image pickup apparatus according to claim 21, wherein said zoom lens comprises a lens group located nearest to an image side thereof, wherein said lens group comprises a lens component that satisfies the following condition (w) and has aspheric surfaces on both sides:

$$-0.05 < (AspRR - AspRF)/L < 0 \quad (w)$$

where

AspRF is an amount of axial displacement of an object side-surface of the lens component having aspheric surfaces on both sides with respect to a spherical surface having an axial radius of curvature, as measured at a height of 0.4L from an optical axis of the zoom lens, AspRR is an amount of axial displacement of an image side-surface of the lens component having aspheric surfaces on both sides with respect to a spherical surface having an axial radius of curvature, as measured at a height of 0.4L from the optical axis of the zoom lens, and L is a diagonal length in mm of an effective image pickup area of the image pickup device.

28. The image pickup apparatus according to claim 21, wherein said image pickup device satisfies the following condition (z):

$$2\times10^{-2} \leqq s\cdot p/L \leqq 4\times10^{-2} \quad (z)$$

where $p/L$ satisfies $p/L \leqq 4.5\times10^{-4}$ s is an actual length in mm of the lens system from a surface thereof located nearest to the object side of the lens system to an image pickup surface as measured at a wide-angle end of the lens system upon focused on an object point at infinity, p is a horizontal pixel pitch in mm, and L is a diagonal length in mm of an effective image pickup area of the image pickup device.

* * * * *

UNITED STATES PATENT AND TRADEMARK OFFICE
CERTIFICATE OF CORRECTION

PATENT NO. : 6,829,101 B2
DATED : December 7, 2004
INVENTOR(S) : Shinichi Mihara et al.

It is certified that error appears in the above-identified patent and that said Letters Patent is hereby corrected as shown below:

Column 14,
Line 53, change "aspherc" to -- aspheric --.

Column 18,
Line 42, change "conditions.is" to -- conditions is --.

Column 36,
Line 16, change "Zomming Data" to -- Zooming Data --.

Signed and Sealed this

Twentieth Day of September, 2005

JON W. DUDAS
*Director of the United States Patent and Trademark Office*